United States Patent
Kachare et al.

(10) Patent No.: US 11,243,714 B2
(45) Date of Patent: Feb. 8, 2022

(54) EFFICIENT DATA MOVEMENT METHOD FOR IN STORAGE COMPUTATION

(71) Applicant: Samsung Electronics Co., Ltd., Suwon-si (KR)

(72) Inventors: Ramdas P. Kachare, Pleasanton, CA (US); Jimmy K. Lau, Santa Clara, CA (US)

(73) Assignee: SAMSUNG ELECTRONICS CO., LTD.

(*) Notice: Subject to any disclaimer, the term of this patent is extended or adjusted under 35 U.S.C. 154(b) by 117 days.

(21) Appl. No.: 16/509,476

(22) Filed: Jul. 11, 2019

(65) Prior Publication Data

US 2020/0393991 A1 Dec. 17, 2020

Related U.S. Application Data

(60) Provisional application No. 62/860,242, filed on Jun. 11, 2019.

(51) Int. Cl.
 *G06F 3/06* (2006.01)
 *G06F 13/28* (2006.01)
 *G06F 12/10* (2016.01)

(52) U.S. Cl.
 CPC .......... *G06F 3/0659* (2013.01); *G06F 3/0604* (2013.01); *G06F 3/068* (2013.01);
 (Continued)

(58) Field of Classification Search
 None
 See application file for complete search history.

(56) References Cited

U.S. PATENT DOCUMENTS

| | | | | |
|---|---|---|---|---|
| 7,139,848 B1 * | 11/2006 | Murray | .................. | G06F 13/28 710/22 |
| 9,684,615 B1 * | 6/2017 | Nguyen | .................. | G06F 13/30 |

(Continued)

OTHER PUBLICATIONS

Rodriguez-Haro, Fernando et al., "A summary of virtualization techniques", The 2012 Iberoamerican Conference on Electronics Engineering and Computer Science, Procedia Technology 3 (2012) 267-272, Elsevier Ltd., 6 pages.

(Continued)

*Primary Examiner* — Charles Rones
*Assistant Examiner* — Ryan Dare
(74) *Attorney, Agent, or Firm* — Renaissance IP Law Group LLP

(57) ABSTRACT

A Solid State Drive (SSD) is disclosed. The SSD may include flash memory storage to store data, a volatile memory storage, and a host interface layer to receive requests from a host machine. An SSD controller may manage reading data from and writing data to the flash memory storage, with a flash translation layer to translate between Logical Block Addresses and Physical Block Addresses, a flash memory controller to access the flash memory storage, a volatile memory controller to access the volatile memory storage, and an orchestrator to send instructions to a Data Movement Interconnect (DMI). The DMI may include at least two kernels, a Buffer Manager, a plurality of ring agents associated with the kernels and the Buffer Manager to handle messaging, a Data Movement Manager (DMM) to manage data movement, at least two data rings to move data between the ring agents, and a control ring to share commands and acknowledgments between the ring agents and the DMM.

20 Claims, 29 Drawing Sheets

(52) U.S. Cl.
CPC ............ *G06F 3/0647* (2013.01); *G06F 12/10* (2013.01); *G06F 13/28* (2013.01); *G06F 2212/7201* (2013.01)

(56) References Cited

U.S. PATENT DOCUMENTS

| | | | |
|---|---|---|---|
| 10,108,446 B1 | 10/2018 | Steinberg et al. | |
| 2009/0216937 A1* | 8/2009 | Yasufuku | G06F 12/0246 |
| | | | 711/103 |
| 2011/0276730 A1* | 11/2011 | Lin | H04L 49/9015 |
| | | | 710/52 |
| 2017/0024270 A1* | 1/2017 | Loeliger | G06F 13/32 |

OTHER PUBLICATIONS

Vaquero, Luis M. et al., "Locking the sky: a survey on IaaS cloud security", Computing (2011) 91:93-118, published online Nov. 24, 2010, Springer-Verlag, 27 pages.

\* cited by examiner

| Valid | Dscrptr-ID | Total Length | Type | Src | Dest | Flags | Remain Length | Data Avail | Space Avail | Active CID | Active Length |
|---|---|---|---|---|---|---|---|---|---|---|---|
| 0 | | | | | | | | | | | |
| 1 | 1234 | 1 MB | 2 | 3 | 0x1234_5678 | 40 | 600 KB | 64 KB | 8 KB | 23 | 8 KB |
| 0 | | | | | | | | | | | |
| 0 | | | | | | | | | | | |
| 1 | 17348 | 256 KB | 1 | 0x8000_1000 | 12 | 02 | 4 KB | * | 16 KB | 105 | 4 KB |
| 1 | 37 | 16 KB | 3 | 20 | 4 | 82 | 16 KB | 2 KB | 4 KB | 12 | 2 KB |
| 0 | | | | | | | | | | | |

| Node ID | Control Ring | Data Ring 1 | Data Ring 2 | Data Ring 3 | ... |
|---|---|---|---|---|---|
| 0 | 1 | 1 | 1 | 1 | |
| 1 | 2 | 2 | 4 | 3 | |
| 2 | 3 | 3 | 3 | 4 | |
| 3 | 4 | 4 | 2 | 2 | |

FIG. 7

| 7 | | 4 | 2 | 0 |
|---|---|---|---|---|
| Flags | | Type | | Dscrptr-ID |
| | | | Length | |
| Src address | | | | |
| Dest address | | | | |

FIG. 8

| 7 | | 4 | 2 | 0 |
|---|---|---|---|---|
| | | Status | | Dscrptr-ID |

EFFICIENT DATA MOVEMENT METHOD FOR IN STORAGE COMPUTATION

RELATED APPLICATION DATA

This application claims the benefit of U.S. Provisional Patent Application Ser. No. 62/860,242, filed Jun. 11, 2019, which is incorporated by reference herein for all purposes.

FIELD

The inventive concepts relate generally to computer systems, and more particularly to processing data local to storage devices.

BACKGROUND

Persistent data storage is an integral and one of the most critical parts of modern Information Technology (IT) infrastructure. Various applications generate and process vast amounts of data to provide meaningful services to the end users. Many such applications are mission critical and need very fast and reliable access to the data. In addition to low latency, reliability, high performance, and high availability, storage devices such as Solid State Drives (SSDs) need to provide low power and low cost solutions.

Another aspect of the storage is security, which often times needs data encryption, compression, and other similar functions. These functions may have very demanding requirements and create complexities in SSDs. Most of that complexity is often concentrated in SSD Controller System-on-a-Chip (SoC) devices. Various data processing modules and engines must work efficiently and collaboratively in the SSD Controller SoC to achieve above goals. Having the host machine perform these application functions can impact the performance of the host machine and increase its resource requirements.

A need remains to improve host machine performance and resource utilization while still performing the functions requested by an application.

BRIEF DESCRIPTION OF THE DRAWINGS

FIG. 6 illustrates an example of an Outstanding Direct Memory Access Descriptor Table (ODMADT) of FIG. 5, according to an embodiment of the inventive concept.

FIG. 7 illustrates an example of the hop count table of FIG. 5, according to an embodiment of the inventive concept.

FIG. 8 illustrates an example DMA descriptor message sent from the orchestrator of FIGS. 3A-3B to the DMM of FIG. 4, according to an embodiment of the inventive concept.

FIG. 9 illustrates an example DMA descriptor completion message sent from the DMM of FIG. 4 to the orchestrator of FIGS. 3A-3B, according to an embodiment of the inventive concept.

FIGS. 11-23 illustrate example commands, acknowledgments, and responses that may be used in the DMI of FIGS. 3A-3B, according to embodiments of the inventive concept.

DETAILED DESCRIPTION

Figure 1:
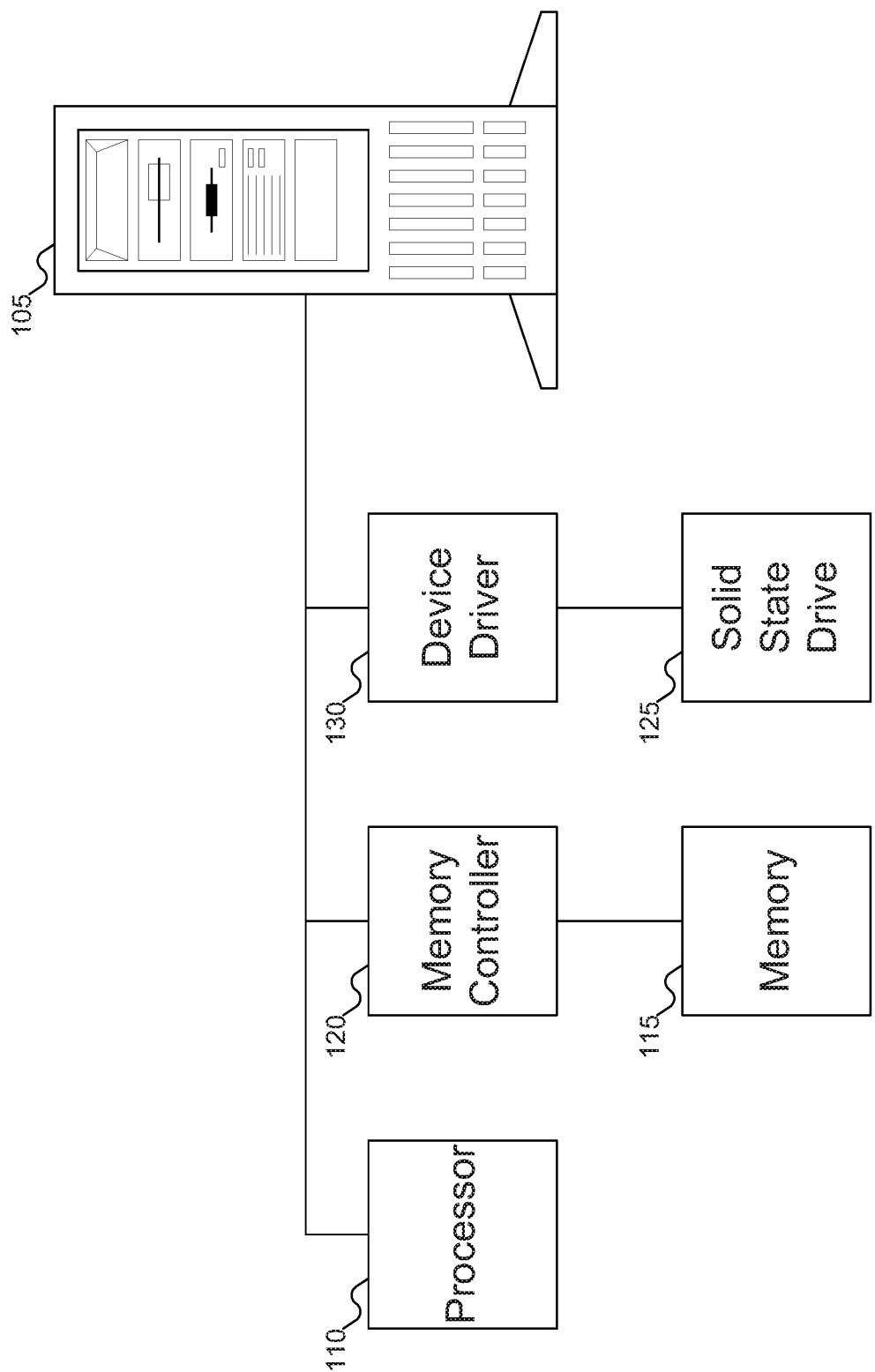
FIG. 1 shows a machine designed to use a Solid State Drive (SSD) supporting acceleration using a Data Movement Interconnect (DMI), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In order to further improve application latency, some Solid State Drive (SSD) Controllers attempt to offload some of the data intensive functions of the applications to the SSD device itself. That is to say, such SSD Controllers process some data in the SSD itself and provide results back to the host thereby minimizing data movement. Minimizing data transfers to the host improves performance as well as lowers CPU resource requirements. This has direct correlation to the capital expenses (capex) and operating expenses (opex) of the Information Technology (IT) infrastructure.

SSD Controller System-on-a-Chip (SoC) devices may implement a complex set of functions to provide high performance, reliable, and secure persistent data storage. In addition to storage related functions, SSD Controllers may also implement various acceleration engines to offload some of the application functions. Such applications may offload work otherwise performed by the host processor. Acceleration may be desirable to provide lower application latencies, as well as optimize energy and resource costs of the infrastructure. Acceleration engines on the SSD Controller reduce data movements to the host by processing that data on the SSD itself.

All of these data processing and other functions may need to communicate with each other in an efficient manner. The connectivity of communication channels between such processing elements in the SSD Controller may become a complex problem. As the size of these communications interconnect grows, the layout and routing of these channels, power consumption, latencies incurred, silicon die area, etc. factors may grow significantly.

Embodiments of the inventive concept propose a novel method of a high performance, non-blocking, and scalable SSD Controller SoC interconnect to address some of these data movement problems. The proposed architecture, termed a Data Movement Interconnect (DMI), uses a novel combination of ring topology and data movement orchestration using messages. The DMI architecture may use two data ring channels and one control ring channel that adapt dynamically to the changing workloads to connect various engines and modules of the SoC. The proposed method enables non-blocking, high performance, and scalable data movements between various data processing modules or kernels in a storage device. A communication protocol is proposed that guarantees no head-of-line blocking issues at times observed in SoC interconnects. The proposed method may enable high performance interconnect at the same time reduces burden of layout, routing, and power consumption.

Although the ideas presented herein are described in the context of SSD Controller SoC, embodiments of the inventive concept may be used in any other SoCs that need a large scale, high performance data movements between multiple processing units.

SSD devices may be used to implement high performance, reliable data storage using flash media. Flash media has certain physical characteristics that need to be managed carefully to achieve the performance, cost, and endurance. There are many broad classes of functions that may be performed by the SSD controller such as: 1) host storage interface processing; 2) background housekeeping operations; 3) reliability, availability, and security (RAS); and 4) in-storage computation (also known as application acceleration). These functions are typically implemented using specialized hardware and/or firmware modules (also known as acceleration kernels). All of these data processing units must work in tandem with each other in a very high efficiency manner to achieve the high performance expected from SSD devices.

The SSD controller may interface with a host using host input/output (I/O) protocols such as Non-Volatile Memory Express (NVMe). These protocols essentially perform a set of functions that are needed to persist the host data to the flash media and deliver the persisted data back to the host when demanded. These functions include host protocol interpretation, host command execution, Direct Memory Access (DMA) of data to/from system memory, Flash Translation Layer (FTL) translations, and write/read operations to the flash media using flash media protocol such as ONFI, Toggle, etc.

Due to the nature of flash media, the SSD controller may need to perform background operations. For example in flash media a page may not be written without having been previously erased. This fact means that periodically the flash pages must be recycled to replenish the free pool. However to recycle pages, valid data from the pages may need to be moved to different blocks and pages in a process called garbage collection (GC). The SSD Controller may keep track of various statistics and logs during the operation. Such statistics and logs may be saved periodically to the persistent flash media. To achieve higher performance, the SSD Controller may also maintain read and/or write data caches. Such caches may be drained (flushed) at times to make room for newer data. All of these functions are data intensive and may involve various types of data processing by specialized IP modules (also known as kernels).

Another class of data processing functions in the SSD Controller is related to data reliability, availability, and security (RAS). These data processing functions include data compression, encryption, decryption, error recovery using codes such as LDPC and BCH. All these functions process large amounts of data by using specialized modules or kernels.

In yet another class of data processing functions, the SSD Controller may analyze the stored data to provide higher value functions to the host applications. The SSD may store vast amounts of data in the flash media. The applications running on the host may fetch a very large amount of raw data to perform various functions search as search and filter. The large data movements to the host are energy inefficient and impose large burdens in terms of central processing unit (CPU) resources and network bandwidths, among other resources. Such IT infrastructure is expensive to build (capex) and maintain (opex). By having the SSD controller process some of the data inside SSD and provide the results to the host, these infrastructure requirements may be reduced. This paradigm is known as various terms such as "in storage compute", "near storage computation", and "computational storage". The services offered are implemented using various data processing/acceleration kernels.

All above classes of data processing may involve large amounts of data being moved to/from various data processing units or kernels. Such data movement becomes a bottleneck and eventually a performance limit. These data movements are facilitated by using some kind of interconnect implemented in the SSD Controller. Such interconnects are expected to be non-blocking, high performance, and scalable. There are various types of interconnect topologies, such as point-to-point, bus, mesh, n-cube, hypercube, and low dimensional networks such as torus and folded torus. The switching of the data may be done using many different protocols such as circuit switching, fixed size cell switching, packet switching. The routing of the data may also be implemented using protocols such as source routing, distributed routing.

Embodiments of the inventive concept propose a novel method to implement data movements between different kernels. The proposed interconnect subsystem includes one Data Movement Manager (DMM) node, one or more Buffer Manager (BM) nodes for access to the on-chip and off-chip memory, and a number of data processing modules or kernels. The DMM node is the control node of the interconnect subsystem and performs all the orchestration needed to exchange data blocks between various nodes in the subsystem. The DMM may receive DMA descriptors from the control plane (that is, an embedded processor), which are needed to be performed for a given application during runtime. The DMM node executes DMA descriptors using intelligent scheduling of data movements between various nodes on the interconnect subsystem. The DMM scheduling algorithm attempts to ensure that the data movements are done efficiently to achieve high throughput and non-blocking operation. The DMM node may use a set of control messages to facilitate DMA execution. The proposed method may use two rings as data paths connected in opposite directions. Such a topology provides two paths to move data using paths that may be bounded at half of the length of the ring. The proposed method uses a dedicated control ring to exchange control information.

Data Movement Interconnect (DMI)

The proposed Data Movement Interconnect (DMI) architecture includes a control node, buffer manger nodes(s), and data processing kernel node(s). The interconnect subsystem includes a Data Movement Manager (DMM) node to implement the control functionality of the interconnect subsystem. The subsystem may contain one or more buffer manager (BM) nodes. The BM nodes may be used to implement data buffers and provide access to external (to the DMI) memory, such as Static Random Access Memory (SRAM) or Dynamic Random Access Memory (DRAM). The data buffers may be implemented as a combination of an on-chip buffer pool and a larger memory in off-chip SRAM or DRAM. It may be possible to omit the BM nodes if the kernels do not need access to any data buffers outside what they may already have. The interconnect subsystem may contain one or more data processing units or kernels. These kernels implement special data processing functions to assist with acceleration of various classes of data processing described earlier. Each kernel has an actual data processing unit and an associated ring agent. The ring agent implements the functionality to connect to the ring structure and capture any messages sent to itself.

Data Movement Manager (DMM)

Typically, an embedded processor implements the control path functionality needed for various functions implemented in the SSD Controller. These functions pertain to various classes of functions described earlier such as 1) Host storage interface processing; 2) background housekeeping operations; 3) reliability, availability, and security (RAS); and 4) in-storage computation (also known as application acceleration). It is possible that some of the control paths functions may be implemented in hardware or combination of hardware and firmware. The control path performs the orchestration of data processing in the data path as needed to implement the actual applications. As part of such orchestration the embedded processor may send a set of data movement instructions, typically referred as DMA (Direct Memory Access) descriptors to the DMM module. The DMM module may maintain an Outstanding DMA Descriptor Table (ODMADT). The DMM module may track the execution of the DMA descriptors using this table. There are basically four processes or threads in DMM performing various activities: 1) Orchestrator interface; 2) Data Available (DA)/-Space Available (SA) polling; 3) Data Move Command scheduling; and 4) Data Move Command Acknowledgment processing.

Outstanding DMA Descriptor Table (ODMADT)

The ODMADT is a central data structure that is used and maintained by various DMM processes. All the active DMA descriptors are maintained in the ODMADT table.

Certain data provided by the embedded processor (also termed the orchestrator), such as descriptor ID, total length of data to be moved, the type of data movement (from BM to BM or kernel, or from kernel to kernel or BM), the identifiers of the source and destination of the data, and any flags, may be copied from the DMA descriptors received from the orchestrator. Other data, such as the remaining length of data to be moved, the data available at the source, the space available at the destination, any active command identifiers and the amount of data in transit, along with a flag identifying which entries in the ODMADT are valid, may be used to track the progress of execution.

The ODMADT may also store other miscellaneous fields such as Status, Start-of-Batch (SOB), and End-of-Batch (EOB) maintained in this table as necessary.

Orchestrator Interface Process

The DMM module receives DMA descriptors from the orchestrator and sends back the completion status. For every DMA descriptor executed by DMM, the DMM may provide completion status.

As discussed above, all the active DMA descriptors may be tracked by DMM using the ODMADT. When the DMM receives a DMA descriptor for execution from the orchestrator, the Orchestrator Interface may allocate an empty entry in the ODMADT table. The Orchestrator Interface may then copy the relevant DMA descriptor fields to the table. The Orchestrator Interface may also initialize other fields of a newly allocated entry. When a DMA descriptor is fully executed, the Orchestrator Interface this module send the status back to the orchestrator. At that point, the DMM may deallocate the corresponding entry and reset the valid bit.

Data Available/Space Available (DA/SA) Poll Process

The DMI subsystem may achieve non-blocking, high throughput operation. The DA/SA Poll process may gather the amount of data and space currently available at various nodes and record the gathered information in the ODMADT table. The DA/SA Poll process may scan the ODMADT table for all the valid entries, and for each valid entry it may query for the DA/SA information. The DA/SA information may be gathered using special control command messages sent on the control ring. The DA/SA Poll process may send a data available command message to the source node and receives back the data available information through a data available acknowledgment message. The data available acknowledgment message may also contain Start-of-Batch (SOB) and End-of-Batch (EOB) flags. These SOB/EOB flags may be used to support the DMA descriptors that do not know the transfer length a priori. Similarly the DA/SA Poll process may send a space available command message to the destination node and receives the space available information back through a space available acknowledgment message. The DA/SA Poll process may take into account any Data Move command messages in flight using the "Active CID" and "Active Length" fields in the ODMADT. When a Data Move command message is in flight, this process may skip the DA/SA gathering for the associated nodes.

Data Move Command Scheduling Process

This DMM module actually initiates the data transfers needed to execute the DMA descriptors. The data transfers may be initiated by sending Data Move command messages to the source node. Upon receiving the Data Move command message, the source node may send the specified amount of data to the specified destination node using a Data Move response message. Upon receiving the data, the destination node in turn may provide the data to its local data processing unit or kernel. When complete data is received, the destination node may send Data Move acknowledgment message to the DMM to indicate that the data transfer is complete. The details of the Data Move command message, Data Move response message, and Data Move acknowledgment command messages are described in the subsequent sections.

The data movements between source and destination nodes may be performed at some granularity or quantum. That is to say, the requested total transfer length may be broken into multiple Data Move command messages of variable quantum sizes. This may be done to achieve Quality of Service (QoS) between various other DMA descriptor executions in flight at that point in time. The Data Move Command Scheduler may take into account the amount data and space available, quality of service or other flags for the active descriptors, and other possible parameters and/or configurations in selecting the next descriptor for data transfer. Once the descriptor is selected, the Data Move Command Scheduler may determine the right transfer size for that instance. Apart from QoS considerations, the transfer size may meet the data available and space available limitations as recorded in the ODMADT table. That is to say, the Data Move Command Scheduler should not schedule any data transfer that exceeds available data or available space. This criterion may be used to avoid blocking of the data rings and simplify ring agent design. The source data ring agents may provide data up to their advertised DA status and the destination data ring agents may receive data up to their advertised SA status. In this manner the data rings do not experience back-pressure or flow control due to lack of data or space availability. This type of data transfer operations result in very high throughput and no bandwidth wastage due to head-of-line blocking or idle bubbles in the data rings. The Data Move Command Scheduler may also consider QoS and other flags in selecting the amount of data to transfer: the amount of data to transfer may be less than either the data available and the space available.

The DMM may support DMA descriptors with zero length values as a special case. A zero length value may be used as a wild card to indicate that data transfer size is not known a priori. In this case Start-of-Batch (SOB) and End-of-Batch (EOB) flags reported by the data source node may be used for data transfer operations. That is, the Move Data command messages are scheduled until the data source node reports EOB. In other words, the length of zero value is used to transfer all the data belonging to a single batch.

The Data Move Command Scheduler process may insert command identifiers (CIDs) and ODMADT Entry numbers in each Data Move command message so that those fields can be used to process the data transfer completions. The Data Move Command Scheduler may also update the ODMADT fields such as DA, SA, Active CID, and Active Length for every Data Move command message it issues.

The Data Move Command Scheduler may employ various QoS policies and cost functions to achieve optimal data movement performance. The Data Move Command Scheduler may also specify which data ring to be used for individual data transfers. It may use other control messages such as ping commands and ping acknowledgments to learn details of the data ring topology. It may use such gathers information in its scheduling algorithm.

Data Move Command Acknowledgment

Once the DMM scheduler sends a Data Move command message to a source node, there can be a finite amount of time before data actually reaches the destination node. Hence the ODMADT table status is not updated until the Data Move acknowledgment message is received (from the destination node) by the DMM. The destination node sends a Data Move acknowledgment message for every chunk of data it receives. The Data Move acknowledgment message may contain the same CID and ODMADT Entry number fields from the Data Move response message. The Data Move Command Acknowledgment process may receive the Data Move acknowledgment message and may extract the CID, ODMADT Entry number, and status fields. The Data Move Command Acknowledgment process may then update the appropriate ODMADT entry. The Data Move Command Acknowledgment process may decrement the Remaining Length field and reset the Active CID and Active Length fields. The Data Move Command Acknowledgment process may update any other flags so that Data Move Command Scheduling process may schedule the next data transfer operations if needed. Similarly, the received Data Move acknowledgment message may happen to be the last data transfer operation for that DMA descriptor. In that case, the Remaining Length field may become zero, which would trigger the DMA Orchestration Interface process to send the completion status to the orchestrator. The details of the Data Move acknowledgment message are described in other sections.

Ring Agent

A Ring Agent is a generic module that attaches a data processing unit or kernel to the Data Movement Interconnect (DMI). Each instance of the Ring Agent is supplied with its own unique node identifier. The following are the primary functions performed by the Ring Agent.

Receive control and data messages

Filter control and data messages targeted to itself and forward rest of the messages Process the control messages targeted to itself, i.e., generate appropriate response messages Transmit and receive data blocks as directed by DMM module Data interface with its local data processing unit or kernel A Control Message Receive module may receive control messages from the previous node and filters any messages destined for itself. The captured messages are given to the Control Message Processor for further processing while rest all messages are sent to the Control Message Transmit module for forwarding.

The Control Message Transmit module may transmit the received non-local messages and the locally generated messages to the next node. The Control Message Transmit module may handle the back pressure from the next node on the ring during message transmission. The non-local messages that are being forwarded and the locally generated messages are multiplexed in a round-robin manner. The round-robin arbitration makes sure that the previous nodes are not starved. It may be possible to implement other bandwidth sharing methods such as Deficit Round Robin (DRR), and Weighted Round Robin (WRR) etc. as well.

A Control Message Processor module may process the messages targeted to that node. The Control Message Processor module may generate appropriate response messages when needed and provides them to the Control Message Transmit module for transmission. This module may also interface with a Data Message Processor to initiate data transfers in response to Move Data (MD) command message. The Control Message Processor module may also receive Move Data acknowledgment messages from the Data Message Processor for transmission on the control ring. The Control Message Processor module may also receive the local Space Available and Data Available status either directly from the local data processing unit or kernel.

A Data Message Receive module may primarily receive Data Move response messages from the previous node. These messages may be used for performing actual data transfers. The Data Message Receive module may filter any messages destined for itself and the received data is deposited into outgoing data FIFO. The non-local data messages may be sent to a Data Message Transmit module for forwarding.

The Data Message Transmit module transmits the received non-local messages and the locally generated messages to the next node. This module handles the back pressure from the next node on the ring during message transmission. The non-local messages that are being forwarded and the locally generated messages may be multiplexed in a round-robin manner. The round-robin arbitration makes sure that the previous nodes are not starved. It may be possible to implement other bandwidth sharing methods such as Deficit Round Robin (DRR), and Weighted Round Robin (WRR) etc. as well.

A Data Message Processor module may primarily multiplex the data blocks received from the dual data rings and deposit them into the ingress data FIFO. The Data Message Processor module may also construct Data Move response messages using the data from egress data FIFO. The Data Message Processor module may provide these locally generated Data Move response messages to the Data Message Transmit module for transmission. The selection of Data Ring 1 or Data Ring 2 for transmission may be based on the input received in the Data Move (MD) command message on the control ring.

The ingress and egress data FIFOs may be used as transit storage. It may be possible to use these FIFOs as clock boundary crossing as well to enable different clock frequencies for Ring Agent and the data processing unit or kernel. That is to say, it may be possible that the Data Movement Interconnect (DMI) and the data processing units or kernels may have different clock frequencies and performance parameters.

The Ring Agent based data movement architecture may facilitate scalability of data processing kernels. Independent of number of data processing kernels, the physical interconnect buses have only one hop between two neighboring nodes. This structure enables less routing complexity and better timing achieving higher clock frequency and thus higher bandwidth for the interconnect subsystem.

The width of the data rings may be configurable and parameterized to support different use case requirements. The Ring Agent may contain serialize and de-serialize mechanisms to handle the internal data widths and the configured data ring width.

SSD Controller with Integrated DMI

In one embodiment of the inventive concept, the Data Movement Interconnect (DMI) may be directly integrated within the SSD Controller. The SSD Controller may contain a Host Interface Layer (HIL), a Flash Translation Layer (FTL), a Flash Channel (FC), a DDR Controller, as well as embedded control processors. The HIL module may implement a host register interface, such as NVMe and processes host I/O commands. The FTL module may perform logical address to physical address translation. The FC module may implement flash media protocols such as ONFI and Toggle. The DDR Controller may be used to access off-chip SRAM or DRAM memory. The control path as well as acceleration kernel orchestration tasks may be implemented using one or more embedded processors. Such integrated SSD Controller may implement one or more data processing acceleration kernels that are connected to each other using DMI interconnect subsystem.

SSD Controller with External Co-Processor Using DMI

In another embodiment of the inventive concept, it may be possible to implement the data processing kernels in an external Field Programmable Gate Array (FPGA) or an Application-Specific Integrated Circuit (ASIC) that is connected to the SSD Controller as a co-processor. In such implementation, the data processing kernels as well as the DMI interconnect may be present in the FPGA or ASIC co-processor. The SSD Controller may interface with such co-processor to provide acceleration orchestration information such as DMA descriptors. The data may be exchanged using another dedicated interface with or without shared memory.

FIG. 1 shows a machine designed to use a Solid State Drive (SSD) supporting acceleration using a Data Movement Interconnect (DMI), according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be managed by memory controller 120. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system (not shown in FIG. 1) under which various applications (also not shown in FIG. 1) may be running. These applications may issue requests to read data from or write data to SSD 125: a file system (also not shown in FIG. 1) may support such data requests.

Machine 105 may also include Solid State Drive (SSD) 125, which may be controlled by device driver 130. SSD 125 may be used to store data accessed by machine 105. For example, when machine 105 is used for DNA sequence analysis, SSD 125 may store the DNA sequences. Although the description below focuses on using SSD 125 for data storage, embodiments of the inventive concept may include other storage media as appropriate, such as hard disk drives or memory 115. SSD 125 may also be a Key-Value SSD (KV-SSD), where data is stored in objects that are accessed via keys: when the KV-SSD receives a key, the KV-SSD may map that key to the location where the object is stored to read the data (or to write, update, or invalidate data, as appropriate to the request). SSD 125 may be used to store data that may be termed "long-term": that is, data expected to remain present for extended periods of time. Examples of such data may include information about customers, configuration data, data that may be processed by applications at varying times over the life of machine 105, and the like.

Note that terms such as "long-term" and "short-term" are not necessarily separated by a bright line (say, for example, that data that is stored for less than five minutes is "short-term" and data that is stored for more than five minutes is "long-term"). Rather, these terms are defined by an expected lifetime for the data combined with the intended storage location for the data. Thus, for example, a file that the application wants stored on SSD 125 may be considered long-term data even though it may be a temporary file that the application will delete shortly, while data that the application is in the process of generating and will be eventually be stored (in SSD 125) for use over the coming years may be considered short-term while stored in memory 115.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines.

Figure 2:
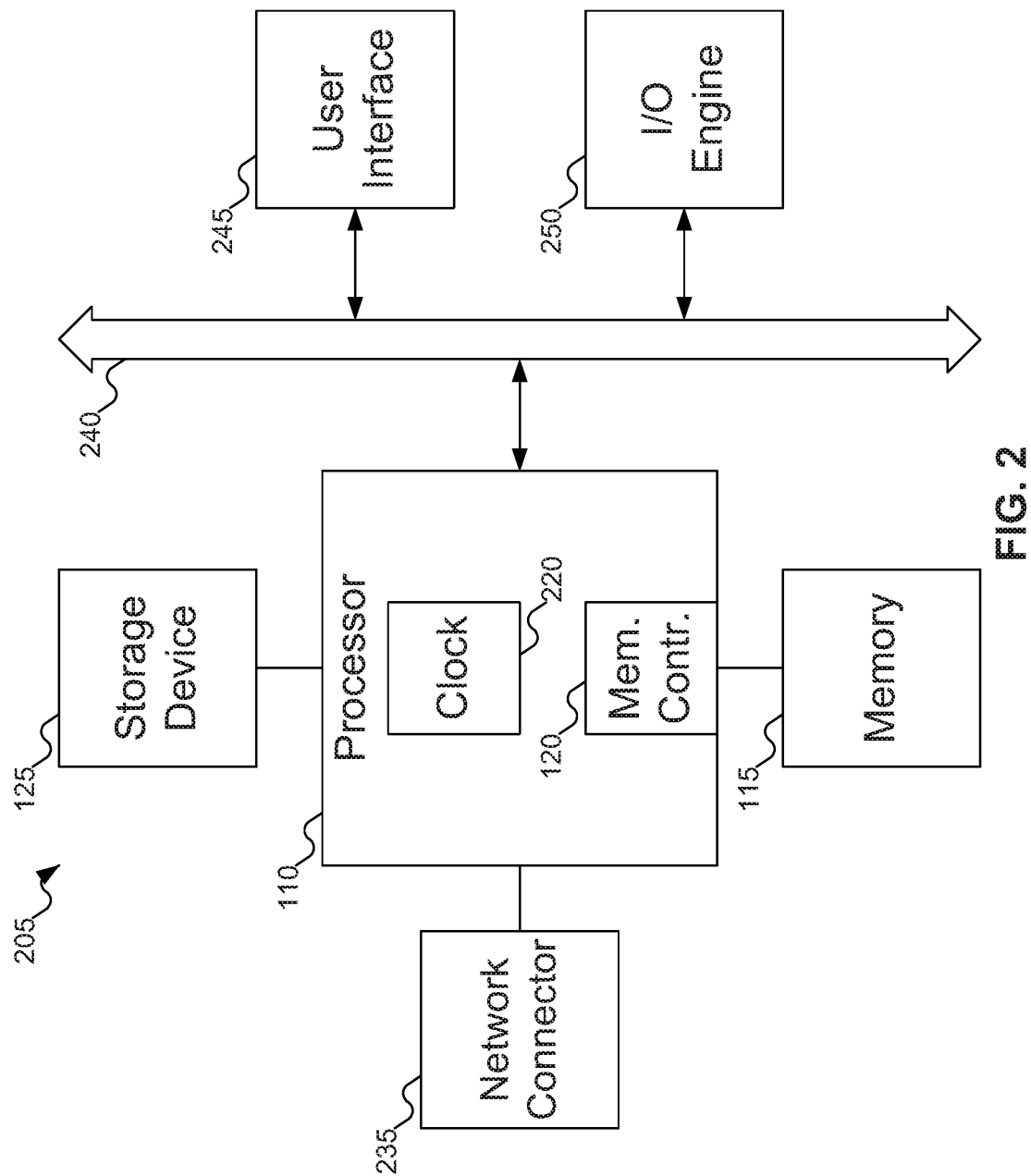
FIG. 2 shows additional details of the machine of FIG. 1.

FIG. 2 shows additional details of the machine of FIG. 1. In FIG. 2, typically, machine 105 includes one or more processors 110, which may include memory controllers 120 and clocks 205, which may be used to coordinate the operations of the components of machine 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3A:
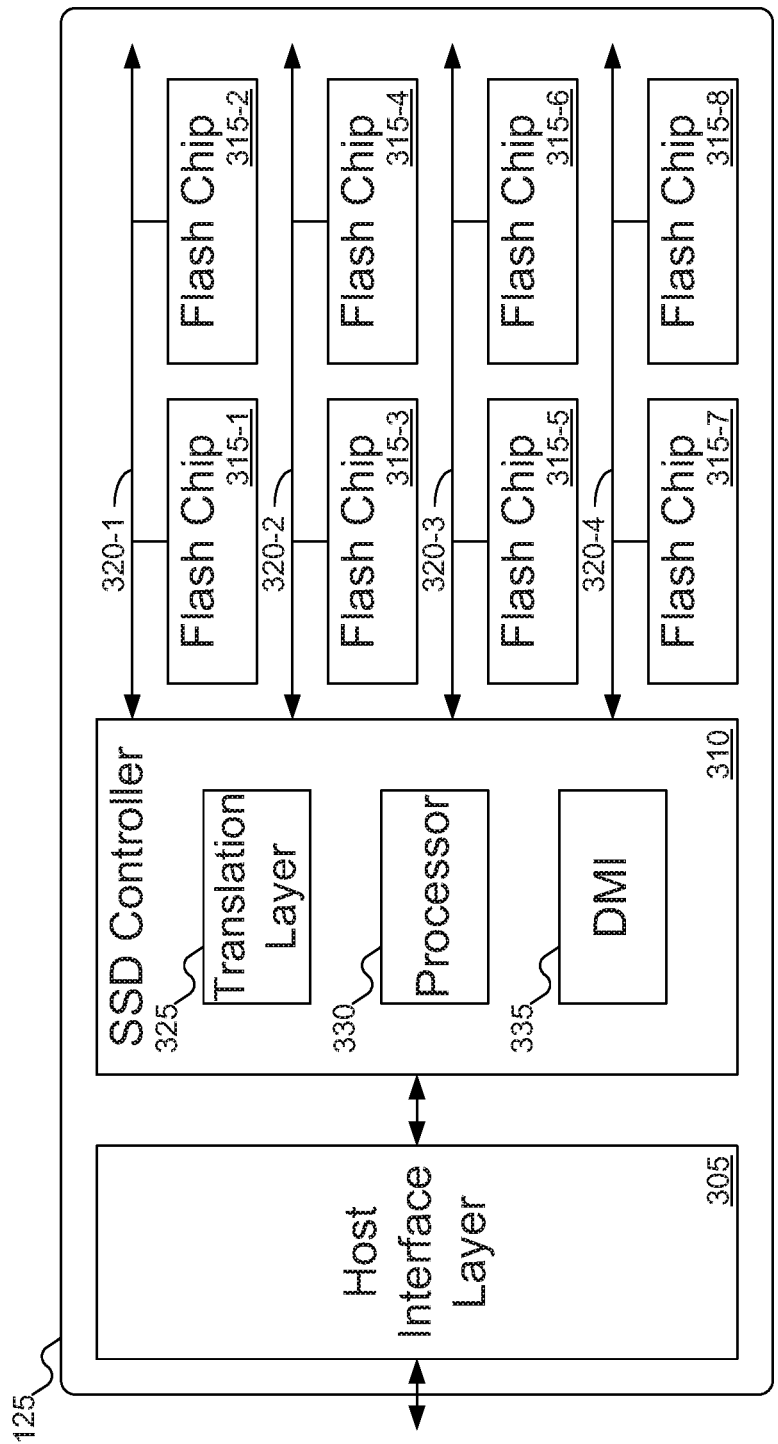
FIGS. 3A-3B show details of the SSD of FIG. 1 in various embodiments of the inventive concept.
Figure 3B:
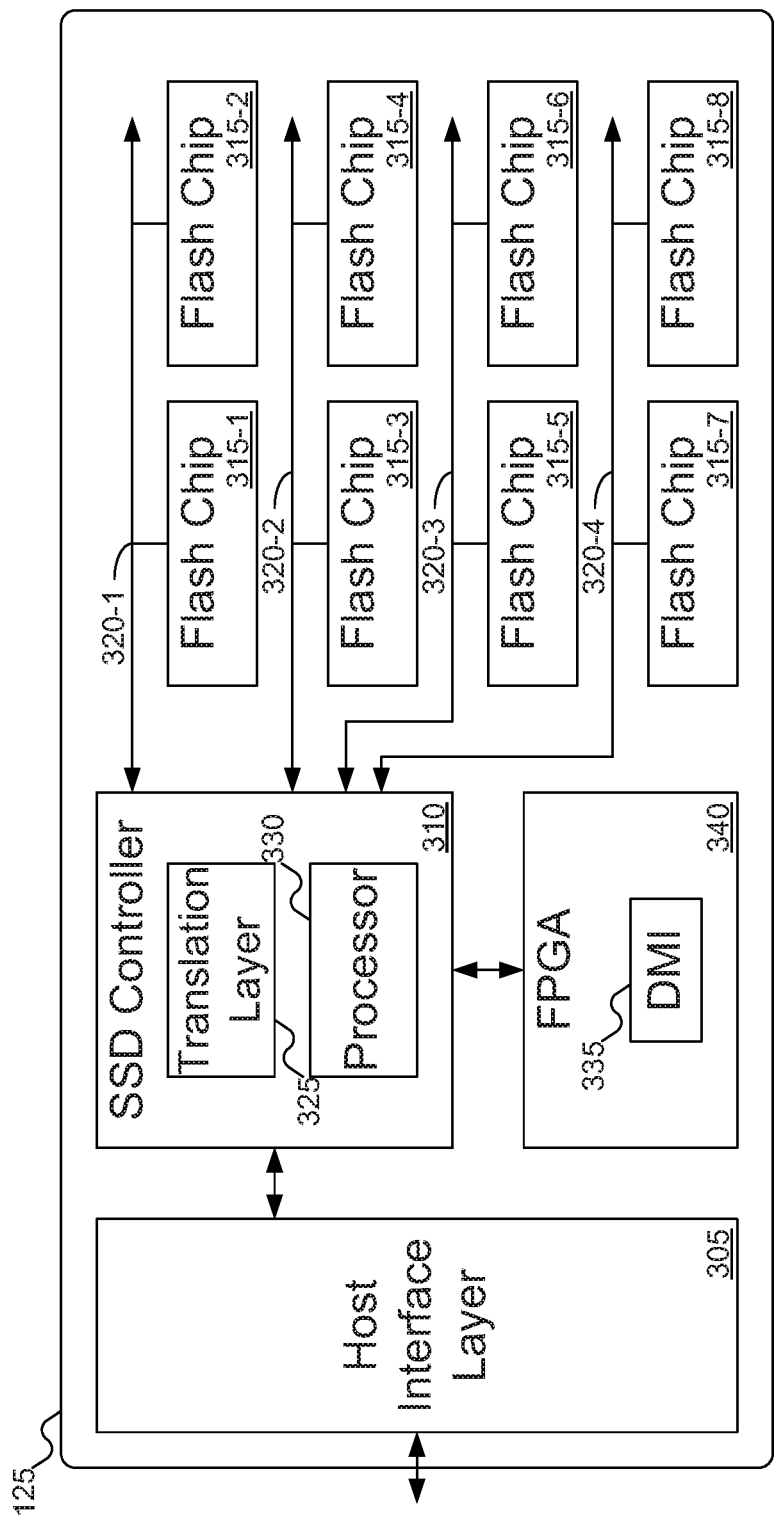

FIG. 3A-3B show details of SSD 125 of FIG. 1 in various embodiments of the inventive concept. In FIG. 3A, SSD 125 may include host interface layer (HIL) 305, SSD controller 310, and various flash memory chips 315-1 through 315-8 (also termed "flash memory storage"), which may be organized into various channels 320-1 through 320-4. Host interface logic 305 may manage communications between SSD 125 and machine 105 of FIG. 1. These communications may include read requests to read data from SSD 125 and to write data to SSD 125. SSD controller 310 may manage the read and write operations, along with garbage collection and other operations, on flash memory chips 315-1 through 315-8 using a flash memory controller (not shown in FIG. 3A).

SSD controller 310 may include translation layer 325 (sometimes referred to as flash translation layer (FTL)). Translation layer 325 may perform the conventional functions of translating logical block addresses (LBAs) into physical block addresses (PBAs) where the data is actually stored. In this manner, machine 105 of FIG. 1 may use its own address space to reference data, without having to know the physical addresses on SSD 125 where the data is actually stored. This may be beneficial when, for example, data is updated: since SSD 125 may not update data in place, SSD 125 may need to invalidate the existing data and write the update to a new PBA on SSD 125. Or, if the data is stored in a block that is selected for garbage collection, the data may be written to a new block on SSD 125 before the block is erased. By updating translation layer 325, machine 105 of FIG. 1 does not need to concern itself with where the data is actually stored as data is moved to different PBAs.

SSD 125 may also include processor 330, which may execute instructions that govern how to use SSD 125. Processor 330 may also be used for in-storage compute functionality, to execute operations locally on SSD 125 instead of on processor 110 of FIG. 1. Processor 330 may be responsible for sending Direct Memory Access (DMA) descriptors to Data Movement Interconnect (DMI) 335 (in which case processor 330 may also be termed an "orchestrator").

Finally, SSD 125 may include DMI 335. Details of DMI 335 are presented below with reference to FIG. 4.

While FIG. 3A shows SSD 125 as including eight flash memory chips 315-1 through 315-8 organized into four channels 320-1 through 320-4, embodiments of the inventive concept may support any number of flash memory chips organized into any number of channels. Similarly, while FIG. 3A shows SSD controller 310 as including processor 330 and DMI 335, embodiments of the inventive concept may place these elements in other locations. For example, as shown in FIG. 3B, DMI 335 might be implemented in co-processor 340, such as a Field Programmable Gate Array (FPGA) or an Application-Specific Integrated Circuit (ASIC): in such embodiments of the inventive concept, communication may occur between SSD controller 310 and co-processor 340. Similarly, processor 330 may be located outside SSD controller 310. Other possible locations for processor 330 and DMI 335 may include other locations within SSD 125 but outside SSD controller 310 (for example, before host interface layer 305), or even outside SSD 125 entirely. Nor do processor 330 and co-processor 340 need to be in the same location, as long as they can communicate. For more discussion regarding the relative location of FPGA 335 and SSD 125, refer to co-pending U.S. patent application Ser. No. 16/435,442, filed Jun. 7, 2019, and its parent applications U.S. patent application Ser. No. 16/260,087, filed Jan. 28, 2019, U.S. patent application Ser. No. 16/226,629, filed Dec. 19, 2018, U.S. patent application Ser. No. 16/207,080, filed Nov. 30, 2018, U.S. Provisional Patent Application Ser. No. 62/745,261, filed Oct. 12, 2018, U.S. Provisional Patent Application Ser. No. 62/818,096, filed Mar. 13, 2019, and U.S. Provisional Patent Application Ser. No. 62/733,077, filed Sep. 18, 2018, all of which are incorporated by reference herein for all purposes.

Figure 4:
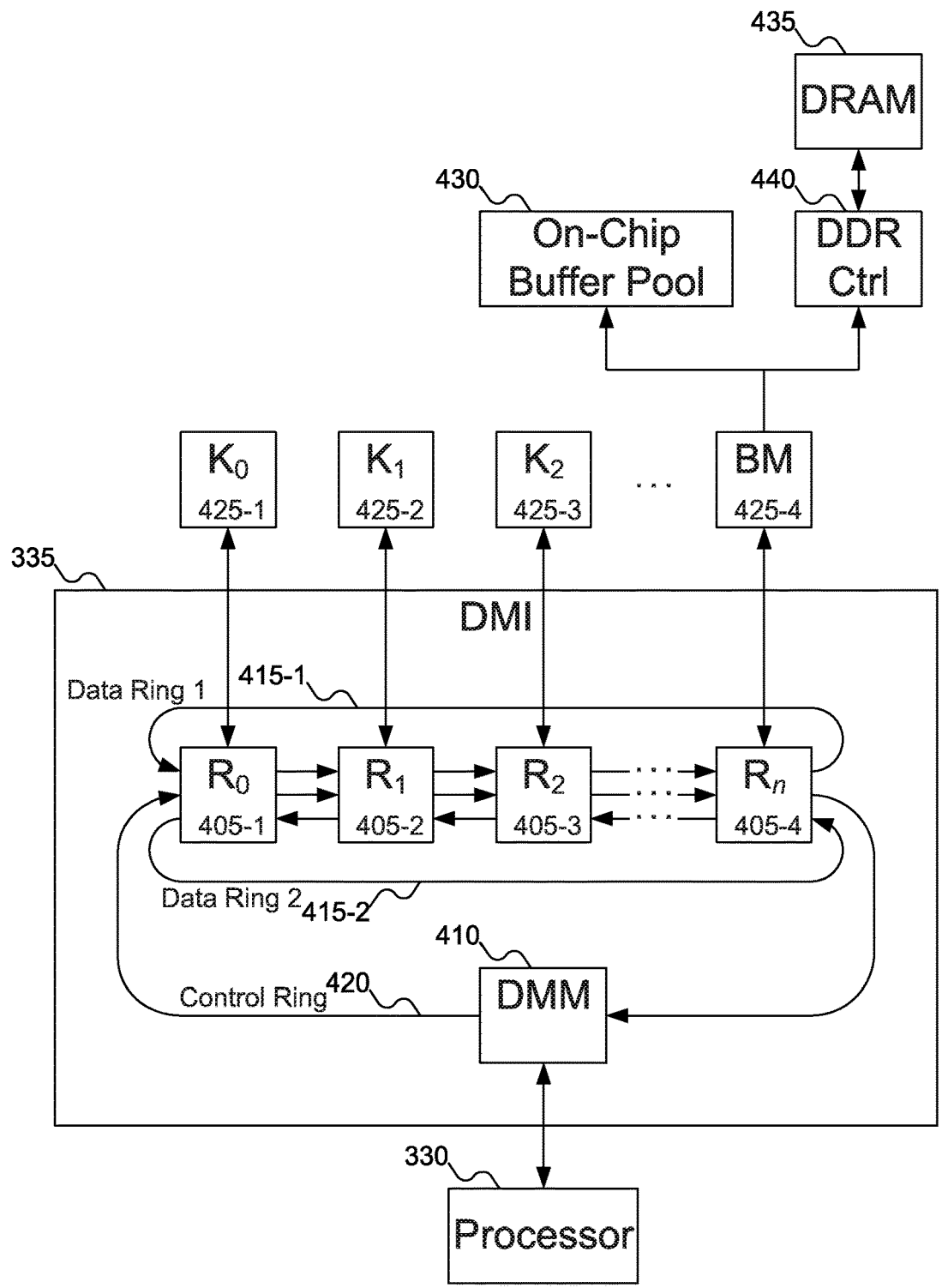
FIG. 4 shows details of the DMI of FIGS. 3A-3B.

FIG. 4 shows details of DMI 335 of FIGS. 3A-3B. FIG. 4 provides an abstract representation of the elements involved in DMI 335: different terminology may be used to describe various elements, and not all elements are necessarily arranged as shown in FIG. 4. For example, the kernels and Buffer Manager shown in FIG. 4 are depicted as "outside" DMI 335 (which may be technically correct, as these elements are processor elements, rather than elements involved in the movement of data). But as the kernels and the Buffer Manager are connected to the ring agents, they may also be thought of as part of DMI 335, in the sense that they represent the elements that perform work on the data being moved around via DMI 335.

In FIG. 4, DMI 335 is shown as including various ring agents 405-1 through 405-4, Data Movement Manager (DMM) 410, two data rings 415-1 and 415-2, and control ring 420. DMM 410 communicates with orchestrator 330. Orchestrator 330 sends DMA descriptors to DMM 410, which identify what data is to be moved from one node to another, and DMM 410 implements these instructions. DMM 410 may also return a result to orchestrator 330 reporting when a DMA descriptor has been completed.

To follow through on a DMA descriptor, DMM 410 may send commands (also termed "requests") on control ring 420. Ring agents 405-1 through 405-4 may receive these commands: upon identifying that a particular command is intended for a particular ring agent 405-1 through 405-4, that ring agent may terminate the command and execute the instructions contained therein. These instructions may be to do nothing, to return some information about the node (via control ring 420), or to move data to another ring agent 405-1 through 405-4 (via data rings 415-1 or 415-2).

By using data rings 415-1 and 415-2 to move data, and using control ring 420 for all other commands and acknowledgments, dedicated paths for transmitting data are provided. Further, by using more than one data ring 415-1 and 415-2, there are options as to which data ring to use: DMM 410 may select the data ring that may result in the data being moved more efficiently. This selection may be based on the number of hops between the source and destination on data rings 415-1 and 415-2, the number of data move responses currently being transmitted around data rings 415-1 and 415-2 (if one data ring is busy carrying a relatively large number of move data responses, the other data ring might be more efficient to transmit a new move data response), and the priority of the data or other Quality of Service guarantees associated with the application for which the data is being moved (some DMA descriptors may have a higher priority than others, and the data ring to send the move data response may be selected to favor higher priority data move responses: for example, high priority data move responses may be sent on the data ring with the fewest number of hops between the source and destination nodes, whereas low priority data moves might be sent on the data ring with the highest number of hops). DMM 410 may also consider other factors in selecting the data ring on which the move data response should be sent.

In FIG. 4, two data rings 415-1 and 415-2 are shown. In addition, data ring 415-1 places ring agents 405-1 through 405-4 in the same order as control ring 420, and data ring 415-2 places ring agents 405-1 through 405-4 in the reverse order. In some embodiments of the inventive concept this implementation may be chosen. Such embodiments of the inventive concept have the advantage that messages sent along control ring 420 may be used to learn the topology of data rings 415-1 and 415-2. However, embodiments of the inventive concept may also support data rings where there is no relationship between the arrangement of ring agents 405-1 through 405-4 on data rings 415-1 and 415-2 and the arrangement of ring agents 405-1 through 405-4 on control ring 420. In such embodiments of the inventive concept, DMM 410 may need to query ring agents 405-1 through 405-4 to determine their arrangement on data rings 415-1 and 415-2: how such a query might be accomplished is discussed further with reference to FIG. 34 below. In addition, there may be more than two data rings 415-1 and 415-2 without limitation: FIG. 4 merely illustrates an embodiment of the inventive concept with only two data rings 415-1 and 415-2.

Ring agents 405-1 through 405-4 handle the message traffic on data rings 415-1 and 415-2 and control ring 420. When ring agents 405-1 through 405-4 receive a message that is intended for them, ring agents 405-1 through 405-4 may terminate that message and process it. When ring agents 405-1 through 405-4 receive a message that is not intended for that ring agent, ring agents 405-1 through 405-4 may forward the message along the same ring to the next ring agent along that ring. The structure of ring agents 405-1 through 405-4 is discussed with reference to FIG. 10 below. Note that potentially any of ring agents 405-1 through 405-4 (and DMM 410, for messages sent on control ring 420) may initiate a message and send it along any of data rings 415-1 and 415-2 or control ring 420.

Each ring agent 405-1 through 405-4 handles messages intended for an associated node, and each node has an associated ring agent. Thus, for example, kernels 425-1 through 425-3 are shown as having associated ring agents 405-1 through 405-3, respectively, and Buffer Manager 425-4 is shown as having associated ring agent 405-4. While FIG. 4 shows three kernels 425-1 through 425-3 and one Buffer Manager 425-4, embodiments of the inventive concept may include any number of kernels (although most embodiments of the inventive concept would include at least two kernels), and any number of Buffer Managers (with corresponding changes in the number of ring agents associated with these kernels and Buffer Managers).

Kernels 425-1 through 425-3 may be considered to be processing elements capable of executing a particular function on data. For example, kernels 425-1 through 425-3 may implement specific reliability, availability, and security (RAS) functions, such as data compression and decompression, encryption and decryption, error recovery; or kernels 425-1 through 425-3 may implement specific functions requested by applications running on host machine 105 of FIG. 1. Kernels 425-1 through 425-3 may be designed specifically to implement specific functions, or they may be programmable (in the sense that the functions performed by kernels 425-1 through 425-3 may be dynamically changed as needed orchestrator 330). Kernels 425-1 through 425-3 may have local storage (not shown in FIG. 4) for data upon which kernels 425-1 through 425-3 are executing functions.

Buffer Manager 425-4 may support accessing data to be used by kernels 425-1 through 425-3. Buffer Manager 425-4 may access on-chip buffer pool 430, which may buffer data, or to data stored in memory 435 via memory controller 440. Although memory 435 is shown as DRAM, embodiments of the inventive concept may support any type of memory 435, similar to memory 115 of FIG. 1. Memory controller 440 may manage access to data in memory 435, and may operate similarly to memory controller 120 of FIG. 1. Memory controller 440 may be part of SSD Controller 310 of FIGS. 3A-3B (particularly in embodiments of the inventive concept where DMI 335 is part of SSD Controller 310 of FIG. 3A), or memory controller 440 may be a memory controller implemented as part of co-processor 340 of FIG. 3B (and separate from any memory controller that might be implemented as part of SSD Controller 310 of FIG. 3B).

Throughout this document, the term "node" is intended to describe either a kernel or a Buffer Manager, as ring agents 405-1 through 405-4 may support either a kernel or a Buffer Manager without limitation. But the term "node" should not be understood to necessarily exclude ring agents 405-1 through 405-4 as being part of a "node": context may suggest that ring agents 405-1 through 405-4 are part of a "node" without conflict. For example, a reference to a "node" receiving a message may be understood to mean that the ring agent associated with a particular kernel or Buffer Manager has received the message. In general, however, this document attempts to use the term "node" to refer to the kernel or Buffer Manager, rather than including the associated ring agent.

It is important to recall that DMI 335 is not necessarily responsible for instructing kernels 425-1 through 425-3 to execute functions on data: that responsibility may still lie with orchestrator 330. Recall that in conventional solutions of in-storage computing, at some point the in-storage processor may be instructed to execute some function on data. This responsibility is not necessarily changed by using DMI 335. DMI 335 simplifies the movement of data between nodes, but execution of functions on data that might be moved using DMI 335 may remain unchanged.

Figure 5:
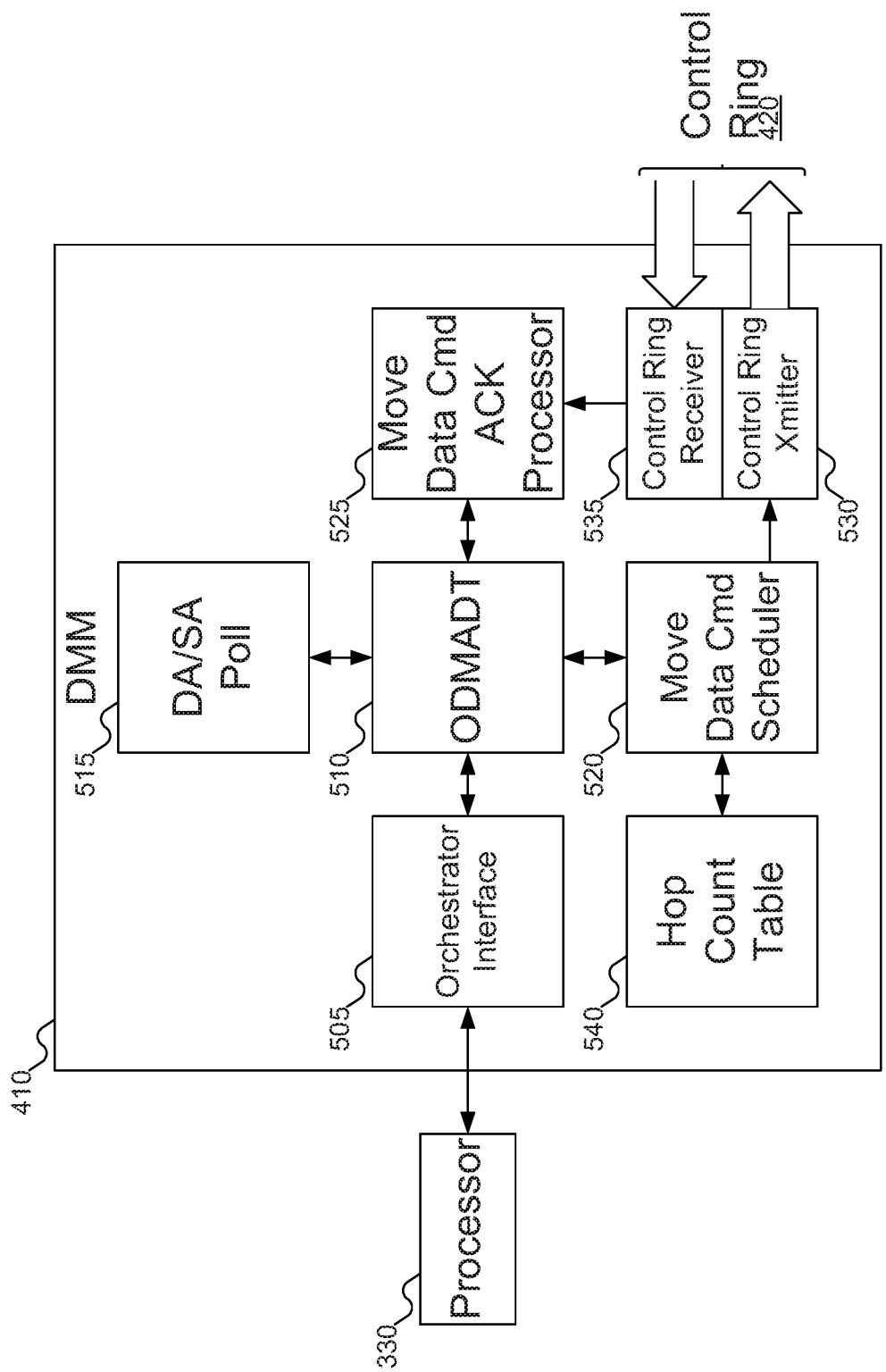
FIG. 5 shows details of the Data Movement Manager (DMM) of FIG. 4.

FIG. 5 shows details of DMM 410 of FIG. 4. In FIG. 5, DMM 410 is shown as including orchestrator interface 505, Outstanding DMA Descriptor Table (ODMADT) 510, data available/space available poll 515, move data command scheduler 520, and move data command acknowledgment processor 525. Orchestrator interface 505 may receive DMA descriptors from orchestrator 330, and may use that information to update ODMADT 510. The operations of orchestrator interface 505 are discussed further with reference to FIGS. 25A-25B below; ODMADT 510 is discussed further with reference to FIG. 6 below. Data available/space available poll 515 may query nodes 425-1 through 425-4 of FIG. 4 (via ring agents 405-1 through 405-4 of FIG. 4) for whether they have any data available to transmit or space available to receive data. The operations of data available/space available poll 515 are discussed further with reference to FIGS. 26A-26C below. Move data command scheduler 520 may schedule move data commands to transfer data from one node to another. Move data command scheduler 520 may send move data commands on control ring 420 via control ring transmitter 530. Finally, move data command acknowledgment processor 525 may process acknowledgments that move data commands have been successfully completed received from ring agents 405-1 through 405-4 of FIG. 4 on control ring 420 via control ring receiver 535. The operations of move data command scheduler 520 and move data command acknowledgment processor 525 are discussed further with reference to FIGS. 27A-30 below.

While FIG. 5 shows only move data command scheduler connected to control ring transmitter 530, and only move data command acknowledgment processor 525 connected to control ring receiver 535, other components within DMM 410 may also connect to control ring transmitter 530 and control ring receiver 535. For example, data available/space available poll 515 may also use control ring transmitter 530 and control ring receiver 535 to poll ring agents 405-1 through 405-4 of FIG. 4 for the data available and/or space available at their associated nodes. Other components within DMM 410 (or, more generally, DMM 410 itself) may use control ring transmitter 530 and control ring receiver 535 to exchange information with ring agents 405-1 through 405-4 of FIG. 4. For example, the commands and acknowledgments discussed below with reference to FIGS. 11-18 and 20 may be sent or received by DMM 410 via control ring 420.

In addition to the above elements, DMM 410 may also include hop count table 540. Hop count table 540 may store information about the relative locations of ring agents 405-1 through 405-4 of FIG. 4 on data rings 415-1 and 415-2 of FIG. 4, and therefore the number of hops between any pair of ring agents 405-1 through 405-4 of FIG. 4 to transfer data. Hop count table is discussed further with reference to FIG. 7 below.

FIG. 6 illustrates an example of ODMADT 510 of FIG. 5, according to an embodiment of the inventive concept. In FIG. 6, ODMADT 510 is shown including seven number of entries (shown as rows in FIG. 6): some valid, others not. Valid entries may represent outstanding DMA descriptors sent from orchestrator 330 of FIGS. 3A-3B that have not yet been completed (that is, DMA descriptors that have been received from orchestrator 330 of FIGS. 3A-3B and for which DMI 335 of FIGS. 3A-3B has not finished moving data); free (or invalid) entries may represent entries in ODMADT 510 which may yet be filled with new DMA descriptors. While FIG. 6 shows no data for free entries in ODMADT 510, this fact does not mean that no data is actually stored in ODMADT 510 for these entries, but rather that whatever data might be stored in these entries is of no value and may be ignored or overwritten. For example, the first entry in ODMADT 510 may have previously held a DMA descriptor, but with that DMA descriptor having been completed the data in that entry may be overwritten when a new DMA descriptor is received from orchestrator 330 of FIGS. 3A-3B.

When orchestrator interface 505 of FIG. 5 receives a new DMA descriptor from orchestrator 330 of FIG. 3, orchestrator interface 505 of FIG. 5 may select any free entry in ODMADT 510 to store the new DMA descriptor. Orchestrator interface 505 of FIG. 5 may perform this selection in any desired manner. For example, orchestrator interface 505 of FIG. 5 may search ODMADT 510 for a free entry. Or, orchestrator interface 505 of FIG. 5 may store a list (which may be implemented as a first-in, first-out (FIFO) queue, a last-in, first-out (LIFO) queue, or any other structure) that identifies free entries in ODMADT 510.

Once a free entry in ODMADT 510 is selected, orchestrator interface 505 of FIG. 5 may store information from the DMA descriptor in the selected entry in ODMADT 510, so that move data command scheduler 520 of FIG. 5 and move data command acknowledgment processor 525 of FIG. 5 may arrange for data to be moved between nodes as requested by the DMA descriptor. This information from the DMA descriptor may include the descriptor ID, the total length of data to be transferred, the type of transfer (whether the source is a kernel or a Buffer Manager, and whether the destination is a kernel or a Buffer Manager), identifiers of the source and destination nodes, and any flags pertinent to the data transfer (for example, the Quality of Service expected by the application for which the data transfer and function execution are being performed). Orchestrator interface 505 of FIG. 5 may also store other information in ODMADT 510, such as initializing the remaining length to the amount of data to be transferred from the source node to the destination node.

Other columns in ODMADT 510 may be used by other modules of DMM 410 of FIG. 4. Move data command scheduler 520 of FIG. 5 may store information in active command identifier (CID) and active length columns as move data commands are issued, storing the command ID assigned to the move data command and the amount of data being transferred from the source node to the destination node. For example, the entry in row two of ODMADT 510 of FIG. 6 shows that a move data command with the command ID of 23 is currently transferring 8 KB of data from source node 3 to the address 0x_12345678 (likely an address in memory 435 of FIG. 4, which implies that the destination node is Buffer Manager 425-4 of FIG. 4). Also consider the entry in row five of ODMADT 510 of FIG. 6: in particular, note the star in the data available column for that entry. The star may indicate that there is data available but the amount of data available is not known (and the data transfer may be managed using Start-of-Batch and End-of-Batch flags).

While FIG. 6 shows each valid entry in ODMADT 510 with only one associated command ID, embodiments of the inventive concept may support multiple command IDs for a single entry. For example, consider the situation where the amount of data being transferred by a particular command is less than either the data available at the source node or the space available at the destination node (which may occur, for example, to satisfy Quality of Service requirements for other DMA descriptors). If move data command scheduler 520 of FIG. 5 determines that additional data may now be transferred from the source node to the destination node, move data command scheduler 520 of FIG. 5 may schedule another move data command without waiting for the existing move data command to complete. (Recall that DMI 335 of FIGS. 3A-3B is intended to be high performance, scalable, and non-blocking: DMI 335 of FIGS. 3A-3B may operate under the assumption that any particular move data command will complete. And since the second move data command was issued after the first move data command, given the structure of control ring 420 of FIG. 4 and ring agents 405-1 through 405-4 of FIG. 4, commands may be expected to be carried out in the order issued.) Thus, an entry in ODMADT 510 may reflect multiple move data commands underway (with the active length field containing corresponding information for each move data command).

Move data command acknowledgment processor 525 of FIG. 5 may clear the values in the active CID and active length fields (or partially clear these values, if there are multiple move data commands underway), and may decrement the remaining length column, when it receives a move data acknowledgment. Data available/space available poll 515 of FIG. 5 may store information about the amount of data available at the source node and the amount of space available at the destination node in the data available and space available columns, respectively. In some embodiments of the inventive concept data available/space available poll 515 of FIG. 5 may operate at any time; in other embodiments of the inventive concept data available/space available poll 515 of FIG. 5 may operate to determine the data available at the source node and the space available at the destination node only when there are no active move data commands from the source node to the destination node for that DMA descriptor (since an active move data command would likely soon invalidate the results of such a poll anyway).

There may also be other columns used to store information in ODMADT 510 not shown in FIG. 6. For example, ODMADT 510 might store status information about DMA descriptors, or Start-of-Batch and/or End-of-Batch information. Embodiments of the inventive concept are intended to cover all such variations in the data stored in ODMADT 510.

While FIG. 6 shows example ODMADT 510 where every valid entry is currently performing a data transfer, embodiments of the inventive concept may include entries without active transfers underway. For example, move data command scheduler 520 of FIG. 5 may have several DMA descriptors to select from in scheduling data transfers: after one such DMA descriptor is selected, the other DMA descriptors may wait for move data commands to be scheduled.

While ODMADT 510 is shown including seven entries, embodiments of the inventive concept may include any number of entries (more or fewer than seven), without limitation. ODMADT 510 may also be organized as a single table (as shown), or data may be split across multiple tables, or data may be organized in any other desired data structure(s).

Returning to FIG. 5, regardless of the data structure used or the number of entries supported, the number of entries offered by ODMADT 510 may be finite (since it is limited by the available storage for ODMADT 510, whether in volatile or non-volatile storage). Thus, it may occur that orchestrator 330 may send a DMA descriptor requesting data be transferred between nodes, but ODMADT 510 may have no free (marked as invalid) entries in which the new DMA descriptor may be stored. In this situation, orchestrator interface 505 may inform orchestrator 330 that there are no available entries in ODMADT 510. In this manner, orchestrator 330 may be made aware to temporarily stop issuing DMA descriptors until an entry in ODMADT 510 becomes free. Once an entry in ODMADT 510 becomes free, orchestrator interface 505 may inform orchestrator 330 that entries in ODMADT 510 are now available and orchestrator 330 may once again issue DMA descriptors to DMM 410.

In some embodiments of the inventive concept, orchestrator interface 505 may inform orchestrator 330 voluntarily, as soon as ODMADT 510 is full or as soon as ODMADT 510 has an available entry. In other embodiments of the inventive concept, orchestrator interface 505 may inform orchestrator 330 that ODMADT 510 is full only when orchestrator 330 sends a DMA descriptor for which ODMADT 510 has no free entry. An advantage of the former embodiments of the inventive concept is that orchestrator 330 is aware at all times whether it may send a DMA descriptor or it should wait; in contrast, an advantage of the latter embodiments of the inventive concept is that fewer (potentially unnecessary) messages are sent from orchestrator interface 505 to orchestrator 330. As an example of the latter embodiments of the inventive concept, orchestrator 330 might be aware of the number of entries in ODMADT 510, and therefore may track for itself whether there is an available free entry in ODMADT 510 for a new DMA descriptor (orchestrator interface 505 may send a completion status to orchestrator 505 when a particular DMA descriptor is complete, at which point orchestrator 330 would know that the number of free entries in ODMADT 510 has increased by one). Or, even if orchestrator 330 does not track the number of valid entries in ODMADT 510, orchestrator 330 might not have any new DMA descriptors to send anyway, in which case it would not be necessary for orchestrator interface 505 to inform orchestrator 330 that ODMADT 510 is full.

Orchestrator interface 505 may communicate the state of ODMADT 510 to orchestrator 330 using any desired mechanism. For example, orchestrator interface 505 may send a message to orchestrator 330 to report the status of ODMADT 510. Or, orchestrator interface 505 may use registers to communicate the status of ODMADT 510: these registers may indicate whether ODMADT 510 has room for new DMA descriptors or not. Orchestrator 330 may also use this these registers to determine whether there are any outstanding DMA descriptors still being serviced by DMI 335.

FIG. 7 illustrates an example of hop count table 540 of FIG. 5, according to an embodiment of the inventive concept. In FIG. 7, hop count table 540 is shown as including locations of ring agents 405-1 through 405-4 along each data ring 415-1 and 415-2 of FIG. 4. (Hop count table 540 actually shows location information for three data rings: this fact will be addressed later.) Hop count table 540 may be populated using information from ping acknowledgments responsive to ping commands, discussed further with reference to FIGS. 12-13 below.

In hop count table, four nodes are represented: these nodes correspond to the nodes associated with ring agents 405-1 through 405-4 of FIG. 4. If there are more than four ring agents 405-1 through 405-4 of FIG. 4, then the number of rows in hop count table 540 may be adjusted accordingly. Hop count table 540 also shows the locations of ring agents 405-1 through 405-4 of FIG. 4 along control ring 420 of FIG. 4 as well as along the data rings: this information is presented more for illustration of how location information may be determined than because hop count table 540 may store the locations of nodes along control ring 420 of FIG. 4. As such, embodiments of the inventive concept may omit the column headed "Control Ring" in hop count table 540.

Hop count table 540 shows that, along control ring 420 of FIG. 4, node number 0 may be reached with one hop, node number 1 may be reached with two hops, node number 2 may be reached with three hops, and node number 4 may be reached with four hops. Combining the information in hop count table 540 with DMI 335 of FIG. 4, one may conclude that the node with identifier 0 is ring agent 405-1 of FIG. 4, the node with identifier 1 is ring agent 405-2 of FIG. 4, the node with identifier 2 is ring agent 405-3 of FIG. 4, and the node with identifier 3 is ring agent 405-4 of FIG. 4. Thus, the locations of ring agents 405-1 through 405-4 of FIG. 4 along data ring 415-1 of FIG. 4 puts ring agents 405-1 through 405-4 of FIG. 4 in the same relative locations, and the locations of ring agents 405-1 through 405-4 of FIG. 4 along data ring 415-2 of FIG. 4 is the reverse of the locations of ring agents 405-1 through 405-4 of FIG. 4 along data ring 415-1 of FIG. 4. Using the information in hop count table 540, the number of hops between any two data nodes along either of data ring 415-1 or 415-2 of FIG. 4 may be calculated as destination node location−source node location (if the destination node has a higher location number than the source node location number) or 4 (the total number of ring agents)+source node location−destination node location (if the source node has a higher location number than the destination node location number). Thus, for example, the number of hops from node number 0 to node number 1 along data ring 415-1 of FIG. 4 may be calculated as 2−1=1, whereas the number of hops from node number 0 to node number 1 along data ring 415-2 of FIG. 4 may be calculated as 4+1−2=3. This information may be used by move data command scheduler 520 of FIG. 5 in selecting which or data rings 415-1 and 415-2 of FIG. 4a particular move data response should be sent. For example, if data is being moved from node number 0 to node number 1, fewer hops are required along data ring 415-1 of FIG. 4, whereas the reverse is true when moving data from node number 1 to node number 0.

While hop count table 540 stores node identifiers starting at 0 and increasing numerically, node identifiers may be considered arbitrary data. When numeric node identifiers are used, there is no requirement that the node identifiers be assigned according to any pattern. Moreover, node identifiers may be non-numeric (for example, strings, combinations of characters and numbers, or any other desired data). The only requirement for node identifiers is that they be unique, so that there is no question which node is identified by which node identifier. Similarly, as long as the location information leaves it unambiguous where along each ring each ring agent is located, there is no requirement that node locations be sequential or even numeric (although using sequential numeric node identifiers results in a simple equation to determine the number of hops from one node to another along a ring).

While it is a simple exercise to locate ring agents 405-1 through 405-4 of FIG. 4 along data rings 415-1 and 415-2 of FIG. 4 when their arrangement is either identical to or a mirror image of their arrangement on control ring 420 of FIG. 4, locating ring agents 405-1 through 405-4 of FIG. 4 when there is no relationship between the arrangement of ring agents 405-1 through 405-4 of FIG. 4 on control ring 420 of FIG. 4 and data rings 415-1 and 415-2 of FIG. 4 is a different matter. DMM 410 of FIG. 4 is not on data rings 415-1 and 415-2 of FIG. 4. Therefore, DMM 410 of FIG. 4 may not directly query each ring agent 405-1 through 405-4 of FIG. 4 for its location on data rings 415-1 and 415-2 of FIG. 4. Further, ring agents 405-1 through 405-4 of FIG. 4 may not even be aware of their relative locations on data rings 415-1 and 415-2 of FIG. 4, further limiting such queries. (DMM 410 of FIG. 4 could be included on data rings 415-1 and 415-2 of FIG. 4, but the only benefit would be to locate ring agents 405-1 through 405-4 of FIG. 4 on data rings 415-1 and 415-2 of FIG. 4, and at the cost of potentially adding a hop between nodes on data rings 415-1 and 415-2 of FIG. 4).

Instead, DMM 410 of FIG. 4 may send a location command to any ring agent on control ring 420 of FIG. 4: for example, the first ring agent on control ring 420 of FIG. 4, but any ring agent may be used. (This first ring agent may be determined, for example, by sending ping commands to ring agents 405-1 through 405-4 of FIG. 4 and then selecting the ring agent associated with the node with the lowest hop count.) Upon receiving this location command, the recipient ring agent may send location responses along each of data rings 415-1 and 415-2 of FIG. 4, listing its node number as the first node along each ring. Each ring agent 405-1 through 405-4 of FIG. 4 along each data ring 415-1 and 415-2 of FIG. 4 may receive each location response in turn, add its node number to the data of the location response, then forward the location response to the next ring agent on data rings 415-1 and 415-2 of FIG. 4. When the location responses return to the ring agent that sent the location responses, that ring agent knows the locations of all ring agents 405-1 through 405-4 of FIG. 4, and may return that information to DMM 410 in a location acknowledgment.

To ensure that the location response returns to the recipient ring agent, the location response may specify the same ring agent as the source and destination of the location response. That is, the recipient ring agent may specify itself as both the source and the destination of the location response message. While this is unusual—that a ring agent sends a message to itself—this choice is in keeping with how the recipient ring agent wants to receive location information for each ring agent along each data ring, so that the recipient ring agent may return this information to DMM 410 of FIG. 4 in a location acknowledgment.

Using location commands, location responses, and location acknowledgments in this manner may enable DMM 410 of FIG. 4 to learn the relative location of each ring agent 405-1 through 405-4 of FIG. 4 along each data ring. Moreover, using location commands, location responses, and location acknowledgments removes the requirement of a relationship between the arrangement of ring agents 405-1 through 405-4 of FIG. 4 along control ring 420 of FIG. 4 and the arrangement of ring agents 405-1 through 405-4 of FIG. 4 along data rings 415-1 and 415-2 of FIG. 4. Ring agents 405-1 through 405-4 of FIG. 4 may be arbitrarily arranged along every data ring (and there may be more than two such data rings): the location command, location responses, and location acknowledgment may still pinpoint their arrangement. This fact explains the third data ring shown in hop count table 540: this third data ring represents another data ring (not shown in FIG. 4) connecting ring agents 405-1 through 405-4, but in differently from the arrangements along data rings 415-1 and 415-2 of FIG. 4.

Hop count table shows that node number 0 is listed as the first node along each data ring. Since the data rings are circular (the "last" ring agent connects to the "first" ring agent), the selection of any particular ring agent as the "first" ring agent along that data ring is arbitrary: any other ring agent could be selected as the "first" ring agent without any change in the information conveyed by hop count table 540. For example, if ring agent 405-3 of FIG. 4 were considered to be the "first" ring agent along any (or all) of the data rings, the number of hops between ring agents would not change (only the values representing their location relative to the "first" ring agent would change). Thus in hop count table 540 ring agent 405-1 of FIG. 4—the ring agent that is the first hop after DMM 410 of FIG. 4 along control ring 420 of FIG. 4—has been (arbitrarily) selected as the "first" ring agent along each data ring, with every other ring agent counting hops from that ring agent. Note that not only may a different ring agent be selected as the "first" ring agent, but different ring agents may be selected as the "first" ring agent along each data ring.

FIG. 8 illustrates an example DMA descriptor message sent from orchestrator 330 of FIGS. 3A-3B to DMM 410 of FIG. 4, according to an embodiment of the inventive concept. In FIG. 8, DMA descriptor 805 is shown. Orchestrator 330 of FIGS. 3A-3B may send DMA descriptor 805 to DMM 410 of FIG. 4 (specifically, to orchestrator interface 505 of FIG. 5), specifying that certain data be moved from one node to another. DMA descriptor 805 may include 24 bytes of data, with a two-byte DMA descriptor identifier at byte 0, a type at byte 4 (specifying whether data is to be moved from a kernel or a Buffer Manager, and is to be moved to a kernel or a Buffer Manager), a four-byte field storing miscellaneous flags (for example, any Quality of Service requirements) at byte 4, a four-byte length field at byte 8 (indicating how much data in total to move), an eight-byte source identifier at byte 16, and an eight-byte destination identifier at byte 24. Any fields not specified may be considered reserved for future use. Note that the source and destination identifiers may be node numbers, or they may be addresses where the data begins (for example, if found in memory 435 of FIG. 4): a combination of the two (one identifier being a node identifier, the other being a memory address) may also be used. Note that the values in all six fields described in DMA descriptor 805 may be ODMADT 510 of FIG. 11.

FIG. 9 illustrates an example DMA descriptor completion message sent from DMM 410 of FIG. 4 to orchestrator 330 of FIGS. 3A-3B, according to an embodiment of the inventive concept. In FIG. 9, eight-byte DMA descriptor completion message 905 is shown. DMA descriptor completion message 905 may include a two-byte DMA descriptor identifier at byte 0 and a one-byte status field at byte 3, with all other bytes reserved for future use. So that orchestrator 330 of FIGS. 3A-3B knows which DMA descriptor has been completed, the DMA descriptor identifier in DMA descriptor completion message 905 should be the same DMA descriptor identifier provided by orchestrator 330 of FIGS. 3A-3B in DMA descriptor 805 of FIG. 8.

Figure 10:
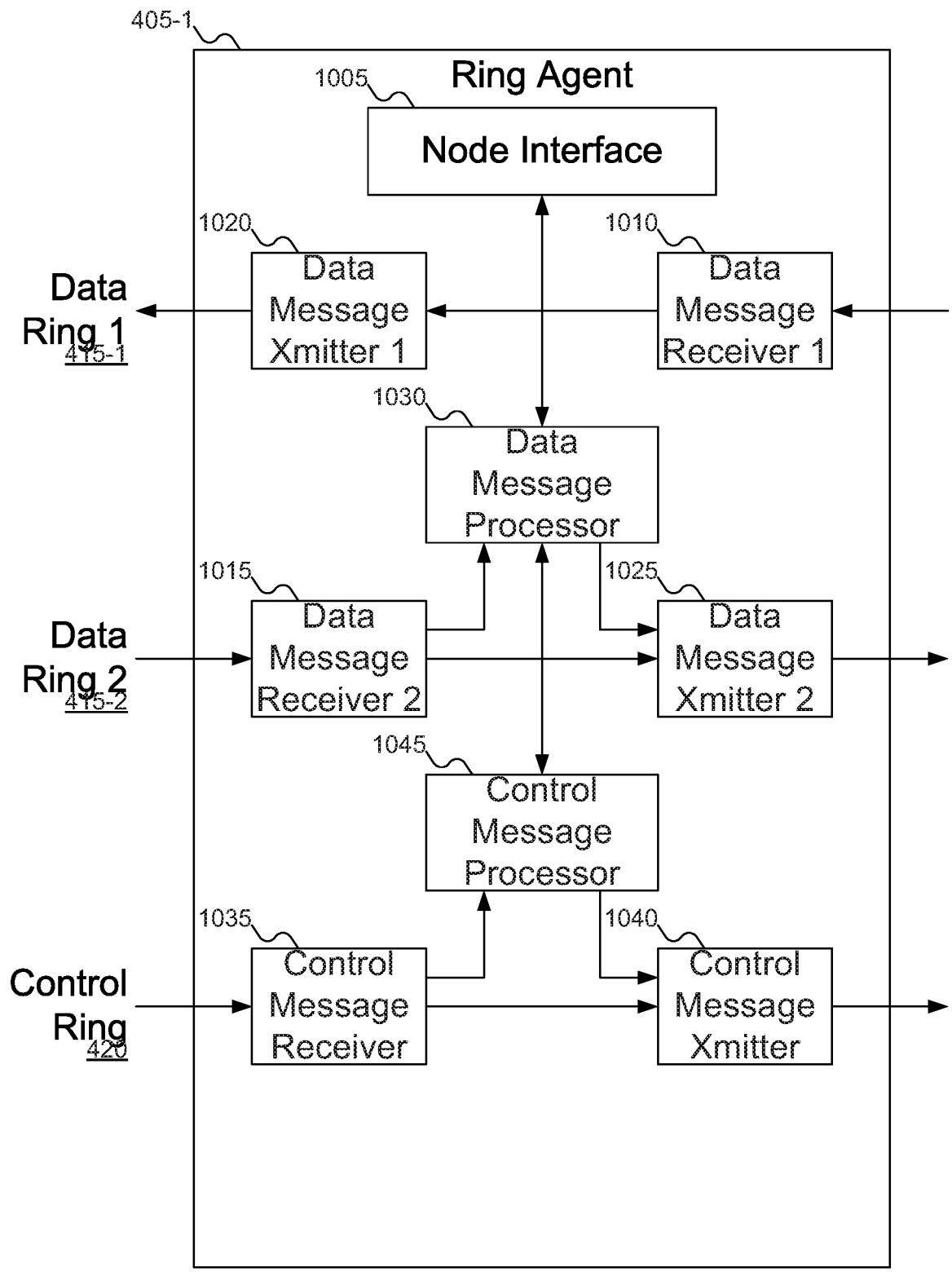
FIG. 10 shows details of the ring agents of FIG. 4.

Having discussed the interface between orchestrator 330 of FIGS. 3A-3B and DMM 410 of FIG. 4, the structure of ring agents 405-1 through 405-4 of FIG. 4 may now be discussed. FIG. 10 shows details of ring agent 405-1 of FIG. 4. In FIG. 10, ring agent 405-1 may include node interface 1005. Node interface 1005 may provide an interface for moving data in to and out of the node (which may be a kernel or a Buffer Manager) associated with ring agent 405-1. Data may move in to the node using a first-in, first-out (FIFO) ingress data queue (not shown in FIG. 10), and may move out of the node using a FIFO egress data queue (not shown in FIG. 10). The FIFO queues may also be replaced with other data structures as appropriate, although FIFO queues provide the advantage that data enters and leaves the queues in the same order. The ingress data queue and egress data queue may be used to transfer data and other information, such as Start-of-Batch and End-of-Batch flags (to let the other side of node interface 1005 know when unknown amounts of data have started or ended their transfer).

Ring agent 405-1 may have its own unique identifier (relative to other ring agents 405-1 through 405-4 of FIG. 4). This identifier may be shared with the associated node (which may also have its own unique identifier).

Node interface 1005 may also be used to determine from the node how much data and/or space it has available. For example, if ring agent 405-1 receives either a data available command or a space available command (discussed further with reference to FIGS. 14 and 16, below), ring agent 405-1 may use node interface 1005 to gather this information from the node.

For each data ring 415-1 and 415-2 of FIG. 2, ring agent 405-1 may include data message receivers 1010 and 1015, and data message transmitters 1020 and 1025. Data message receivers 1010 and 1015 may receive data messages from their respective data rings, and data message transmitters 1020 and 1025 may transmit data messages to their respective data rings. Note that, as discussed above, typically only move data response messages (discussed further with reference to FIG. 19 below) are transmitted on data rings 415-1 and 415-2, although location responses (discussed further with reference FIG. 22 below) may also be transmitted on data rings 415-1 and 415-2.

Ring agent 405-1 may also include data message processor 1030. Data message processor 1030 may determine whether ring agent 405-1 is the intended recipient of a particular move data response message. If so, then data message processor 1030 may terminate the transmission of the move data response message along the data ring and provide the data in the move data response message to the node via node interface 1005. Otherwise, if ring agent 405-1 is not the intended recipient of the move data response message, data message processor 1030 may instruct that the message be transmitted along the same data ring (in search of its intended recipient ring agent).

Note that in the situation where location response messages are sent along data rings 415-1 and 415-2, data message processor 1030 may also add the unique identifier of the node (or of the ring agent if different, as the two may be considered functionally equivalent) to the data area of a location response message and then transmit the location response message along the same data ring, to give DMM 410 of FIG. 4 information about the topology of the data ring.

Control message receiver 1035 may receive messages (either commands or acknowledgments) along control ring 420, and control message transmitter 1040 may transmit messages along control ring 420. Control message processor 1045 may determine whether a particular message sent along control ring 420 (typically, a command from DMM 410 of FIG. 4) is intended for ring agent 405-1. If so, then control message processor 1045 may terminate the message, perform an appropriate operation (if necessary), and return an acknowledgment to DMM 410 of FIG. 4 (including any needed information in the response). For example, if the message is a request for the data available at the node associated with ring agent 405-1, control message processor 1045 may inquire for the amount of data available at the node via node interface 1005, then return that value to DMM 410 of FIG. 4 via a data available acknowledgment. If the message sent along control ring 420 is not intended for ring agent 405-1, then control message processor 1045 may instruct that the message be transmitted along the control ring (in search of its intended recipient ring agent).

While FIG. 10 (and FIGS. 4-5 above) suggest particular implementations of ring agent 405-1 of FIG. 4, DMI 335 of FIGS. 3A-3B, and DMM 410 of FIG. 4, embodiments of the inventive concept do not require the various modules shown to be implemented in separate elements of the component. For example, there is no requirement that ring agent 405-1 include discrete circuits (or suitably programmed gates) that implement the modules shown in FIG. 10. The drawings are merely illustrative to show possible implementations for embodiments of the inventive concept, without being limited to the described and shown implementations.

FIGS. 11-23 illustrate example commands, acknowledgments, and responses that may be used in DMI 335 of FIGS. 3A-3B, according to embodiments of the inventive concept. While FIGS. 11-23 show structures for the various messages being described, embodiments of the inventive concept may include other messages, and messages using other structures than those shown.

In the discussion below, terms have been chosen to help suggest which party is sending the message and which party is receiving the message. The term "command" or "request" is used when the message originates from DMM 410 of FIG. 4 and is destined for one of ring agents 405-1 through 405-4 of FIG. 4, and the term "acknowledgment" is used when the message originates from one of ring agents 405-1 through 405-4 of FIG. 4 and is destined for DMM 410 of FIG. 4. "Commands" or "requests" and "acknowledgments" are sent using control ring 420 of FIG. 4. The term "response" is used only to describe a message that transmits data from a source node to a destination node: such a message is sent on one data rings 415-1 or 415-2 of FIG. 4, and are sent from one ring agent 405-1 through 405-4 of FIG. 4 to another.

In FIGS. 11-23, certain features are common across the figures, except where specifically noted. Each message is shown as eight bytes in length (except for the messages shown in FIGS. 18-19 and 22-23). Each message includes an opcode at byte 7 of the message structure. The opcode may be a number that represents the specific message being sent. Table 1 below shows an example of opcodes that may be used to represent various messages, but embodiments of the inventive concept may include other opcode choices without limitation.

TABLE 1

| Opcode | Command name | Description |
| --- | --- | --- |
| 0 | NOP | No operation |
| 1 | PING-REQ | Ping request |
| 2 | PING-ACK | Ping acknowledgment |
| 8 | DATA-AVE-REQ | Data available request |
| 9 | DATA-AVE-ACK | Data available acknowledgment |
| 10 | SPACE-AVE-REQ | Space available request |
| 11 | SPACE-AVE-ACK | Space available acknowledgment |
| 12 | MOVE-DATA-REQ | Move data request |
| 13 | MOVE-DATA-RSP | Move data response (sent over the data rings) |
| 14 | MOVE-DATA-ACK | Move data acknowledgment |
| 17 | LOCATION-REQ | Location request |
| 18 | LOCATION-RSP | Location response (sent over the data rings to determine the relative locations of the ring agent) |
| 19 | LOCATION-ACK | Location acknowledgment |

Each message also includes an identifier of a source node at byte 1 of the message structure, and an identifier of a destination node at byte 0 of the message structure. The source node and the destination node may be kernels, Buffer Managers, or DMM 410 of FIG. 4, thus enabling a potential exchange of data between two kernels, between two Buffer Managers (if the implementation of an embodiment of the inventive concept includes more than one Buffer Manager), between a kernel and Buffer Manager (in either direction), or between a kernel or a Buffer Manager and DMM 410 of FIG. 4. As may be expected, when ring agents 405-1 through 405-4 receive a message on any of data rings 415-1 or 415-2 of FIG. 4 or control ring 420 of FIG. 4, ring agents 405-1 through 405-4 of FIG. 4 may look at byte 0 of any message to determine if they are the intended recipient of the message, and if not may pass the message to the next ring agent on the appropriate ring, performing any appropriate processing to the message along the way (as discussed below). One exception to this rule may occur when a move data response is being transmitted on data rings 415-1 or 415-2 of FIG. 4: this exception is discussed below with reference to FIG. 19. Another exception to this rule may occur when DMM 410 of FIG. 4 is attempting to locate each ring agent 405-1 through 405-4 of FIG. 4 along data rings 415-1 and 415-2 of FIG. 4, and queries may be sent along data rings 415-1 and 415-2 of FIG. 4 to complete this process. Although the described embodiments of the inventive concept refer to "source" and "destination" nodes, these terms may be changed as desired, either globally for all messages or for individual types of messages, so long as all parties involved understand how to identify the sender and the intended recipient of the message.

Finally, any portions of the message structure that are shown with hatching are intended to represent reserved fields, which may be used in future embodiments of the inventive concept.

Figure 11:
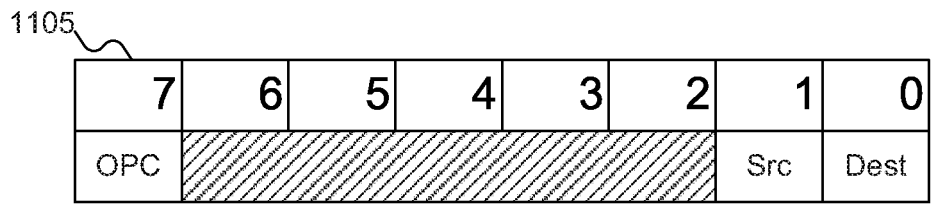

In FIG. 11, no-operation (NOP) command 1105 is shown. NOP command 1105 may be used to inform a node that it is to do nothing (as compared with a node doing nothing because it has been given no instructions). Since NOP command 1105 requires no action on the part of ring agent 405-1 through 405-4 of FIG. 4, no further information is needed in NOP command 1105, and the node to which NOP command 1105 is intended may discard NOP command 1105 upon receipt.

Figure 12:
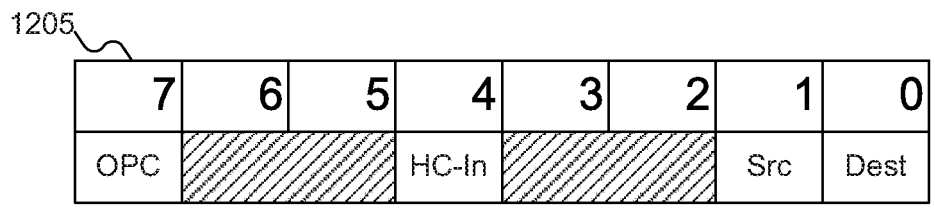

FIG. 12 shows ping command 1205. Ping command 1205 may include hop count in field in byte 4, which may be initialized to 0 (or to any other desired starting value). Each ring agent 405-1 through 405-4 of FIG. 4 that receives ping command 1205 but is not the intended recipient of ping command 1205 may increment the hop count in field in byte 4 of ping command 1205. The node that is the intended recipient of ping command 1205 may terminate this control message (that is, prevent ping command 1205 from continuing along control ring 420 of FIG. 4) and may respond with ping acknowledgment 1305 of FIG. 13 below. In this manner, the number of hops from DMM 410 of FIG. 4 to the intended recipient node may be determined. As discussed above with reference to FIG. 4, if it is assumed that data rings 415-1 and 415-2 of FIG. 4 are connected identically to control ring 420 of FIG. 4 or are connected in the inverse sequence, DMM 410 of FIG. 4 may determine the node sequence along data rings 415-1 and 415-2 of FIG. 4 using ping command 1205 and ping acknowledgment 1305 of FIG. 13 below. (Ways in which the arrangement of ring agents 405-1 through 405-4 of FIG. 4 along data rings 415-1 and 415-2 of FIG. 4, when the arrangements are not related to the arrangement along control ring 420 of FIG. 5, may be determined is discussed below with reference to FIGS. 31 and 34-35 below.)

Figure 13:
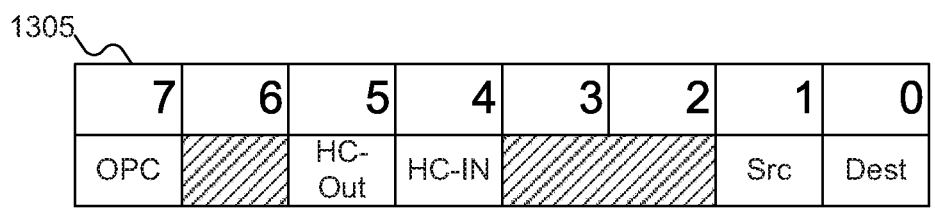

FIG. 13 shows ping acknowledgment 1305. Ping acknowledgment 1305 may include hop count in field in byte 4 and hop count out field in byte 5. The hop count in field may be copied from ping command 1205 of FIG. 12 (as it represents the number of hops from DMM 410 of FIG. 4 to ring agent 405-1 through 405-4 of FIG. 4 along control ring 420 of FIG. 4). The hop count out field in byte 5 may be initialized to 0 (or to any other desired starting value). Each ring agent 405-1 through 405-4 of FIG. 4 that receives ping acknowledgment 1305 may increment the hop count out field in byte 5 of ping acknowledgment 1305. Thus, when DMM 410 of FIG. 4 receives ping acknowledgment 1305, DMM 410 of FIG. 4 will know the number of hops from DMM 410 of FIG. 4 to ring agent 405-1 through 405-4 of FIG. 4 along control ring 420 of FIG. 4, and the number of hops from ring agent 405-1 through 405-4 of FIG. 4 along control ring 420 of FIG. 4.

In some embodiments of the inventive concept, ring agents 405-1 through 405-4 of FIG. 4 may send ping acknowledgments 1305 to DMM 410 of FIG. 4 spontaneously (that is, without receiving ping commands 1205 of FIG. 12). DMM 410 may determine the topology of the control ring 420 of FIG. 4 (and therefore data rings 415-1 and 415-2 of FIG. 4) even without sending ping commands 1205 of FIG. 12. For example, even with just the hop counts from ring agents 405-1 through 405-4 of FIG. 4, counted using the hop count out field in ping acknowledgment 1305 (and without the hop count in field data), it is still possible to determine the topology of control ring 420 of FIG. 4: the node with the lowest hop count out field comes just before DMM 410 of FIG. 4, the node with the next lowest hop count out field comes just before that node, and so on.

Figure 14:
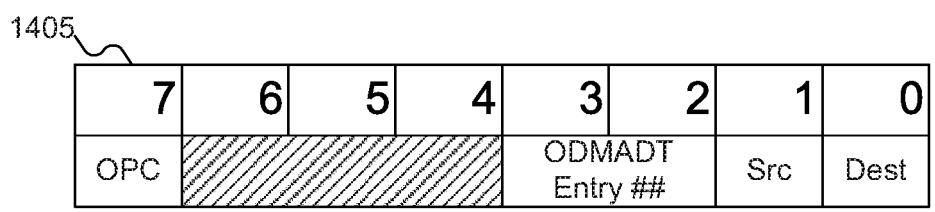

FIG. 14 shows data available command 1405. Data available command 1405 may include an ODMADT entry number at bytes 2-3, representing an entry in ODMADT 510 of FIG. 5 for which data available command 1405 seeks information.

Figure 15:
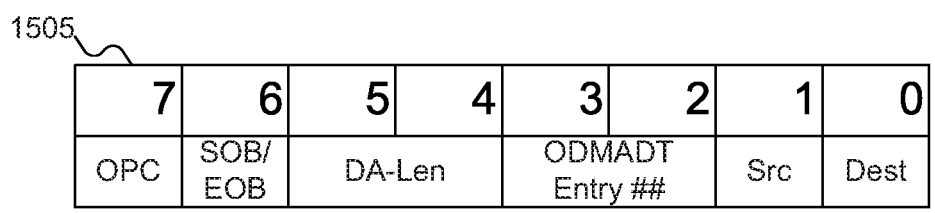

FIG. 15 shows data available acknowledgment 1505. Data available acknowledgment 1505 may include the ODMADT entry number in bytes 2-3, copied from data available command 1405 of FIG. 14. Data available acknowledgment 1505 may also include the length of the data available at the node in bytes 4-5. If the amount of data is not known, byte 6 may include a Start-of-Batch and/or End-of-Batch flag to indicate which data available acknowledgments are grouped together as belonging to the same batch.

Figure 16:
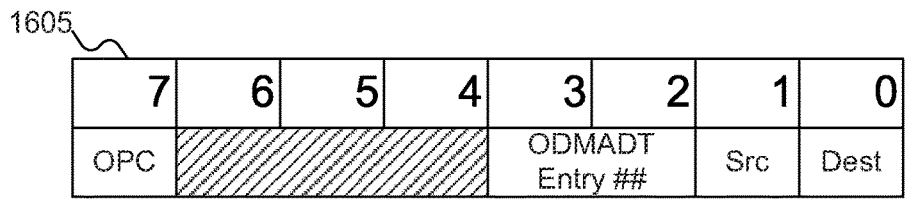

FIG. 16 shows space available command 1605. Space available command 1605 may include an ODMADT entry number at bytes 2-3, representing an entry in ODMADT 510 of FIG. 5 for which space available command 1605 seeks information.

Figure 17:
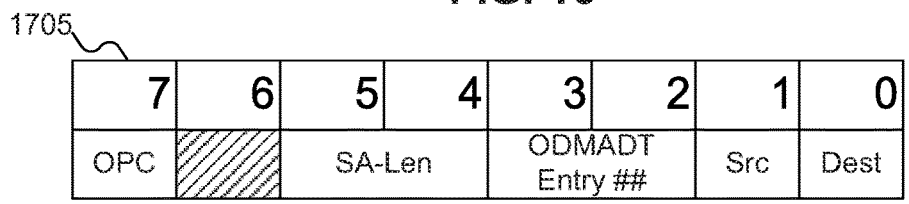

FIG. 17 shows space available acknowledgment 1705. Space available acknowledgment 1705 may include the ODMADT entry number in bytes 2-3, copied from space available command 1605 of FIG. 16. Space available acknowledgment 1705 may also include the length of the space available at the node in bytes 4-5. Since the space available at a node is a known quantity at the time space available command 1605 is received, there is no need for Start-of-Batch/End-of-Batch flags in space available acknowledgment 1705.

Figure 18:
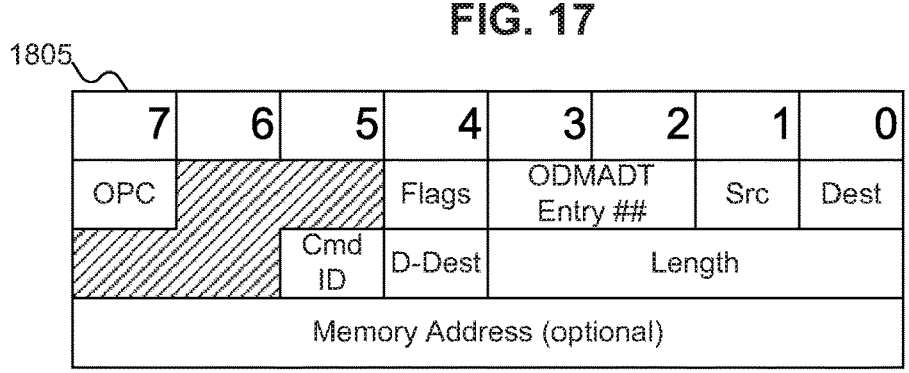

FIG. 18 shows move data command 1805. Unlike the commands/acknowledgments shown in FIGS. 11-17 and 21, move data command 1805 may be a message that includes more than eight bytes of information. Move data command 1805 may include the ODMADT entry number in bytes 2-3, any appropriate flags in byte 4, the length of the data to be moved in bytes 8-11, the command identifier (as data may be moving through DMI 335 of FIGS. 3A-3B for multiple outstanding DMA descriptors), and an optional memory address where the data may be found in bytes 16-23. The flags in byte 4 may specify whether the type of data transfer, and may indicate whether the (optional) memory address is valid or not (if a memory address is not needed, then any data provided in the memory address field would not be considered valid). The flags in byte 4 may also be used to specify a Start-of-Batch or End-of-Batch when the amount of data to be transferred is not known in advance. The flags in byte 4 may also be used to specify which data ring 415-1 and 415-2 should be used to transmit the data (using data move response 1905, discussed with reference to FIG. 19 below).

Unlike most of the other messages, move data command 1805 (and its consequence messages) involves three parties: DMM 410 of FIG. 4 (which initiates the data movement between the nodes), the source node (the node currently storing the data to be moved), and the destination node (the node to which the data should be moved). While DMM 410 of FIG. 4 and the source node for the data may be identified using the source node identifier and destination node identifier in bytes 1 and 0 of the message respectively, the message should also specify the recipient of the data. The identifier of the node to which the data should be moved may be specified using the D-destination field in byte 12 of the message.

Figure 19:
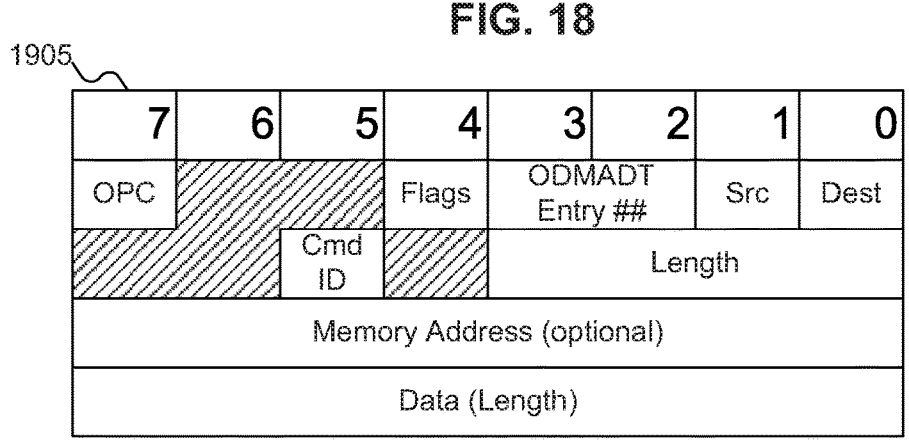

Responsive to receiving move data command 1805, ring agent 405-1 through 405-4 may send move data response 1905 of FIG. 19. Note that move data command 1805 may be sent on control ring 420 of FIG. 4, although move data response 1905 of FIG. 4 may be sent on data ring 415-1 or 415-2 of FIG. 4.

FIG. 19 shows move data response 1905. Move data response 1905 may be generated in response to ring agent 405-1 through 405-4 of FIG. 4 receiving move data command 1805 of FIG. 18. Move data response 1905 may include the ODMADT entry number in bytes 2-3, any appropriate flags in byte 4, the length of the data to be moved in bytes 8-11, the command identifier (as data may be moving through DMI 335 of FIGS. 3A-3B for multiple outstanding DMA descriptors), an optional memory address where the data may be found in bytes 16-23, and the data itself beginning at byte 24 (the number of bytes of data may depend on the length of the data to be moved as specified in bytes 8-11). The flags in byte 4 may specify whether the type of data transfer, and may indicate whether the (optional) memory address is valid or not (if a memory address is not needed, then any data provided in the memory address field would not be considered valid). The flags in byte 4 may also be used to specify a Start-of-Batch or End-of-Batch when the amount of data to be transferred is not known in advance (although the amount of data in move data response 1905 is obviously known at the time move data response 1905 is sent from ring agent 405-1 through 405-4 of FIG. 4).

Note that much of the data in move data response 1905 may be copied from move data command 1805 of FIG. 18. Except for the identifiers of the source and destination nodes (now identifying the source and destination nodes of move data response 1905 rather than move data command 1805 of FIG. 18), the opcode, and the inclusion of the data itself, the remainder of the information in move data response 1905 may be copied without alteration from move data command 1805 of FIG. 18.

Like move data command 1805, move data response 1905 involves three parties: DMM 410 of FIG. 4 (which initiates the data movement between the nodes), the source node (the node currently storing the data to be moved), and the destination node (the node to which the data should be moved). In some embodiments of the inventive concept, the identifier of the destination node in byte 0 of move data response 1905 may be copied from the D-destination field in byte 12 of move data command 1805 of FIG. 18; in other embodiments of the inventive concept, the identifier of the destination node in byte 0 of move data response 1905 may be identical to the identifier of the destination node in byte 0 of move data command 1805 of FIG. 18. Note that in the embodiments of the inventive concept where the identifier of the destination in byte 0 of move data response 1905 may be copied from the D-destination field in byte 12 of move data command 1805 of FIG. 18, DMM 410 of FIG. 4 may not be identified in move data response 1905. But even in such situations, DMM 410 of FIG. 4 is implied as part of move data response 1905.

Regardless of where the identifier of the destination of move data response 1905 is stored in move data response 1905, ring agents 405-1 through 405-4 of FIG. 4 only need to look at one location in move data response 1905 to determine if they are the intended recipient of move data response 1905. While it may seem unusual to have the identifier of the intended recipient in a different location in move data response 1905 (potentially in byte 12) than in the other messages (in byte 0), note that move data response 1905 typically is the only message that is sent on data rings 415-1 and 415-2 of FIG. 4: all other messages are sent on control ring 420 of FIG. 4. (Which of data rings 415-1 and 415-2 of FIG. 4 should be used to transmit move data response 1905 may be specified in move data command 1805 of FIG. 18.) Thus, while the particular byte to be examined in move data response 1905 may vary relative to the other messages, ring agents 405-1 through 405-4 of FIG. 4 still look consistently at only a single place in messages to determine if they are the intended recipient: it is just that the location varies based on the ring (data ring 415-1 or 415-2 of FIG. 4 vs. control ring 420 of FIG. 4) on which the message travels.

Note too that embodiments of the inventive concept support altering where the identifiers of all three parties are stored in data move response 1905. Thus, for example, the identifier of the intended recipient of the data may be stored in byte 0 of move data response 1905, the identifier of the sender of the data may be stored in byte 1 of move data response 1905, and the identifier of DMM 410 of FIG. 4 may be stored in byte 12 (or somewhere else) in move data response 1905.

Figure 20:
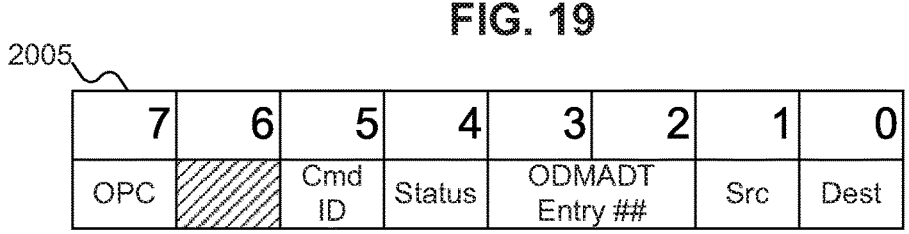

FIG. 20 shows move data acknowledgment 2005. Move data acknowledgment 2005 may include the ODMADT entry number in bytes 2-3 and the command identifier in byte 5, copied from move data response 1905 of FIG. 19 (although the command identifier is shown in byte 12 of move data response 1905 of FIG. 19 rather than in byte 4). Move data acknowledgment 2005 may also include a status field in byte 4 indicating the status of the data transfer.

Figures 21, 22, 23:
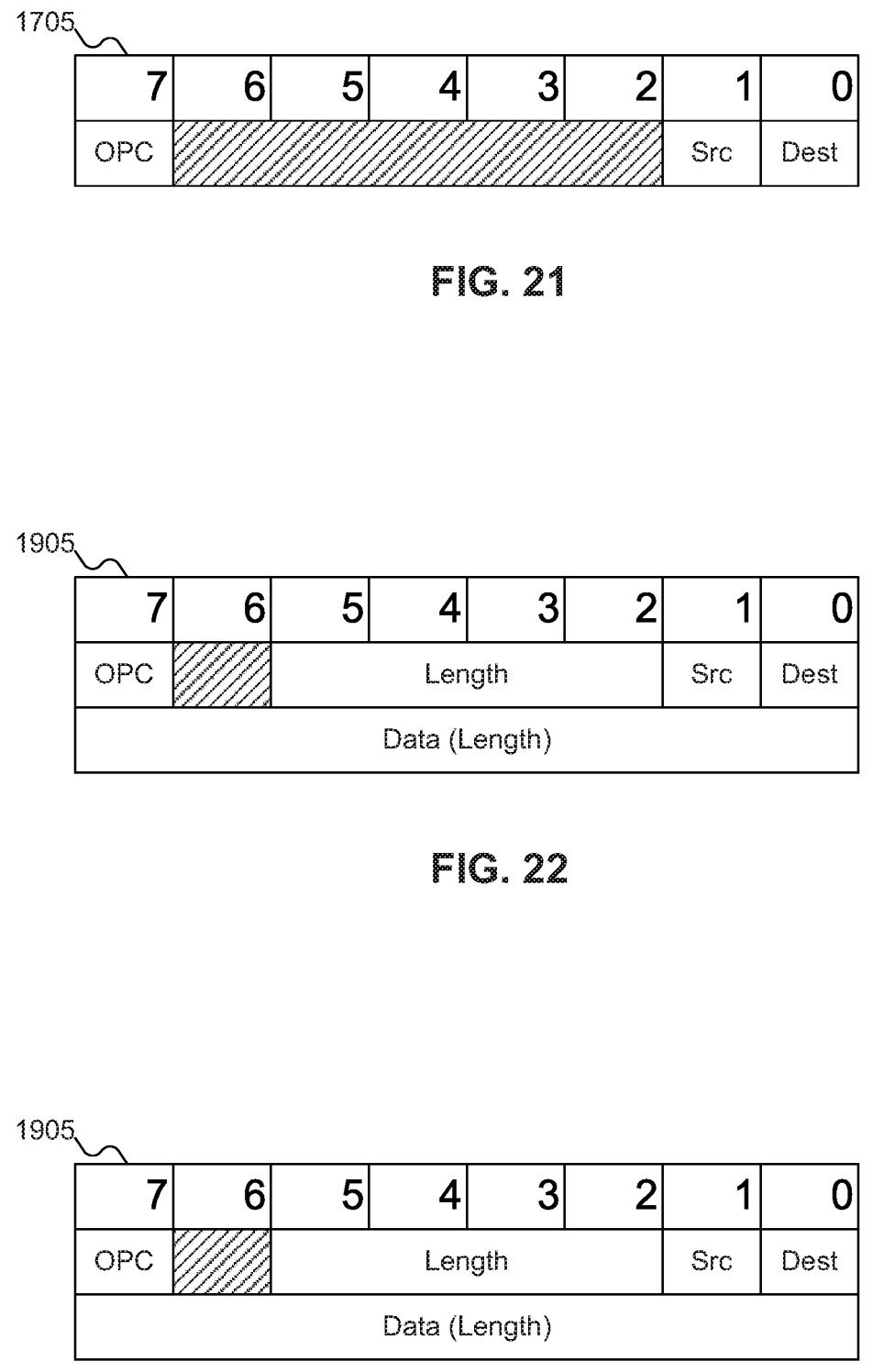

FIG. 21 shows location command 2105. As described above with reference to FIG. 7, location command 2105 may be used to determine the topology of data rings 415-1 and 415-2 of FIG. 4 when their topology may be unrelated to the topology of control ring 420 of FIG. 5. As location command 2105 by its very existence establishes complete information needed for recipient ring agent 405-1 through 405-4 of FIG. 4, location command 2105 may not need any information beyond the opcode, source identifier, and destination identifier.

FIG. 22 shows location response 2205. Unlike location command 2105, which may be sent along control ring 420 of FIG. 4, location response 2205 may be sent along data rings 415-1 and 415-2 of FIG. 4. In addition, unlike the commands/acknowledgments shown in FIGS. 11-17 and 21, location response 2205 may be a message that includes more than eight bytes of information. Location response 2205 may include a length for a data field in bytes 2-5, and may include data beginning at byte 8 (the number of bytes of data may depend on the length of the data to be moved as specified in bytes 2-5). The data itself may include an ordered list of node identifiers (or ring agent identifiers, if the two are different, which may be used interchangeably), showing the relative order of ring agents 405-1 through 405-4 of FIG. 4 along a particular data ring, starting with the ring agent that sent location response 2205.

To ensure that location response 2205 visits every ring agent 405-1 through 405-4 of FIG. 4, location response 2205 may include the identifier of the sending ring agent as both the source and destination identifiers in bytes 0 and 1 of location response 2205.

FIG. 23 shows location acknowledgment 2305. Location acknowledgment 2305 is similar to location response 2205 of FIG. 22, except that location acknowledgment 2305 may be sent along control ring 420 of FIG. 4 back to DMM 410 of FIG. 4. Further location acknowledgment 2305 may identify data rings 415-1 and 415-2 of FIG. 4 and include the relative order of ring agents 405-1 through 405-4 of FIG. 4 along those data rings (although the ring agent might send location information for ring agents 405-1 through 405-4 of FIG. 4 for each ring in separate location acknowledgments 2305).

Figure 24:
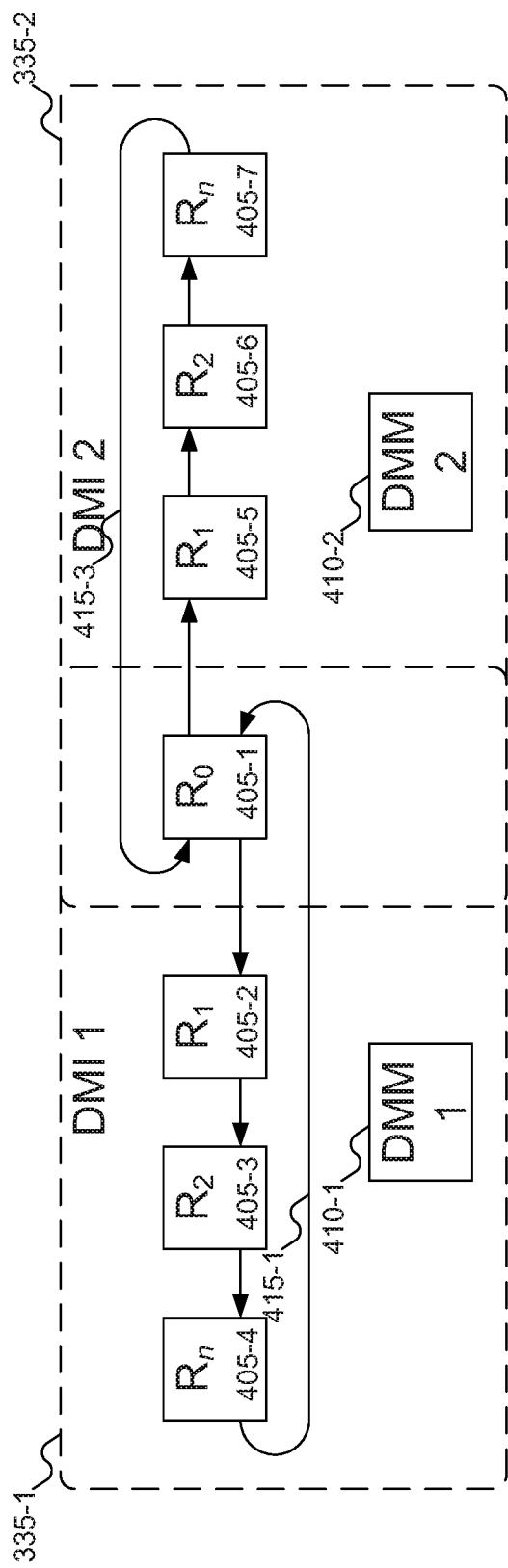
FIG. 24 shows a ring agent of FIG. 4 being shared across two DMIs, according to an embodiment of the inventive concept.

In all of the above discussion, it has been assumed that there is but one DMI 335 offering acceleration functions on data in SSD 125 of FIG. 1. But this assumption is not necessarily required. That is, a single SSD 125 of FIG. 1 might offer multiple rings of nodes in separate DMIs, each with separate DMMs, which are partially independent of each other. (If the rings of nodes are entirely independent of each other, then no special handling is required: short of moving data in and out of memory 435 of FIG. 4 and/or flash memory chips 315-1 through 315-8 of FIGS. 3A-3B). To facilitate transfer of data between the DIMs, the rings may overlap: a ring agent is a good choice for this overlap. FIG. 24 illustrates a situation where a ring agent is shared across two DMIs.

In FIG. 24, two DMIs 335-1 and 335-2 are shown. To avoid clutter, FIG. 24 is a simplification relative to FIG. 4: in fact, each DMI could look similar to that of FIG. 4, and embodiments of the inventive concept support any variations from such design as discussed above for each DMI 335-1 and 335-2 separately. Thus, while each DMI 335-1 and 335-2 is shown including only one data ring (data ring 415-1 for DMI 335-1 and data ring 415-3 for DMI 335-2) and no control rings, DMIs 335-1 and 335-2 could each have at least two data rings and a control ring as shown in FIG. 4 (or variations thereof), and DMIs 335-1 and 335-2 could also have different numbers of data rings and control rings from each other.

Ring agent 405-1 is shown as being common to both data rings 415-1 and 415-3 (with each DMI 335-1 and 335-2 including at least two data rings, ring agent 405-1 would in fact be on at least four data rings as well as both/all control rings). This arrangement makes it possible for data to be moved between DMIs 335-1 and 335-2: data may be transferred within one DMI to ring agent 405-1, and then transferred from ring agent 405-1 within the other DMI.

To implement sharing of data between DMIs 335-1 and 335-2, it may be necessary for DMMs 410-1 and 410-2 to communicate with each other (for example, with respect to functions within each DMI affecting the data to be shared between them). Thus, a communication path between DMMs 410-1 and 410-2 may be added. Addition commands and acknowledgments (with new opcodes) may also be used to keep DMMs 410-1 and 410-2 aware of where data being shared between DMIs 335-1 and 335-2 is located. For example, a new move data response message might be used to transfer data to ring agent 405-1 along data ring 415-1, so that when the data (via the new move data response message) is received at ring agent 405-1, ring agent 405-1 may send both a move data acknowledgment to DMM 410-1 and perhaps a new data available message to DMM 410-2. The structure of such messages would be similar to those discussed above with minor variation.

Figure 25A:
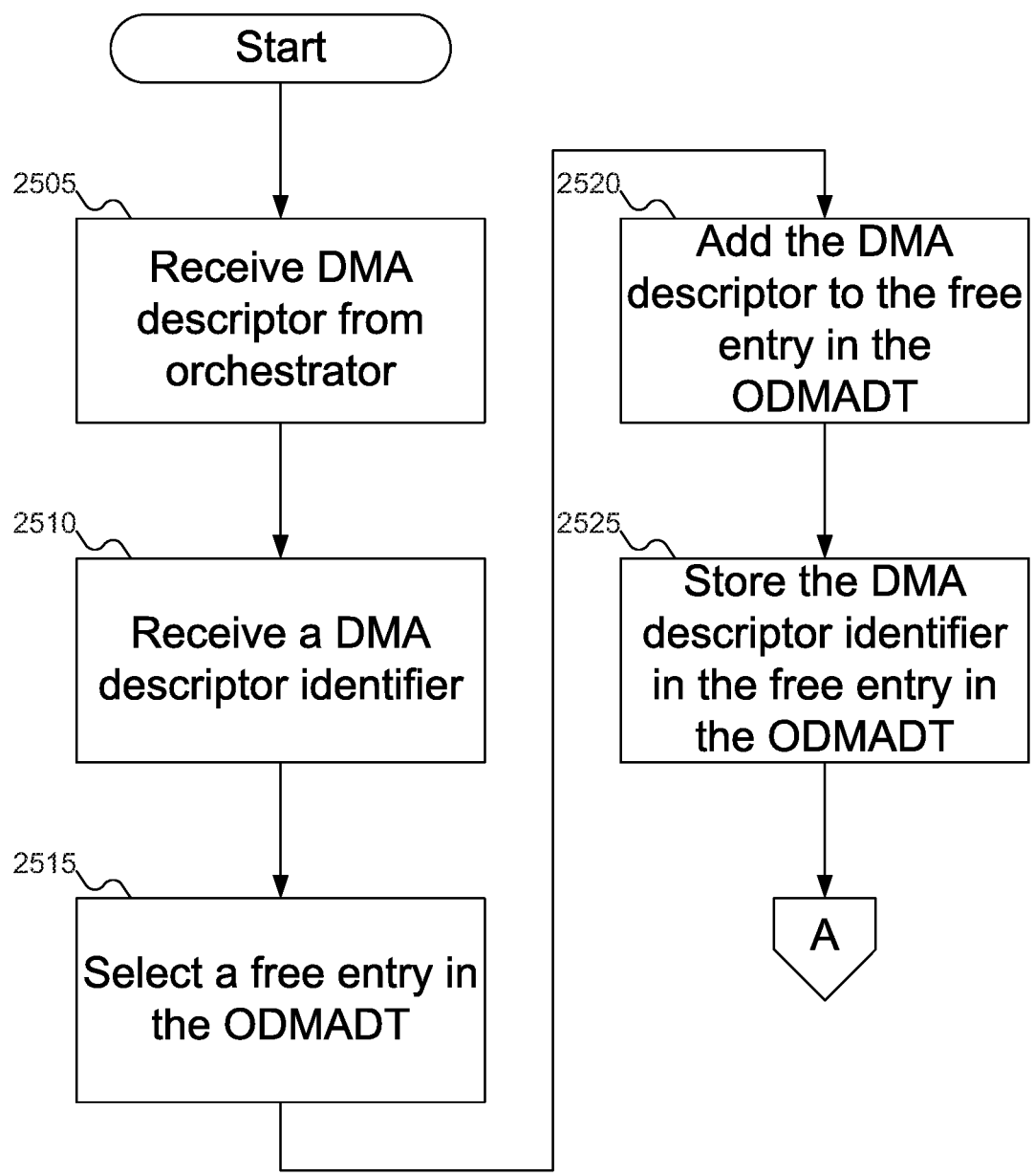
FIGS. 25A-25B show a flowchart of an example procedure for the Orchestrator Interface of FIG. 5 to process the DMA descriptor of FIG. 8 received from the orchestrator of FIGS. 3A-3B, according to an embodiment of the inventive concept.
Figure 25B:
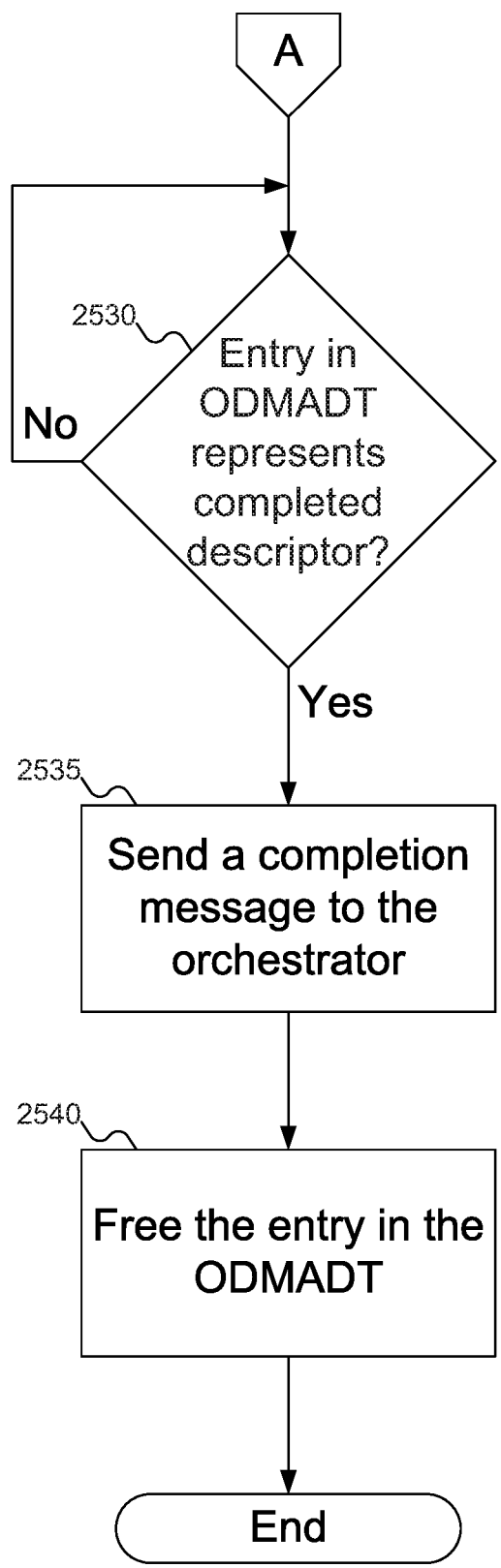

FIGS. 25A-25B show a flowchart of an example procedure for Orchestrator Interface 505 of FIG. 5 to process DMA descriptor 805 of FIG. 8 received from orchestrator 330 of FIGS. 3A-3B, according to an embodiment of the inventive concept. In FIG. 25A, at block 2505, orchestrator interface 505 of FIG. 5 may receive DMA descriptor 805 of FIG. 8 from orchestrator 330 of FIGS. 3A-3B. At block 2510, orchestrator interface 505 of FIG. 5 may receive a DMA descriptor identifier for DMA descriptor 805 of FIG. 8 from orchestrator 330 of FIGS. 3A-3B (note that this block may be subsumed in block 2505 of FIG. 25A, as DMA descriptor 805 of FIG. 8 may include the DMA descriptor identifier). At block 2515, orchestrator interface 505 of FIG. 5 may select a free (i.e., invalid) entry in ODMADT 510 of FIG. 5. At block 2520, orchestrator interface 505 of FIG. 5 may add DMA descriptor 805 of FIG. 8 to ODMADT 510 of FIG. 5 by storing DMA descriptor 805 of FIG. 8 in the free entry in ODMADT 510 of FIG. 5. At block 2525, orchestrator interface 505 of FIG. 5 may store DMA descriptor 805 of FIG. 8 in the free entry in ODMADT 510 of FIG. 5 (note that this block may be subsumed in block 2520, if DMA descriptor 805 of FIG. 8 includes the DMA descriptor identifier).

At block 2530 (FIG. 25B), orchestrator interface 505 of FIG. 5 may check to see if the entry in ODMADT 510 of FIG. 5 storing DMA descriptor 805 of FIG. 8 now represents a completed DMA descriptor (orchestrator interface 505 of FIG. 5 may also check other valid entries in ODMADT 510 of FIG. 5 also represent completed DMA descriptors). If not, then processing waits at block 2530 until the entry in ODMADT 510 of FIG. 5 represents a completed DMA descriptor. Otherwise, at block 2535 orchestrator interface 505 of FIG. 5 may send completion message 905 of FIG. 9 to orchestrator 505 of FIG. 5, and at block 2540 orchestrator interface 505 of FIG. 5 may free the entry in ODMADT 510 of FIG. 5 (for example, by freeing the entry in ODMADT 510 of FIG. 5), after which processing is complete (of course, processing may return to block 2505 of FIG. 25A to receive a new DMA descriptor from orchestrator 330 of FIGS. 3A-3B, or to block 2530 of FIG. 25B to check for other completed DMA descriptors).

Figure 26A:
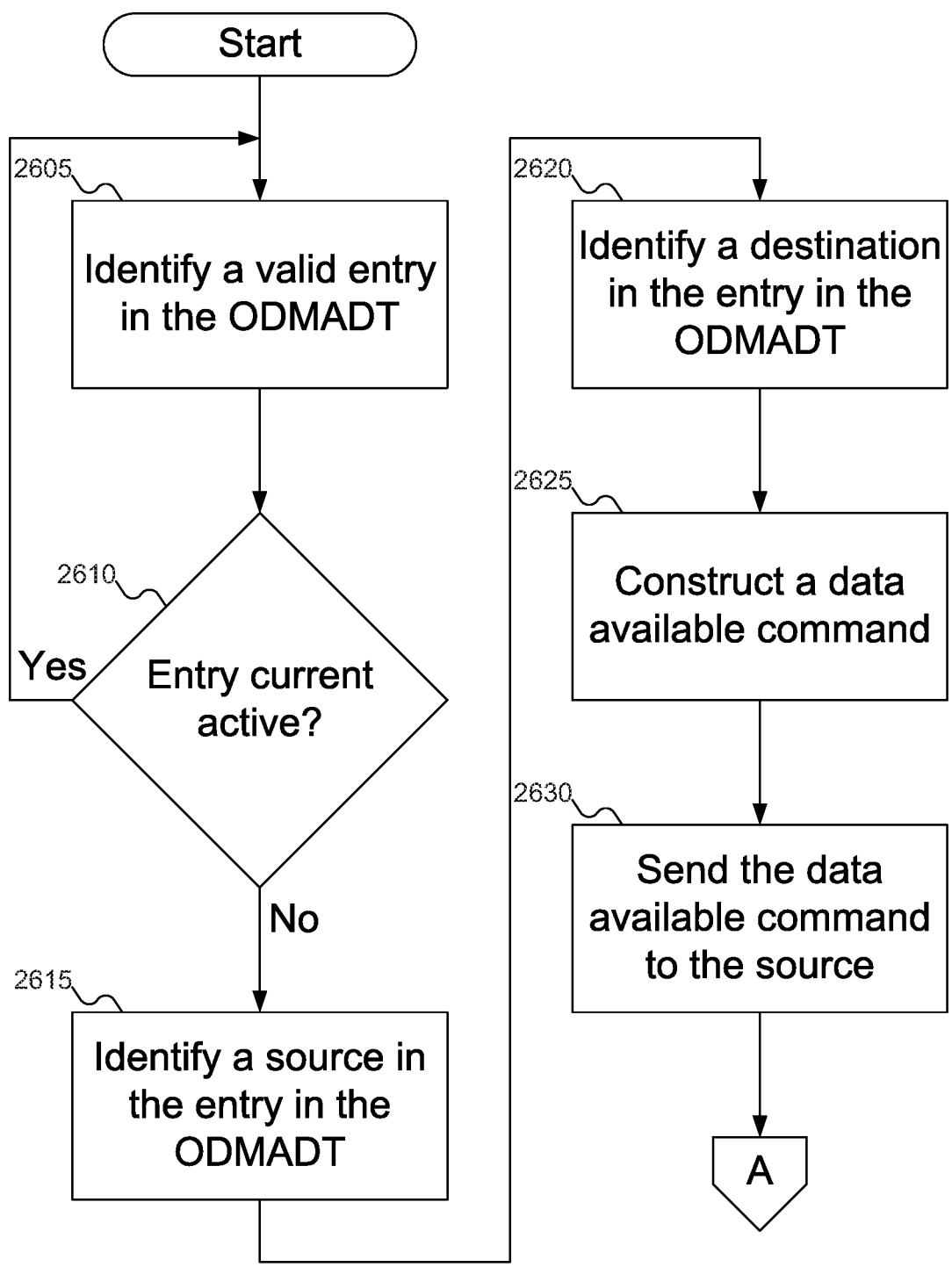
FIGS. 26A-26C show a flowchart of an example procedure for the DMM of FIG. 4 to query for the data available and space available at nodes for an outstanding DMA descriptor of FIG. 8, according to an embodiment of the inventive concept.
Figure 26B:
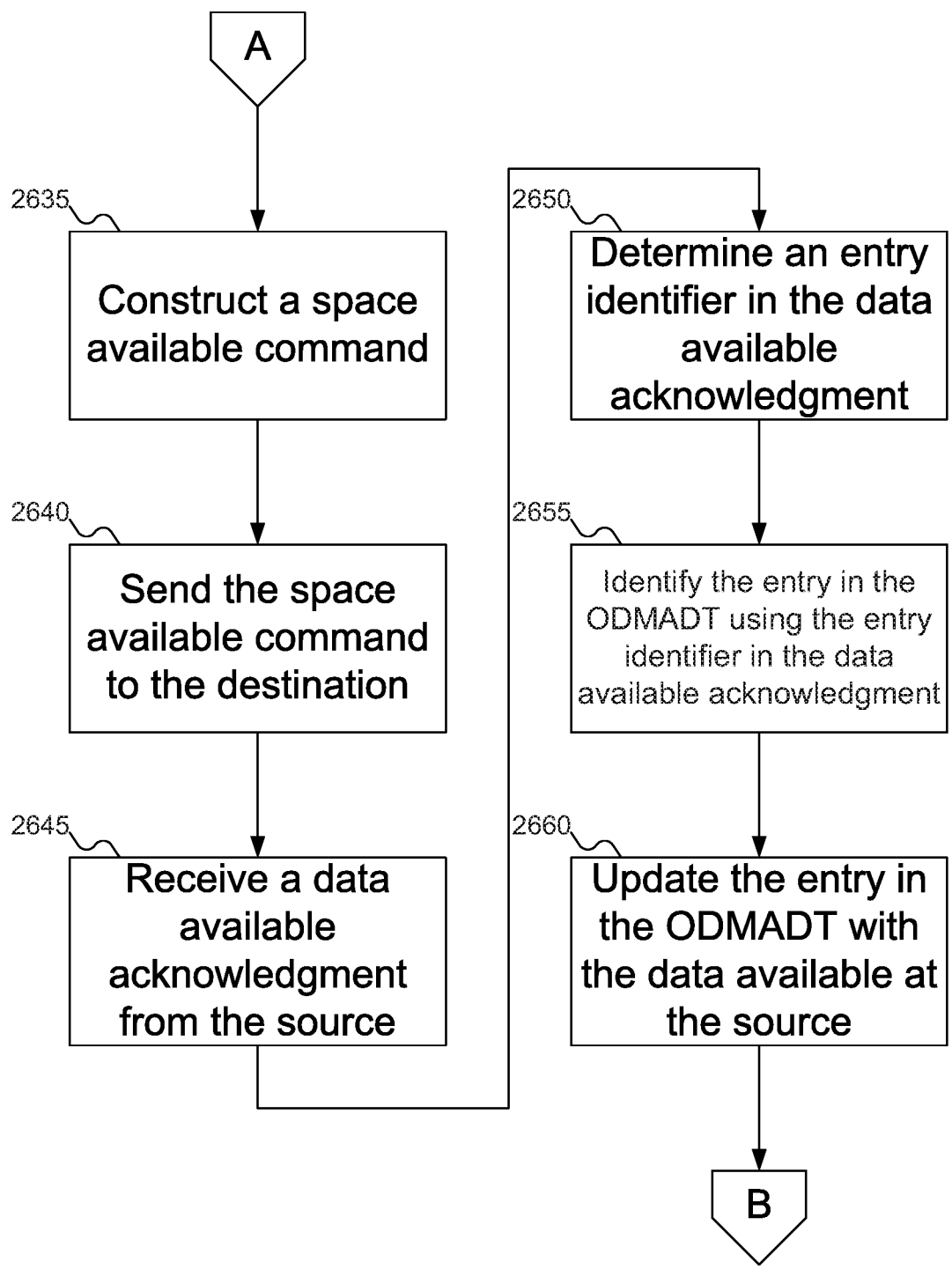
Figure 26C:
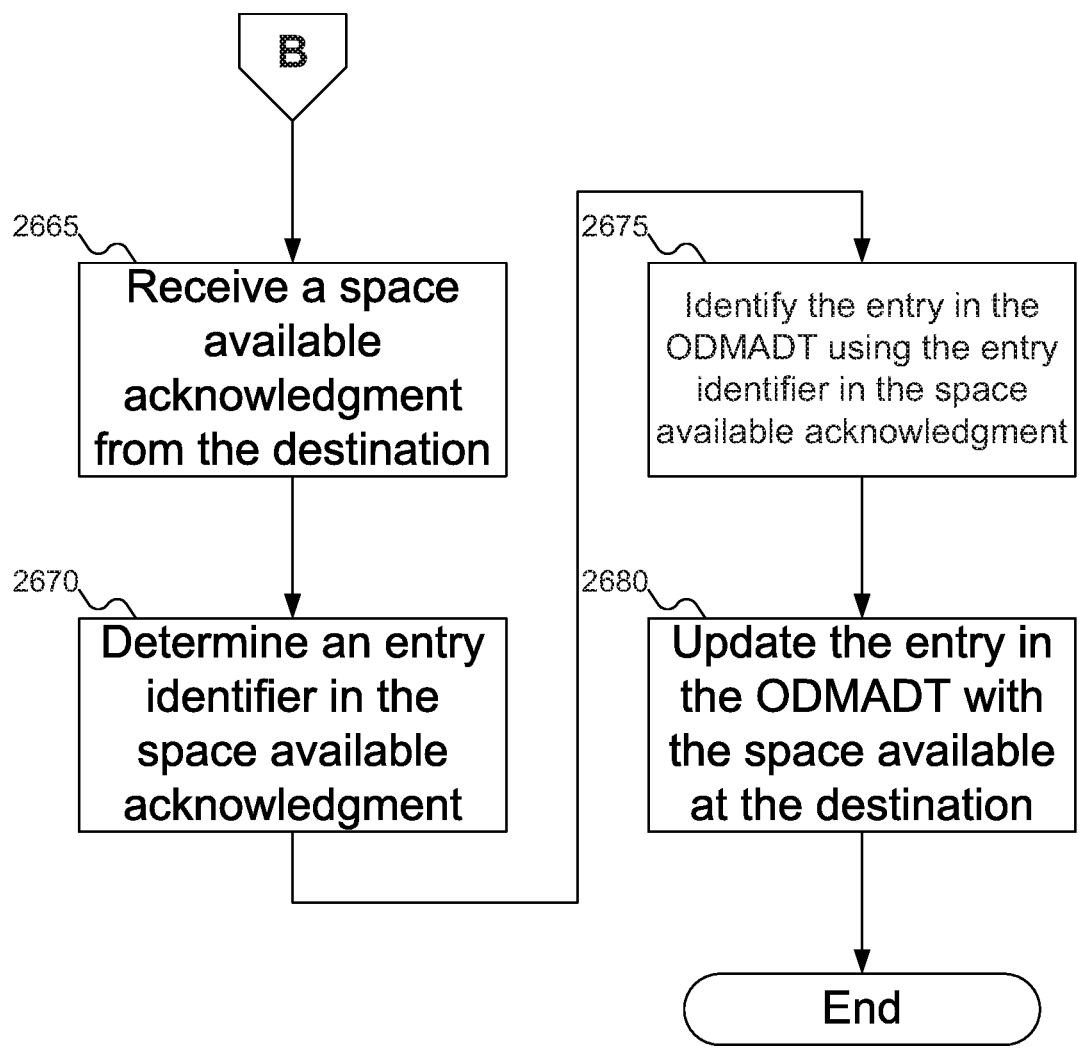

FIGS. 26A-26C show a flowchart of an example procedure for DMM 410 of FIG. 4 to query for the data available and space available at nodes for outstanding DMA descriptor 805 of FIG. 8, according to an embodiment of the inventive concept. In FIG. 26A, at block 2605, data available/space available poll 515 of FIG. 5 may identify a valid entry in ODMADT 510 of FIG. 5. At block 2610, data available/space available poll 515 of FIG. 5 may check to see if the entry in ODMADT 510 of FIG. 5 is currently undergoing an active transfer of data. If so, then processing returns to block 2605 to select another valid entry in ODMADT 510 of FIG. 5.

If the selected entry in ODMADT 510 of FIG. 5 is both valid and not currently active, then at block 2615 data available/space available poll 515 of FIG. 5 may identify a source node in the entry in ODMADT 510 of FIG. 5, and at block 2620 data available/space available poll 515 of FIG. 5 may identify a destination node in the entry in ODMADT 510 of FIG. 5. At block 2625, data available/space available poll 515 of FIG. 5 may construct data available command 1405 of FIG. 14: data available command 1405 of FIG. 14 may include an identifier of the entry in ODMADT 510 of FIG. 5. At block 2630, data available/space available poll 515 of FIG. 5 may send data available command 1405 of FIG. 14 to the source node.

At block 2635 (FIG. 26A), data available/space available poll 515 of FIG. 5 may construct space available command 1605 of FIG. 16: space available command 1605 of FIG. 16 may include an identifier of the entry in ODMADT 510 of FIG. 5. At block 2640, data available/space available poll 515 of FIG. 5 may send space available command 1605 of FIG. 16 to the destination node.

At block 2645, data available/space available poll 515 of FIG. 5 may receive data available acknowledgment 1505 of FIG. 15 from the source node. At block 2650, data available/space available poll 515 of FIG. 5 may determine an entry identifier from data available acknowledgment 1505 of FIG.

15. At block 2655, data available/space available poll 515 of FIG. 5 may locate the entry in ODMADT 510 of FIG. 5 using the entry identifier from data available acknowledgment 1505 of FIG. 15, and at block 2660 data available/space available poll 515 of FIG. 5 may update the entry in ODMADT 510 of FIG. 5 with the data available at the source node based on data available acknowledgment 1505 of FIG. 15.

At block 2665 (FIG. 26A), data available/space available poll 515 of FIG. 5 may receive space available acknowledgment 1705 of FIG. 17 from the destination node. At block 2670, data available/space available poll 515 of FIG. 5 may determine an entry identifier from space available acknowledgment 1705 of FIG. 17. At block 2675, data available/space available poll 515 of FIG. 5 may locate the entry in ODMADT 510 of FIG. 5 using the entry identifier from space available acknowledgment 1705 of FIG. 17, and at block 2680 data available/space available poll 515 of FIG. 5 may update the entry in ODMADT 510 of FIG. 5 with the space available at the destination node based on space available acknowledgment 1705 of FIG. 17.

Figure 27A:
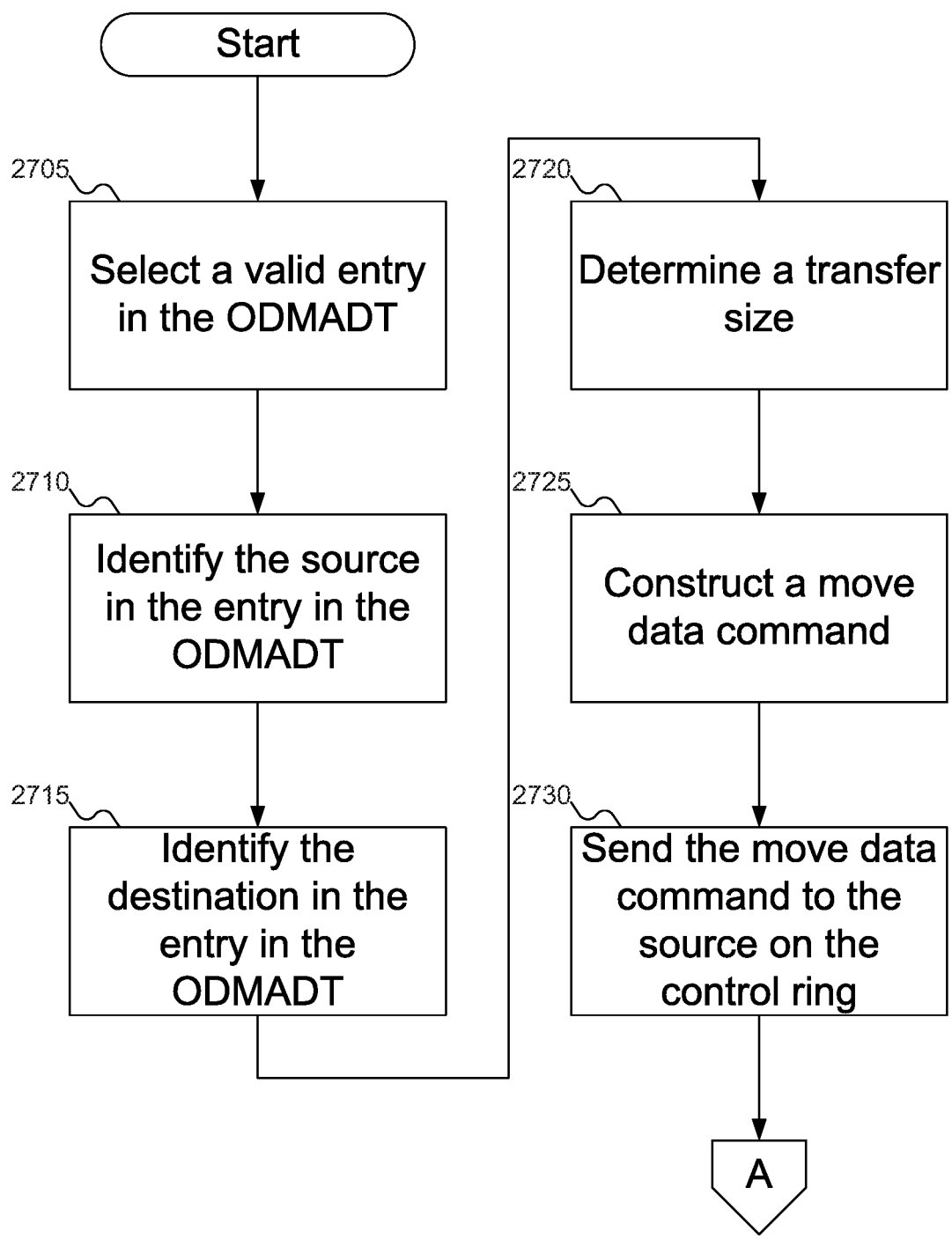
FIGS. 27A-27B show a flowchart of an example procedure for the DMM of FIG. 4 to schedule a move data command, according to an embodiment of the inventive concept.
Figure 27B:
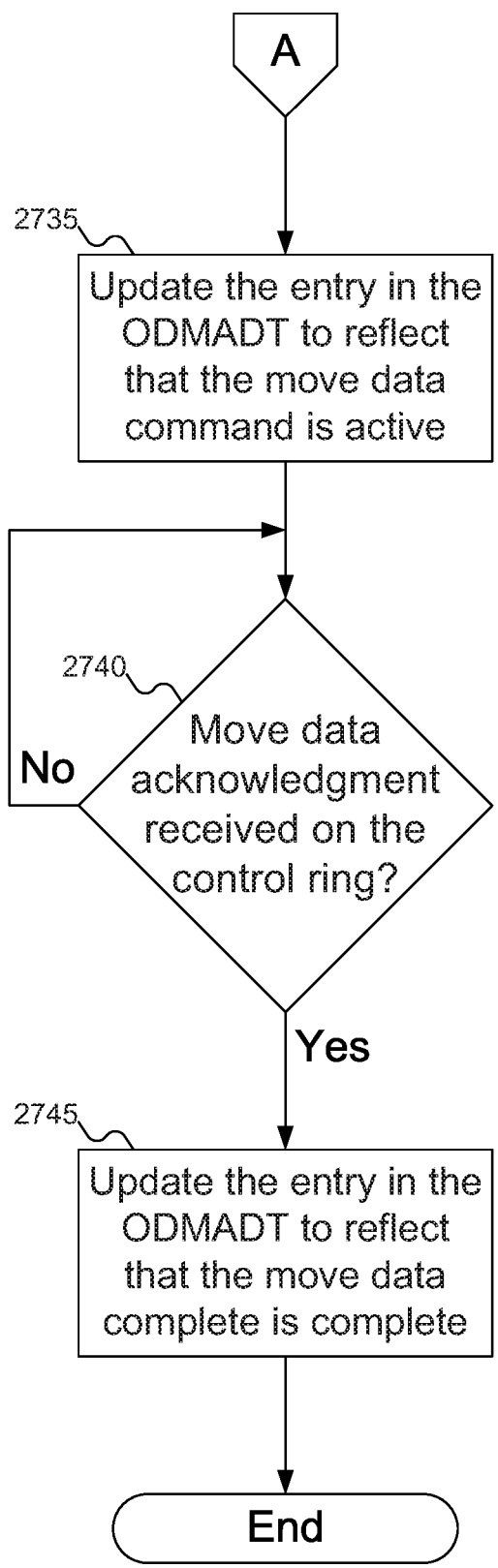

FIGS. 27A-27B show a flowchart of an example procedure for DMM 410 of FIG. 4 to schedule a move data command, according to an embodiment of the inventive concept. In FIG. 27A, at block 2705, move data command scheduler 520 of FIG. 5 may select a valid entry in ODMADT 510 of FIG. 5. At block 2710, move data command scheduler 520 of FIG. 5 may identify the source node in the entry in ODMADT 510 of FIG. 5, and at block 2715 move data command scheduler 520 of FIG. 5 may identify the destination node in the entry in ODMADT 510 of FIG. 5. At block 2720, move data command scheduler 520 of FIG. 5 may determine the transfer size: that is, the amount of data to transfer from the source node to the destination node. The transfer size might be the lesser of the data available at the source node and the space available at the destination node; it might also be less based on other considerations, such as Quality of Service requirements for applications. At block 2725, move data command scheduler 520 of FIG. 5 may construct move data command 1805 of FIG. 18. At block 2730, move data command scheduler 520 of FIG. 5 may send move data command 1805 of FIG. 18 on control ring 420 of FIG. 4.

At block 2735 (FIG. 27A), move data command scheduler 520 of FIG. 5 may update the entry in ODMADT 510 of FIG. 5 to reflect that move data command 1805 of FIG. 18 is active. At block 2740, move data command acknowledgment processor 525 of FIG. 5 may determine whether move data command acknowledgment processor 525 of FIG. 5 has received move data acknowledgment 2005 of FIG. 20 on control ring 420 of FIG. 4. If not, then processing may wait at block 2740 until move data command acknowledgment processor 525 of FIG. 5 receives move data acknowledgment 2005 of FIG. 20 on control ring 420 of FIG. 4 (or course, move data command acknowledgment processor 525 of FIG. 5 may perform other tasks, such as processing other received move data acknowledgments). Once move data command acknowledgment processor 525 of FIG. 5 has received move data acknowledgment 2005 of FIG. 20, at block 2745 move data command acknowledgment processor 525 of FIG. 5 may update the entry in ODMADT 510 of FIG. 5 to reflect that move data command 1805 of FIG. 18 is complete.

Figure 28:
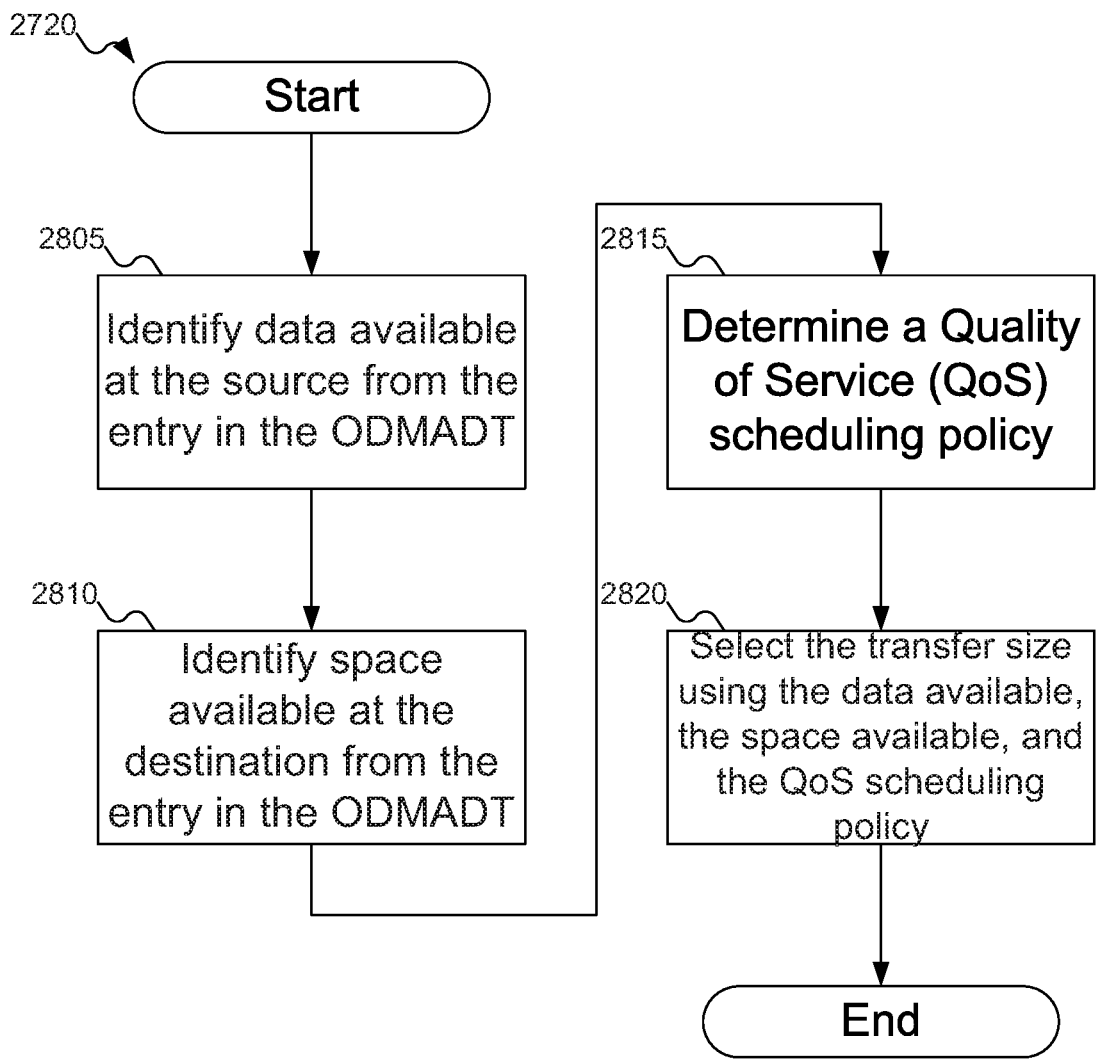
FIG. 28 shows a flowchart of an example procedure for the DMM of FIG. 4 to select a transfer size for a move data command, according to an embodiment of the inventive concept.

FIG. 28 shows a flowchart of an example procedure for DMM 410 of FIG. 4 to select a transfer size for a move data command, according to an embodiment of the inventive concept. In FIG. 28, at block 2805, move data command scheduler 520 of FIG. 5 may identify the data available at the source node from the entry in ODMADT 510 of FIG. 5. At block 2810, move data command scheduler 520 of FIG. 5 may identify the space available at the source node from the entry in ODMADT 510 of FIG. 5. At block 2815, move data command scheduler 520 of FIG. 5 may determine any Quality of Service scheduling policies that may be applicable in determining the transfer size for move data command 1805 of FIG. 18. Finally, at block 2820, move data command scheduler 520 of FIG. 5 may select the transfer size, factoring in the data available at the source node, the space available at the destination node, and Quality of Service scheduling policies.

Figure 29:
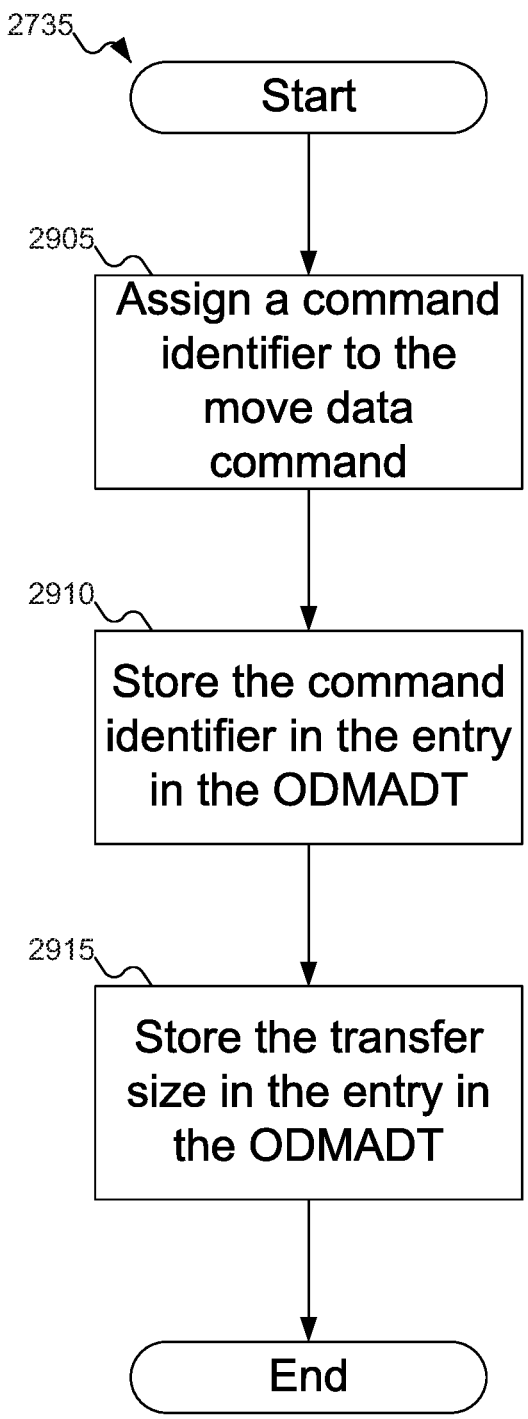
FIG. 29 shows a flowchart of an example procedure for the DMM of FIG. 4 to update the ODMADT of FIG. 5 to reflect an active move data command, according to an embodiment of the inventive concept.

FIG. 29 shows a flowchart of an example procedure for DMM 410 of FIG. 4 to update the ODMADT of FIG. 5 to reflect an active move data command, according to an embodiment of the inventive concept. In FIG. 29, at block 2905, move data command scheduler 520 of FIG. 5 may assign a command identifier to move data command 1805 of FIG. 18. At block 2910, move data command scheduler 520 of FIG. 5 may store the command identifier in the entry in ODMADT 510 of FIG. 5. At block 2915, move data command scheduler 520 of FIG. 5 may store the transfer size in the entry in ODMADT 510 of FIG. 5.

Figure 30:
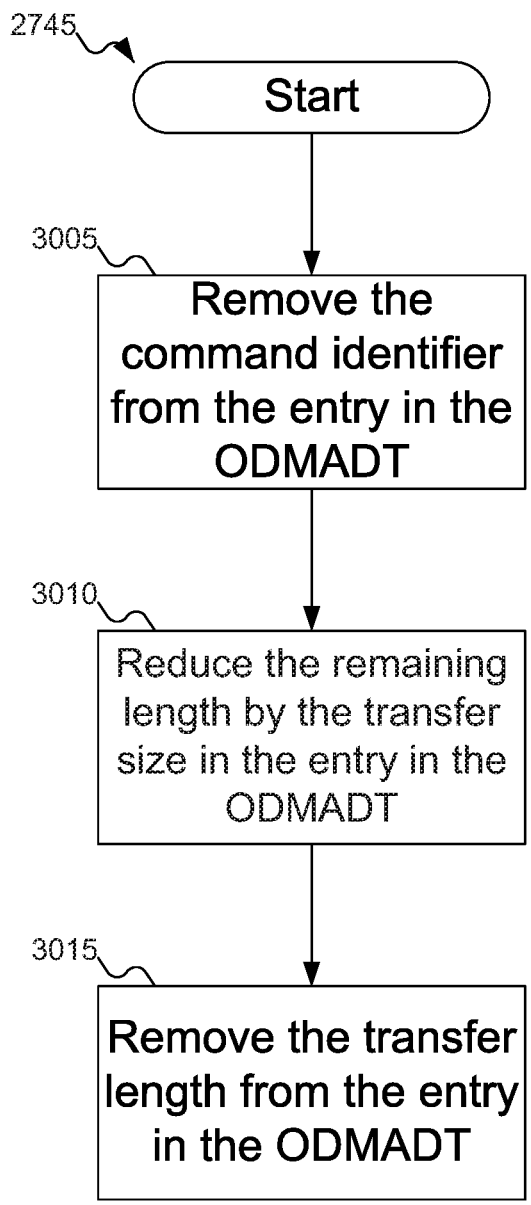
FIG. 30 shows a flowchart of an example procedure for the DMM of FIG. 4 to update the ODMADT of FIG. 5 to reflect that a move data command has completed, according to an embodiment of the inventive concept.

FIG. 30 shows a flowchart of an example procedure for DMM 410 of FIG. 4 to update the ODMADT of FIG. 5 to reflect that a move data command has completed, according to an embodiment of the inventive concept. At block 3005, move data command acknowledgment processor 525 of FIG. 5 may remove the command identifier from the entry in the ODMADT 510 of FIG. 5. At block 3010, move data command acknowledgment processor 525 of FIG. 5 may reduce the remaining length by the transfer size in the entry in ODMADT 510 of FIG. 5, representing that a portion of the data remaining to be transferred has successfully been transferred from the source node to the destination node. At block 3015, move data command acknowledgment processor 525 of FIG. 5 may remove the transfer length from the entry in ODMADT 510 of FIG. 5.

Figure 31:
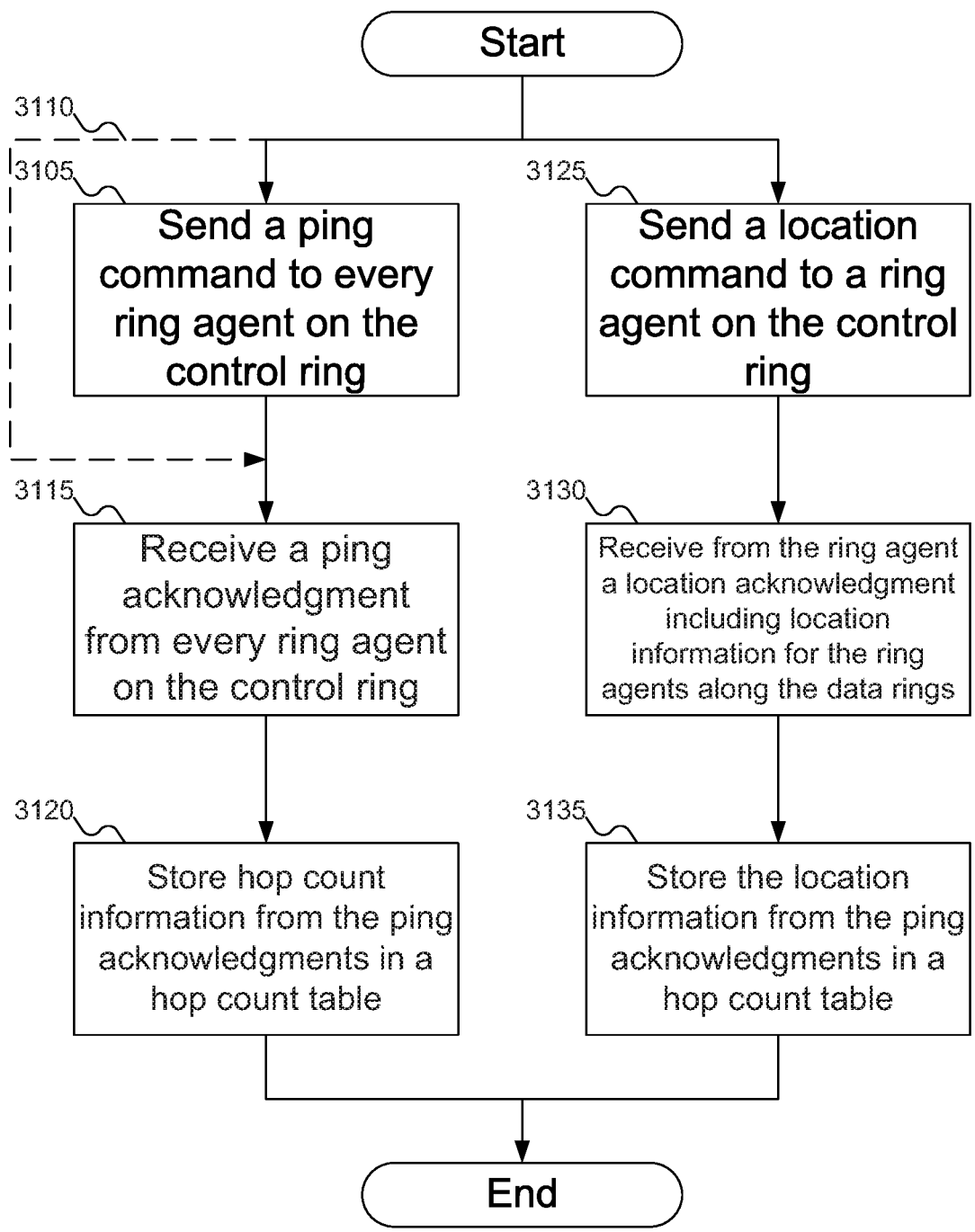
FIG. 31 shows a flowchart of an example procedure for the DMM of FIG. 4 to locate where each ring agent is on the data rings, according to an embodiment of the inventive concept.

FIG. 31 shows a flowchart of an example procedure for DMM 410 of FIG. 4 to locate where each ring agent 405-1 through 405-4 of FIG. 4 is on data rings 415-1 and 415-2 of FIG. 4, according to an embodiment of the inventive concept. In FIG. 31, at block 3105, DMM 410 of FIG. 4 may send ping command 1205 of FIG. 12 to every ring agent 405-1 through 405-4 of FIG. 4. Block 3105 of may be skipped, as shown by dashed line 3110. At block 3115, DMM 410 of FIG. 4 may receive ping acknowledgments 1305 of FIG. 13 from ring agents 405-1 through 405-4 of FIG. 4. At block 3120, DMM 410 of FIG. 4 may store hop count information in hop count table 540 of FIG. 5.

Alternatively, and particularly if the topology of control ring 420 of FIG. 4 does not correlate in any way to the topology of data rings 415-1 and 415-2 of FIG. 4, at block 3125 DMM 410 of FIG. 4 may send location command 2105 of FIG. 21 to one of ring agents 405-1 through 405-4 of FIG. 4. At block 3130, DMM 410 of FIG. 4 may receive location acknowledgment 2305 of FIG. 23 from the ring agent. And at block 3135, DMM 410 of FIG. 4 may store the location information from location acknowledgment 2305 of FIG. 23 in hop count table 540 of FIG. 5.

Figure 32A:
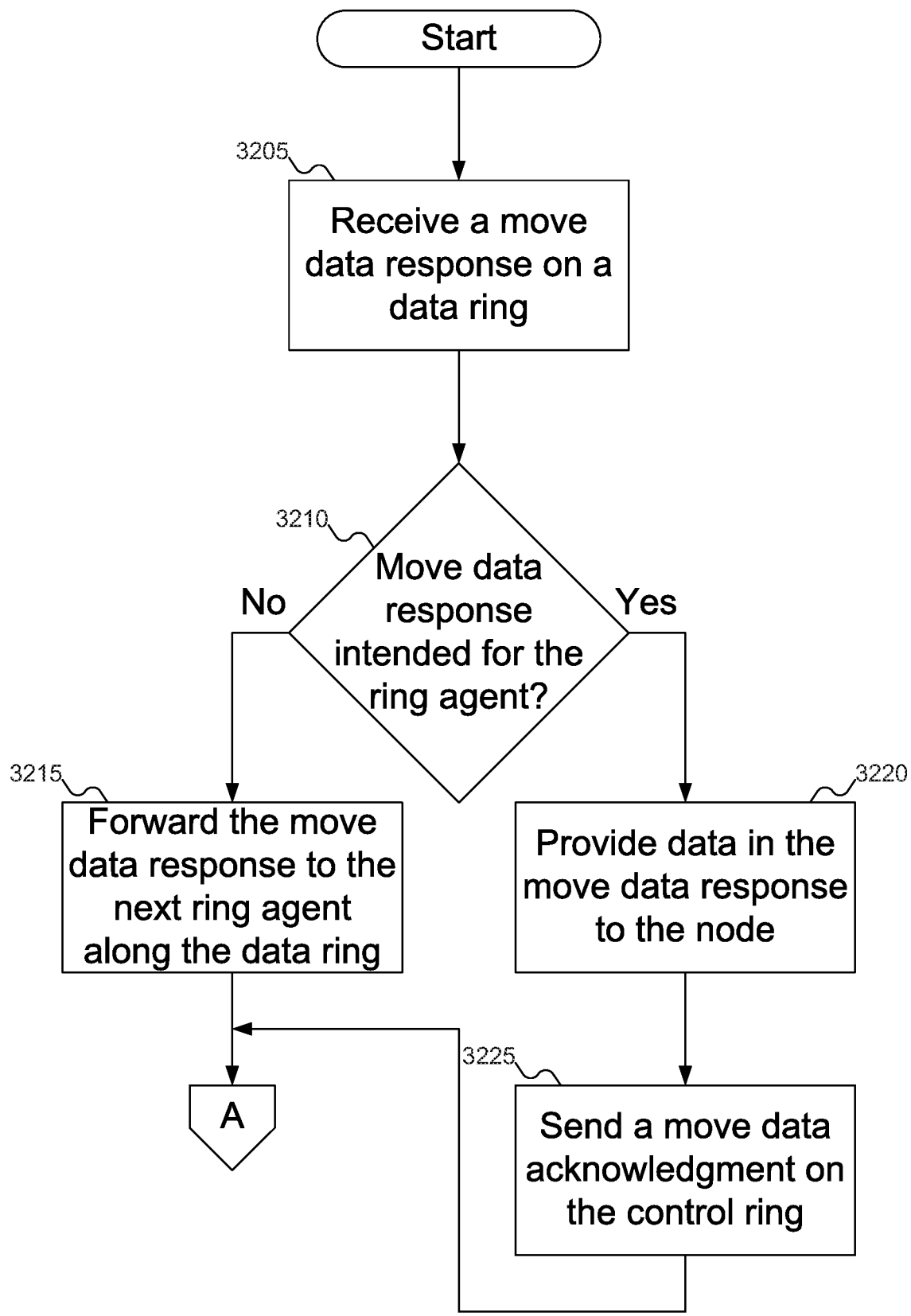
FIGS. 32A-32B show a flowchart of an example procedure for the ring agents of FIG. 4 to process messages on the data rings of FIG. 4 and the control ring of FIG. 4, according to an embodiment of the inventive concept.
Figure 32B:
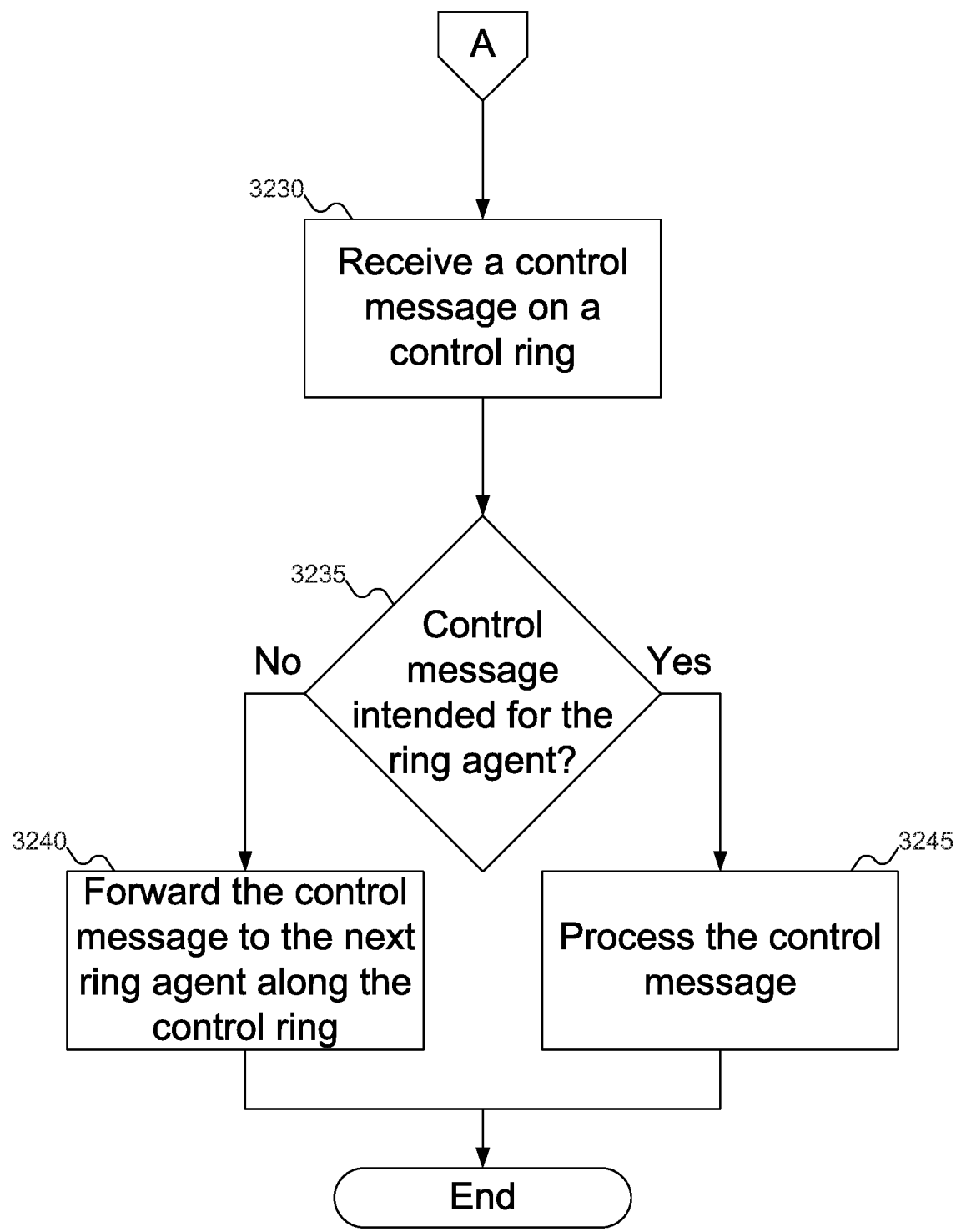

FIGS. 32A-32B show a flowchart of an example procedure for ring agents 405-1 through 405-4 of FIG. 4 to process messages on data rings 415-1 and 415-2 of FIG. 4 and control ring 420 of FIG. 4, according to an embodiment of the inventive concept. In FIG. 32A, at block 3205, data message receiver 1010 or 1015 of FIG. 10 may receive move data response 1905 of FIG. 19 on data ring 415-1 or 415-2 of FIG. 4. At block 3210, ring agents 405-1 through 405-4 of FIG. 4 may determine whether move data response 1905 of FIG. 19 is intended for the ring agent. If not, then at block 3215 data message transmitter 1020 or 1025 of FIG. 10 may forward move data response 1905 of FIG. 19 to the next ring agent along data ring 415-1 or 415-2 of FIG. 4. If the ring agent is the intended recipient of move data command 1905 of FIG. 19, then at block 3220 data message processor 1030 of FIG. 10 may provide the data in move data response 1905 of FIG. 19 to the associated node (kernel or Buffer Manager), and at block 3225 control message transmitter 1040 of FIG. 10 may send move data acknowledgment 2005 of FIG. 20 to move data command acknowledgment processor 525 of FIG. 5.

Either way, at block 3230 (FIG. 32B), control message receiver 1035 of FIG. 10 may receive a control message (such as NOP command 1105 of FIG. 11, ping command 1205 of FIG. 14, data available command 1405 of FIG. 14, space available command 1605 of FIG. 16, move data command 1805 of FIG. 18, or location command 2105 of FIG. 21) on control ring 420 of FIG. 4. At block 3235, ring agents 405-1 through 405-4 of FIG. 4 may determine whether the control message is intended for the ring agent. If not, then at block 3240 control message transmitter 1040 of FIG. 3 may forward the control message to the next ring agent along control ring 420 of FIG. 4. If the ring agent is the intended recipient of the command message, then at block 3245 control message processor 1045 of FIG. 10 may process the control message.

Figure 33:
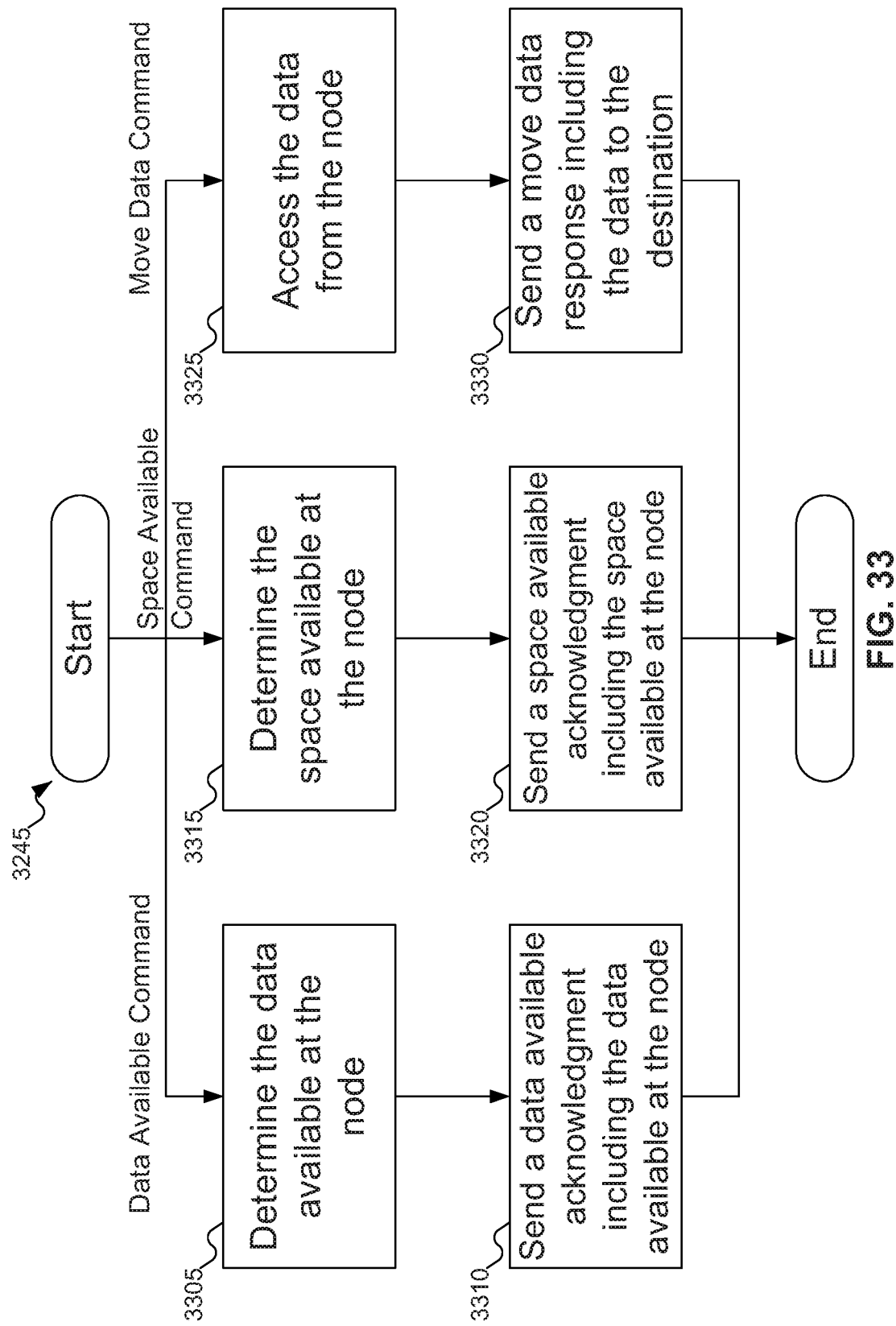
FIG. 33 shows a flowchart of an example procedure for the ring agents of FIG. 4 to process commands received on the command ring of FIG. 4, according to an embodiment of the inventive concept.

FIG. 33 shows a flowchart of an example procedure for ring agents 405-1 through 405-4 of FIG. 4 to process commands received on command ring 420 of FIG. 4, according to an embodiment of the inventive concept. In FIG. 33, at block 3305, command message processor 1045 of FIG. 10 may determine that the control message is data available command 1405 of FIG. 14, in which case at block 3310 command message processor 1045 of FIG. 10 may send data available acknowledgment 1505 of FIG. 15 to data available/space available poll 515 of FIG. 5 on control ring 420 of FIG. 4 using control message transmitter 1040 of FIG. 10.

Alternatively, at block 3315, command message processor 1045 of FIG. 10 may determine that the control message is space available command 1605 of FIG. 16, in which case at block 3320 command message processor 1045 of FIG. 10 may send space available acknowledgment 1705 of FIG. 17 to data available/space available poll 515 of FIG. 5 on control ring 420 of FIG. 4 using control message transmitter 1040 of FIG. 10.

Alternatively, at block 3325, command message processor 1045 of FIG. 10 may determine that the control message is move data command 1805 of FIG. 18, in which case at block 3330 command message processor 1045 of FIG. 10 may send move data response 1905 of FIG. 19 to the destination node on data ring 415-1 or 415-2 of FIG. 4, depending on the data ring specified in move data command 1805 of FIG. 18, using data message transmitter 1020 or 1025 of FIG. 10.

Figure 34:
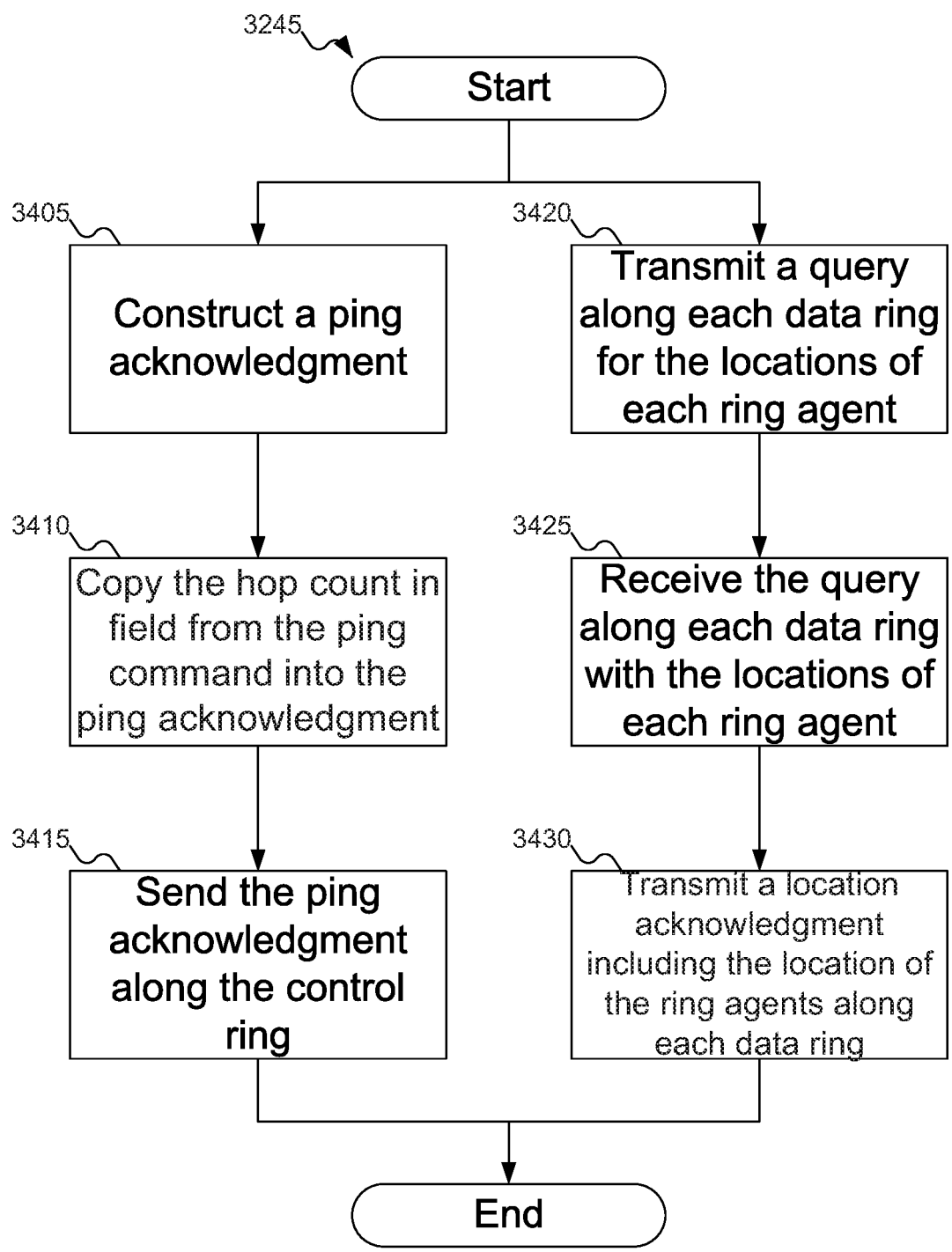
FIG. 34 shows a flowchart of an example procedure for a ring agent of FIG. 4 to process requests for location information of ring agents of FIG. 4 on the data rings of FIG. 4, according to an embodiment of the inventive concept.

FIG. 34 shows a flowchart of an example procedure for ring agent 405-1 through 405-4 of FIG. 4 to process requests for location information of ring agents 405-1 through 405-4 of FIG. 4 on data rings 415-1 and 415-2 of FIG. 4, according to an embodiment of the inventive concept. In FIG. 34, at block 3405, after command message receiver 1035 receives ping command 1205 of FIG. 12, command message processor 1045 of FIG. 10 may construct ping acknowledgment 1305 of FIG. 13. At block 3410, command message processor 1045 of FIG. 10 may copy the hop count in field from ping command 1205 of FIG. 12 into ping acknowledgment 1305 of FIG. 13. At block 3415, command message transmitter 1040 of FIG. 10 may transmit ping acknowledgment on command ring 420 of FIG. 4.

Alternatively, at block 3420, after command message receiver 1035 of FIG. 10 receives location command 2105 of FIG. 21, data message transmitters 1020 and 1025 of FIG. 10 may transmit location responses 2205 of FIG. 22 (which may include the ring agent as the first entry in the data field) constructed by command message processor 1045 of FIG. 10 along data rings 415-1 and 415-2 of FIG. 4. At block 3425, data message receivers 1010 and 1015 of FIG. 10 may receive location responses 2205 of FIG. 22 along data rings 415-1 and 415-2 of FIG. 4. At block 3430, command message processor 1045 of FIG. 10 may construct location acknowledgment 2305 of FIG. 23, including the location information for each ring agent 405-1 through 405-4 of FIG. 4 along each data ring 415-1 and 415-2 of FIG. 4, and may use control message transmitter 1030 of FIG. 10 to transmit location acknowledgment 2305 of FIG. 23 to DMM 410 of FIG. 4 along control ring 420 of FIG. 4.

Note that in FIGS. 33-34, no processing is described for NOP command 1105 of FIG. 11. This choice is a direct consequence of the fact that NOP command 1105 of FIG. 11 instructs ring agents 405-1 through 405-4 of FIG. 4 to do nothing: not even an acknowledgment is needed.

Figure 35:
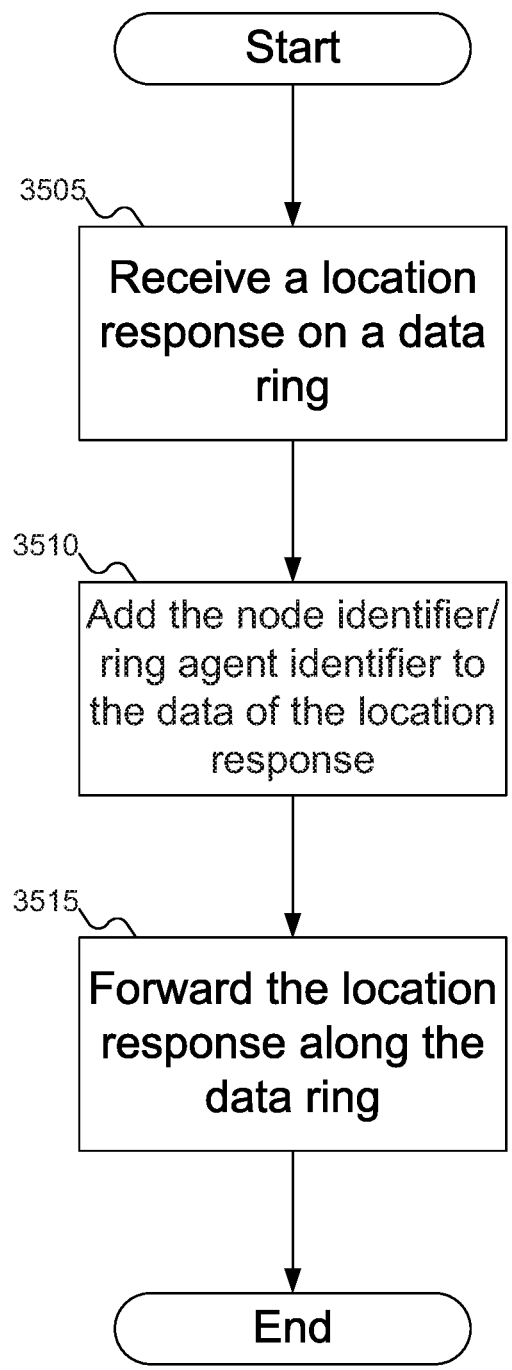
FIG. 35 shows a flowchart of an example procedure for the ring agents of FIG. 4 to process the location response of FIG. 22 on the data rings of FIG. 4, according to an embodiment of the inventive concept.

FIG. 35 shows a flowchart of an example procedure for ring agents 405-1 through 405-4 of FIG. 4 to process location response 2205 of FIG. 22 on data rings 415-1 and 415-2 of FIG. 4, according to an embodiment of the inventive concept. In FIG. 35, at block 3505, data message receiver 1010 or 1015 of FIG. 10 may receive location response 2205 of FIG. 22 along data ring 415-1 or 415-2 of FIG. 10. At block 3510, control message processor 1045 of FIG. 10 may add an identifier of ring agent 405-1 through 405-4 of FIG. 4 (or an identifier of the associated node) to the data field of location response 2205 of FIG. 22. At block 3515, data message transmitter 1020 or 1025 of FIG. 10 may transmit location message 2205 of FIG. 22 to the next ring agent on data ring 415-1 or 415-2 of FIG. 4.

In FIGS. 25A-35, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. In conventional systems data is moved to the host processor for processing: where the amount of data to be processed is large, this data movement imposes a load on data transmission resources between the storage device and the host processor. This data movement also imposes a processing load on the host processor. In contrast, embodiments of the inventive concept permit processing to occur locally to storage, eliminating both the data transfer load and freeing host processing resources. In addition, the data movement interconnect is scalable, permitting more nodes to be easily added to support additional local processing without introducing significant additional expenses in terms of equipment purchase or operation.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
  flash memory storage to store long-term data;
  a volatile memory storage to store short-term data.
  a host interface layer to receive requests from a host machine;
  an SSD Controller, to manage access to the long-term data in the flash memory storage, including:
    a flash translation layer to translate Logical Block Addresses (LBAs) in the requests from the host machine into Physical Block Addresses (PBAs) where the long-term data is stored in the flash memory storage;
    a flash memory controller to access the long-term data from the flash memory storage;
    a volatile memory controller to access the short-term data from the volatile memory storage; and
    an orchestrator processor to send instructions to a Data Movement Interconnect (DMI); and
  the DMI, comprising:
    at least two kernels to execute operations on data;
    at least one Buffer Manager to access short-term data from the volatile memory storage;
    a plurality of ring agents, each kernel and each Buffer Manager to handle messaging using the DMI associated with a ring agent of the plurality of ring agents;
    a Data Movement Manager (DMM) to manage data movement through the DMI responsive to the instructions from the orchestrator processor;
    at least two data rings connecting the ring agents to move the data between the ring agents; and a control ring connecting the ring agents and the DMM to share commands and acknowledgments between the ring agents and the DMM.

Statement 2. An embodiment of the inventive concept includes the SSD according to statement 1, wherein the SSD Controller includes the DMI.

Statement 3. An embodiment of the inventive concept includes the SSD according to statement 1, wherein SSD further comprises a co-processor including the DMI.

Statement 4. An embodiment of the inventive concept includes the SSD according to statement 3, wherein the co-processor is implemented using either a Field Programmable Gate Array (FPGA) or an Application-Specific Integrated Circuit (ASIC).

Statement 5. An embodiment of the inventive concept includes the SSD according to statement 1, wherein the volatile memory storage includes a Dynamic Random Access Memory (DRAM).

Statement 6. An embodiment of the inventive concept includes the SSD according to statement 1, wherein the orchestrator processor sends Direct Memory Access (DMA) descriptors to the DMM.

Statement 7. An embodiment of the inventive concept includes the SSD according to statement 6, wherein the DMA descriptors include a source address, a destination address, and length of data to be moved.

Statement 8. An embodiment of the inventive concept includes the SSD according to statement 7, wherein the source address includes one of a memory address in the volatile memory storage, a Buffer Manager identifier to identify the Buffer Manager, and a kernel identifier to identify one of the at least two kernels.

Statement 9. An embodiment of the inventive concept includes the SSD according to statement 7, wherein the destination address includes one of a memory address in the volatile memory storage, a Buffer Manager identifier to identify the Buffer Manager, and a kernel identifier to identify one of the at least two kernels.

Statement 10. An embodiment of the inventive concept includes the SSD according to statement 6, wherein the DMM stores outstanding DMA descriptors in an Outstanding DMA descriptor Table (ODMADT).

Statement 11. An embodiment of the inventive concept includes the SSD according to statement 10, wherein the ODMADT stores, for each outstanding DMA descriptor, a descriptor ID, a source, a destination, and a remaining length to be transferred from the source to the destination.

Statement 12. An embodiment of the inventive concept includes the SSD according to statement 11, wherein the ODMADT further stores, for each outstanding DMA descriptor, a data available at the source, a space available at the destination, an active length in transit between the source and the destination, and a command ID for the active length in transit between the source and the destination.

Statement 13. An embodiment of the inventive concept includes the SSD according to statement 12, wherein the DMM includes a data available/space available poll to poll the source for the data available and to poll the destination for the space available.

Statement 14. An embodiment of the inventive concept includes the SSD according to statement 13, wherein the DMM includes an orchestrator interface to inform the orchestrator processor when the ODMADT is full.

Statement 15. An embodiment of the inventive concept includes the SSD according to statement 14, wherein the orchestrator interface is further operative to inform the orchestrator processor when the ODMADT includes at least one available entry.

Statement 16. An embodiment of the inventive concept includes the SSD according to statement 6, wherein the DMM includes:

an orchestrator interface to receive the DMA descriptors from the orchestrator processor; and a move data command scheduler to schedule a move data command from a source in the DMI to a destination in the DMI on one of the at least two data rings responsive to the DMA descriptors.

Statement 17. An embodiment of the inventive concept includes the SSD according to statement 16, wherein the move data command scheduler is operative to select the one of the at least two data rings responsive to information in a hop count table.

Statement 18. An embodiment of the inventive concept includes the SSD according to statement 16, wherein the move data command scheduler is operative to schedule the move data command responsive to the lesser of the data available at the source and the space available at the destination.

Statement 19. An embodiment of the inventive concept includes the SSD according to statement 16, wherein the move data command scheduler is further operative to schedule the move data command responsive to at least one Quality of Service (QoS) scheduling policy.

Statement 20. An embodiment of the inventive concept includes the SSD according to statement 16, wherein the DMM further includes a move data command acknowledgment processor to process a move data acknowledgment from the destination.

Statement 21. An embodiment of the inventive concept includes the SSD according to statement 1, wherein the DMM is operative to:

send a ping command to one of the at least two kernels; and receive a ping acknowledgment from the one of the at least two kernels, including a first position of the one of the at least two kernels around the one of the at least two data rings and a second position of the one of the at least two kernels in around the one of the least two data rings.

Statement 22. An embodiment of the inventive concept includes the SSD according to statement 1, wherein each ring agent is operative to:

receive a message along one of the at least two data rings and the control ring;

based at least in part on the kernel not being a destination of the message, forwarding the message along the one of the at least two data rings and the control ring.

Statement 23. An embodiment of the inventive concept includes the SSD according to statement 22, wherein each ring agent is further operative to:

increment a hop count-in in a ping command; and increment a hop count-out in a ping acknowledgment.

Statement 24. An embodiment of the inventive concept includes the SSD according to statement 22, wherein each ring agent is further operative to:

respond to a data available command with a data available acknowledgment at the kernel associated with the ring agent; and respond to a space available command with a space available acknowledgment at the kernel associated with the ring agent.

Statement 25. An embodiment of the inventive concept includes the SSD according to statement 22, wherein each ring agent is further operative to:

receive a move data command along the control ring identifying the kernel as the source; and send a move data response to a destination of the move data command along the one of the at least two data rings, the move data response including the data.

Statement 25a. An embodiment of the inventive concept includes the SSD according to statement 22, wherein each ring agent is further operative to:

receive a move data response along the one of the at least two data rings including the data; and send a move data acknowledgement along the control ring.

Statement 26. An embodiment of the inventive concept includes the SSD according to statement 1, wherein a ring agent is included in at least a third data ring in a second DMI.

Statement 27. An embodiment of the inventive concept includes a Data Movement Manager (DMM), comprising:

a control ring receiver to receive a first control message over a control ring, the control ring connecting the DMM with ring agents associated with at least two kernels and a Buffer Manager;

a control ring transmitter to send a second control message over the control ring;

an orchestrator interface to receive a Direct Memory Access (DMA) descriptor from an orchestrator processor;

a move data command scheduler to construct and send a move data command to a first ring agent of the ring agents via the control ring transmitter, the move data command responsive to the DMA descriptor; and a move data command acknowledgment processor to receive and process a move data command acknowledgment from a second ring agent of the ring agents.

Statement 28. An embodiment of the inventive concept includes the DMM according to statement 27, further comprising a data available/space available poll to send at least one data available command to the first ring agent and to send at least one space available command to the second ring agent.

Statement 29. An embodiment of the inventive concept includes the DMM according to statement 27, further comprising storage for an Outstanding DMA descriptor Table (ODMADT) to store the DMA descriptor.

Statement 30. An embodiment of the inventive concept includes the DMM according to statement 27, further comprising storage for a hop count table to store hop count information for each ring agent.

Statement 31. An embodiment of the inventive concept includes the DMM according to statement 30, wherein the DMM is operative to query the ring agents for their locations along at least two data rings.

Statement 32. An embodiment of the inventive concept includes a ring agent, comprising:

a node interface;

a first data message receiver to receive a first move data response along a first data ring, the first data ring connecting a plurality of ring agents including the ring agent;

a first data message transmitter to transmit the first move data response along the first data ring;

a second data message receiver to receive a second move data response along a second data ring, the second ring connecting the plurality of ring agents including the ring agent;

a second data message transmitter to transmit the second move data response along the second data ring;

a data message processor to process the first move data response and the second move data response;

a control message receiver to receive a control message along a control ring, the control ring connecting the plurality of ring agents including the ring agent and a Data Movement Manager (DMM);

a control message transmitter to transmit the control message along the control ring; and a control message processor to process the control message.

Statement 33. An embodiment of the inventive concept includes the ring agent according to statement 32, wherein the node interface connects to one of a kernel and a Buffer Manager.

Statement 34. An embodiment of the inventive concept includes the ring agent according to statement 32, wherein the control message processor is operative to instruct the control message transmitter to transmit the control message along the control ring based at least in part on the control message not being addressed to the ring agent.

Statement 35. An embodiment of the inventive concept includes the ring agent according to statement 32, wherein the control message processor is operative to generate an acknowledgment to the control message and to instruct the control message transmitter to transmit the acknowledgment along the control ring based at least in part on the control message being addressed to the ring agent.

Statement 36. An embodiment of the inventive concept includes the ring agent according to statement 35, wherein:

the control message includes one of a data available command and a space available command; and the acknowledgment includes one of data available acknowledgment indicating how much data is available via the node interface and a space available acknowledgment indicating how much space is available via the node interface.

Statement 37. An embodiment of the inventive concept includes the ring agent according to statement 32, wherein the data message processor is operative to generate a third move data response and instruct one of the first data message transmitter and the second data message transmitter to transmit the third move data response along one of the first data ring and the second data ring, based at least in part on the control message being a move data command addressed to the ring agent.

Statement 38. An embodiment of the inventive concept includes the ring agent according to statement 37, wherein the third move data response is addressed to a destination of the move data command and includes data identified in the move data command.

Statement 39. An embodiment of the inventive concept includes the ring agent according to statement 37, wherein the control message processor is operative to generate a move data acknowledgment and instruct the control message transmitter to transmit the move data acknowledgment along the control ring, based at least in part on one of the first move data response and the second move data response being addressed to the ring agent.

Statement 40. An embodiment of the inventive concept includes the ring agent according to statement 32, wherein the data message processor is operative to instruct the first data message transmitter to transmit the first move data response along the first data ring based at least in part on the first move data response not being addressed to the ring agent, and to instruct the second data message transmitter to transmit the second move data response along the second data ring based at least in part on the second move data response not being addressed to the ring agent.

Statement 41. An embodiment of the inventive concept includes the ring agent according to statement 32, wherein:

the control message receiver is operative to receive a location command from the DMM;

the first data message transmitter is operative to transmit a first location response along the first data ring for information about first locations of the plurality of ring agents along the first data ring responsive to the location command;

the second data message transmitter is operative to transmit a second location response along the second data ring for information about second locations of the plurality of ring agents along the second data ring responsive to the location command;

the first data message receiver is operative to receive the first location response along the first data ring including the first locations of the plurality of ring agents along the first ring;

the second data message receiver is operative to receive the second location response along the second data ring including the second locations of the plurality of ring agents along the second ring; and the control message transmitter is operative to transmit to the DMM a location acknowledgment including the first locations of the plurality of ring agents along the first data ring received in the first location response and the second locations of the plurality of ring agents along the second data ring on the control ring received in the second location response.

Statement 42. An embodiment of the inventive concept includes a method, comprising:

receiving a Direct Memory Access (DMA) descriptor from an orchestrator processor;

selecting a free entry in an Outstanding DMA descriptor Table (ODMADT); and adding the DMA descriptor to the free entry in the ODMADT.

Statement 43. An embodiment of the inventive concept includes the method according to statement 42, wherein:

receiving a Direct Memory Access (DMA) descriptor from an orchestrator processor includes receiving a source address, a destination address, and length of data to be moved; and adding the DMA descriptor to the free entry in the ODMADT includes storing the source address, the destination address, and the length of data to be moved in the free entry in the ODMADT.

Statement 44. An embodiment of the inventive concept includes the method according to statement 43, wherein:

receiving a Direct Memory Access (DMA) descriptor from an orchestrator processor further includes receiving a descriptor identifier; and adding the DMA descriptor to the free entry in the ODMADT further includes storing the descriptor identifier in the free entry in the ODMADT.

Statement 45. An embodiment of the inventive concept includes the method according to statement 43, wherein:

receiving a Direct Memory Access (DMA) descriptor from an orchestrator processor further includes receiving at least one flag; and adding the DMA descriptor to the free entry in the ODMADT further includes storing the at least one flag in the free entry in the ODMADT.

Statement 46. An embodiment of the inventive concept includes the method according to statement 42, further comprising:

determining that the free entry in the ODMADT represents a completed DMA descriptor;

sending a completion message to the orchestrator processor; and freeing the free entry in the ODMADT.

Statement 47. An embodiment of the inventive concept includes a method, comprising:

identifying an entry in an Outstanding Direct Memory Access (DMA) descriptor Table (ODMADT);

identifying a source in the entry in the ODMADT;

identifying a destination in the entry in the ODMADT;

constructing a data available command;

sending the data available command to the source;

constructing a space available command; and sending the space available command to the destination.

Statement 48. An embodiment of the inventive concept includes the method according to statement 47, wherein the source is one of a kernel and a Buffer Manager.

Statement 49. An embodiment of the inventive concept includes the method according to statement 47, wherein the destination is one of a kernel and a Buffer Manager.

Statement 50. An embodiment of the inventive concept includes the method according to statement 47, wherein the entry in the ODMADT currently has no associated move data command from the source to the destination underway.

Statement 51. An embodiment of the inventive concept includes the method according to statement 47, wherein:

sending the data available command to the source includes sending the data available command from a data available/space available poll in a Data Movement Manager (DMM) to a first ring agent associated with the source via a control ring in a Data Movement Interconnect (DMI) connecting the DMM and the first ring agent associated with the source; and sending the space available command to the destination includes sending the space available command from the data available/space available poll in the DMM to a second ring agent associated with the destination via the control ring in the DMI connecting the DMM and the second ring agent associated with the destination.

Statement 52. An embodiment of the inventive concept includes the method according to statement 47, wherein:

the data available command includes an entry identifier of the entry in the ODMADT; and the space available command includes the entry identifier of the entry in the ODMADT.

Statement 53. An embodiment of the inventive concept includes the method according to statement 47, further comprising:

receiving a data available acknowledgment from the source, the data available acknowledgment including a data available at the source;

updating the entry in the ODMADT with the data available at the source;

receiving a space available acknowledgment from the destination, the space available acknowledgment including a space available at the destination; and updating the entry in the ODMADT with the space available at the destination;

Statement 54. An embodiment of the inventive concept includes the method according to statement 53, wherein:

receiving a data available acknowledgment from the source includes receiving the data available acknowledgment from a first ring agent associated with the source at a data available/space available poll in a Data Movement Manager (DMM) via a control ring in a Data Movement Interconnect (DMI) connecting the DMM and the first ring agent associated with the source; and receiving a space available acknowledgment from the destination includes receiving the space available acknowledgment from a second ring agent associated with the destination at the data available/space available poll in the DMM via the control ring in the DMI connecting the DMM and the second ring agent associated with the destination; and Statement 55. An embodiment of the inventive concept includes the method according to statement 53, wherein:

the data available acknowledgment includes an entry identifier of the entry in the ODMADT;

updating the entry in the ODMADT with the data available at the source includes identifying the entry in the ODMADT using the entry identifier of the ODMADT in the data available acknowledgment;

the space available acknowledgment includes the entry identifier of the entry in the ODMADT; and updating the entry in the ODMADT with the space available at the destination includes identifying the entry in the ODMADT using the entry identifier of the ODMADT in the space available acknowledgment.

Statement 56. An embodiment of the inventive concept includes a method, comprising:

selecting an entry in an Outstanding Direct Memory Access (DMA) descriptor Table (ODMADT);

identifying a source and a destination from the entry in the ODMADT;

determining a transfer size;

constructing a move data command instructing the source to send a transfer size amount of data to the destination; and sending the move data command to the source.

Statement 57. An embodiment of the inventive concept includes the method according to statement 56, wherein the source is one of a kernel and a Buffer Manager.

Statement 58. An embodiment of the inventive concept includes the method according to statement 56, wherein the destination is one of a kernel and a Buffer Manager.

Statement 59. An embodiment of the inventive concept includes the method according to statement 56, wherein the entry in the ODMADT currently has no associated move data command from the source to the destination underway.

Statement 60. An embodiment of the inventive concept includes the method according to statement 56, wherein sending the move data command to the source includes sending the move data command from a move data command scheduler in a Data Movement Manager (DMM) to a ring agent associated with the source via a control ring in a Data Movement Interconnect (DMI) connecting the DMM and the ring agent associated with the source.

Statement 61. An embodiment of the inventive concept includes the method according to statement 56, wherein determining a transfer size includes:

identifying a data available at the source from the entry in the ODMADT;

identifying a space available at the destination from the entry in the ODMADT; and selecting the transfer size as a lesser of the data available at the source and the space available at the destination.

Statement 62. An embodiment of the inventive concept includes the method according to statement 61, wherein selecting the transfer size as a lesser of the data available at the source and the space available at the destination includes factoring in a Quality of Service (QoS) scheduling policy.

Statement 63. An embodiment of the inventive concept includes the method according to statement 56, further comprising updating the entry in the ODMADT to reflect that the move data command is underway.

Statement 64. An embodiment of the inventive concept includes the method according to statement 63, wherein updating the entry in the ODMADT to reflect that the move data command is underway includes storing the transfer size in the entry in the ODMADT.

Statement 65. An embodiment of the inventive concept includes the method according to statement 63, wherein:

constructing a move data command instructing the source to send a transfer size amount of data to the destination includes assigning a command identifier to the move data command; and updating the entry in the ODMADT to reflect that the move data command is underway includes storing the command identifier in the entry in the ODMADT.

Statement 66. An embodiment of the inventive concept includes the method according to statement 56, further comprising:

receiving a move data acknowledgment from the destination; and updating the entry in the ODMADT to reflect that the move data command has completed.

Statement 67. An embodiment of the inventive concept includes the method according to statement 66, wherein receiving a move data acknowledgment from the destination includes receiving the move data acknowledgment from a ring agent associated with the destination at a move data command acknowledgment processor via a control ring in a Data Movement Interconnect (DMI) connecting the DMM and the ring agent associated with the destination.

Statement 68. An embodiment of the inventive concept includes the method according to statement 66, wherein updating the entry in the ODMADT to reflect that the move data command has completed includes reducing a remaining length in the entry in the ODMADT by the transfer size.

Statement 69. An embodiment of the inventive concept includes the method according to statement 66, wherein updating an entry in the ODMADT to reflect that the move data command has completed includes clearing at least one of a transfer size and a command identifier in the entry in the ODMADT.

Statement 70. An embodiment of the inventive concept includes the method according to statement 56, further comprising receiving a ping acknowledgment from each of a plurality of ring agents along a control ring connecting the plurality of ring agents.

Statement 71. An embodiment of the inventive concept includes the method according to statement 70, further comprising transmitting a ping message to each of the plurality of ring agents along the control ring, the ping acknowledgment from each of the plurality of ring agents along the control ring responsive to the ping message to each of the plurality of ring agents along the control ring.

Statement 72. An embodiment of the inventive concept includes the method according to statement 70, further comprising storing hop count information from the ping acknowledgment from each of the plurality of ring agents in a hop count table.

Statement 73. An embodiment of the inventive concept includes the method according to statement 56, further comprising:

transmitting a location command to a first ring agent in a plurality of rings along a control ring;

receiving a location acknowledgment from the first ring agent along the control ring, the location acknowledgment including locations of the plurality of ring agents along at least two data rings; and storing the locations of the plurality of the plurality of ring agents along at least two data rings in a hop count table.

Statement 74. An embodiment of the inventive concept includes a method, comprising:

receiving a move data response at a ring agent along one of at least two data rings including the ring agent;

determining whether the move data response is addressed to the ring agent;

based at least in part on the move data response not being addressed to the ring agent, transmitting the move data response from the ring agent along the one of at least two data rings including the ring agent; and based at least in part on the move data response being addressed to the ring agent, providing data in the move data response to a node associated with the ring agent, the node including one of a kernel and a Buffer Manager.

Statement 75. An embodiment of the inventive concept includes the method according to statement 74, further comprising sending a move data acknowledgment from the ring agent to a Data Movement Manager (DMM) along a control ring including the ring agent.

Statement 76. An embodiment of the inventive concept includes the method according to statement 74, further comprising:

receiving a control message at the ring agent along a control ring;

determining whether the control message is addressed to the ring agent;

based at least in part on the control message not being addressed to the ring agent, transmitting the control message from the ring agent along the control ring; and based at least in part on the control message being addressed to the ring agent, processing the control message at the ring agent.

Statement 77. An embodiment of the inventive concept includes the method according to statement 76, wherein:

the control message includes a data available command; and processing the control message includes:

determining the data available at a node connected to the node interface; and sending a data available acknowledgment along the control ring, the data available acknowledgment including the data available at the node.

Statement 78. An embodiment of the inventive concept includes the method according to statement 76, wherein:

the control message includes a space available command; and processing the control message includes:

determining the space available at a node connected to the node interface; and sending a space available acknowledgment along the control ring, the space available acknowledgment including the space available at the node.

Statement 79. An embodiment of the inventive concept includes the method according to statement 76, wherein:

the control message includes a move data command, the move data command indicating a data at a node connected to the node interface to be sent to a destination; and processing the control message includes:
accessing data from the node; and
sending a move data response to the destination along a second of the at least two data rings including the ring agent.

Statement 80. An embodiment of the inventive concept includes the method according to statement 79, wherein the move data command identifies the second of the at least two data rings including the ring agent.

Statement 81. An embodiment of the inventive concept includes the method according to statement 76, wherein:

the control message is a location command; and processing the control message includes:

transmitting a location response along each of the at least two data rings for locations of each a plurality of ring agents;

receiving the location response along each of the at least two data rings, the received location response include the locations of each of the plurality of ring agents along each of the at least two data rings; and transmitting a location acknowledgment responsive to the location command including the locations of each of the plurality of ring agents along each of the at least two data rings.

Statement 82. An embodiment of the inventive concept includes the method according to statement 81, wherein transmitting a location acknowledgment responsive to the location command including the locations of each of the plurality of ring agents along each of the at least two data rings includes transmitting the location acknowledgment along the control ring.

Statement 83. An embodiment of the inventive concept includes an article, comprising a non-transitory storage medium, the non-transitory storage medium having stored thereon instructions that, when executed by a machine, result in:

receiving a Direct Memory Access (DMA) descriptor from an orchestrator processor;

selecting a free entry in an Outstanding DMA descriptor Table (ODMADT); and adding the DMA descriptor to the free entry in the ODMADT.

Statement 84. An embodiment of the inventive concept includes the article according to statement 83, wherein:

receiving a Direct Memory Access (DMA) descriptor from an orchestrator processor includes receiving a source address, a destination address, and length of data to be moved; and adding the DMA descriptor to the free entry in the ODMADT includes storing the source address, the destination address, and the length of data to be moved in the free entry in the ODMADT.

Statement 85. An embodiment of the inventive concept includes the article according to statement 84, wherein:

receiving a Direct Memory Access (DMA) descriptor from an orchestrator processor further includes receiving a descriptor identifier; and adding the DMA descriptor to the free entry in the ODMADT further includes storing the descriptor identifier in the free entry in the ODMADT.

Statement 86. An embodiment of the inventive concept includes the article according to statement 84, wherein:

receiving a Direct Memory Access (DMA) descriptor from an orchestrator processor further includes receiving at least one flag; and adding the DMA descriptor to the free entry in the ODMADT further includes storing the at least one flag in the free entry in the ODMADT.

Statement 87. An embodiment of the inventive concept includes the article according to statement 83, the non-transitory storage medium having stored thereon further instructions that, when executed by the machine, result in:

determining that the free entry in the ODMADT represents a completed DMA descriptor;

sending a completion message to the orchestrator processor; and freeing the free entry in the ODMADT.

Statement 88. An embodiment of the inventive concept includes an article, comprising a non-transitory storage medium, the non-transitory storage medium having stored thereon instructions that, when executed by a machine, result in:

identifying an entry in an Outstanding Direct Memory Access (DMA) descriptor Table (ODMADT);

identifying a source in the entry in the ODMADT;

identifying a destination in the entry in the ODMADT;

constructing a data available command;

sending the data available command to the source;

constructing a space available command; and sending the space available command to the destination.

Statement 89. An embodiment of the inventive concept includes the article according to statement 88, wherein the source is one of a kernel and a Buffer Manager.

Statement 90. An embodiment of the inventive concept includes the article according to statement 88, wherein the destination is one of a kernel and a Buffer Manager.

Statement 91. An embodiment of the inventive concept includes the article according to statement 88, wherein the entry in the ODMADT currently has no associated move data command from the source to the destination underway.

Statement 92. An embodiment of the inventive concept includes the article according to statement 88, wherein:

sending the data available command to the source includes sending the data available command from a data available/space available poll in a Data Movement Manager (DMM) to a first ring agent associated with the source via a control ring in a Data Movement Interconnect (DMI) connecting the DMM and the first ring agent associated with the source; and sending the space available command to the destination includes sending the space available command from the data available/space available poll in the DMM to a second ring agent associated with the destination via the control ring in the DMI connecting the DMM and the second ring agent associated with the destination.

Statement 93. An embodiment of the inventive concept includes the article according to statement 88, wherein:

the data available command includes an entry identifier of the entry in the ODMADT; and the space available command includes the entry identifier of the entry in the ODMADT.

Statement 94. An embodiment of the inventive concept includes the article according to statement 88, the non-transitory storage medium having stored thereon further instructions that, when executed by the machine, result in:

receiving a data available acknowledgment from the source, the data available acknowledgment including a data available at the source;

updating the entry in the ODMADT with the data available at the source;

receiving a space available acknowledgment from the destination, the space available acknowledgment including a space available at the destination; and updating the entry in the ODMADT with the space available at the destination;

Statement 95. An embodiment of the inventive concept includes the article according to statement 94, wherein:

receiving a data available acknowledgment from the source includes receiving the data available acknowledgment from a first ring agent associated with the source at a data available/space available poll in a Data Movement Manager (DMM) via a control ring in a Data Movement Interconnect (DMI) connecting the DMM and the first ring agent associated with the source; and receiving a space available acknowledgment from the destination includes receiving the space available acknowledgment from a second ring agent associated with the destination at the data available/space available poll in the DMM via the control ring in the DMI connecting the DMM and the second ring agent associated with the destination; and Statement 96. An embodiment of the inventive concept includes the article according to statement 94, wherein:

the data available acknowledgment includes an entry identifier of the entry in the ODMADT;

updating the entry in the ODMADT with the data available at the source includes identifying the entry in the ODMADT using the entry identifier of the ODMADT in the data available acknowledgment;

the space available acknowledgment includes the entry identifier of the entry in the ODMADT; and updating the entry in the ODMADT with the space available at the destination includes identifying the entry in the ODMADT using the entry identifier of the ODMADT in the space available acknowledgment.

Statement 97. An embodiment of the inventive concept includes an article, comprising a non-transitory storage medium, the non-transitory storage medium having stored thereon instructions that, when executed by a machine, result in:

selecting an entry in an Outstanding Direct Memory Access (DMA) descriptor Table (ODMADT);

identifying a source and a destination from the entry in the ODMADT;

determining a transfer size;

constructing a move data command instructing the source to send a transfer size amount of data to the destination; and sending the move data command to the source.

Statement 98. An embodiment of the inventive concept includes the article according to statement 97, wherein the source is one of a kernel and a Buffer Manager.

Statement 99. An embodiment of the inventive concept includes the article according to statement 97, wherein the destination is one of a kernel and a Buffer Manager.

Statement 100. An embodiment of the inventive concept includes the article according to statement 97, wherein the entry in the ODMADT currently has no associated move data command from the source to the destination underway.

Statement 101. An embodiment of the inventive concept includes the article according to statement 97, wherein sending the move data command to the source includes sending the move data command from a move data command scheduler in a Data Movement Manager (DMM) to a ring agent associated with the source via a control ring in a Data Movement Interconnect (DMI) connecting the DMM and the ring agent associated with the source.

Statement 102. An embodiment of the inventive concept includes the article according to statement 97, wherein determining a transfer size includes:

identifying a data available at the source from the entry in the ODMADT;

identifying a space available at the destination from the entry in the ODMADT; and selecting the transfer size as a lesser of the data available at the source and the space available at the destination.

Statement 103. An embodiment of the inventive concept includes the article according to statement 102, wherein selecting the transfer size as a lesser of the data available at the source and the space available at the destination includes factoring in a Quality of Service (QoS) scheduling policy.

Statement 104. An embodiment of the inventive concept includes the article according to statement 97, the non-transitory storage medium having stored thereon further instructions that, when executed by the machine, result in updating the entry in the ODMADT to reflect that the move data command is underway.

Statement 105. An embodiment of the inventive concept includes the article according to statement 104, wherein updating the entry in the ODMADT to reflect that the move data command is underway includes storing the transfer size in the entry in the ODMADT.

Statement 106. An embodiment of the inventive concept includes the article according to statement 104, wherein:

constructing a move data command instructing the source to send a transfer size amount of data to the destination includes assigning a command identifier to the move data command; and updating the entry in the ODMADT to reflect that the move data command is underway includes storing the command identifier in the entry in the ODMADT.

Statement 107. An embodiment of the inventive concept includes the article according to statement 97, the non-transitory storage medium having stored thereon further instructions that, when executed by the machine, result in:

receiving a move data acknowledgment from the destination; and updating the entry in the ODMADT to reflect that the move data command has completed.

Statement 108. An embodiment of the inventive concept includes the article according to statement 107, wherein receiving a move data acknowledgment from the destination includes receiving the move data acknowledgment from a ring agent associated with the destination at a move data command acknowledgment processor via a control ring in a Data Movement Interconnect (DMI) connecting the DMM and the ring agent associated with the destination.

Statement 109. An embodiment of the inventive concept includes the article according to statement 107, wherein updating the entry in the ODMADT to reflect that the move data command has completed includes reducing a remaining length in the entry in the ODMADT by the transfer size.

Statement 110. An embodiment of the inventive concept includes the article according to statement 107, wherein updating an entry in the ODMADT to reflect that the move data command has completed includes clearing at least one of a transfer size and a command identifier in the entry in the ODMADT.

Statement 111. An embodiment of the inventive concept includes the article according to statement 97, the non-transitory storage medium having stored thereon further instructions that, when executed by the machine, result in receiving a ping acknowledgment from each of a plurality of ring agents along a control ring connecting the plurality of ring agents.

Statement 112. An embodiment of the inventive concept includes the article according to statement 111, the non-transitory storage medium having stored thereon further instructions that, when executed by the machine, result in transmitting a ping message to each of the plurality of ring agents along the control ring, the ping acknowledgment from each of the plurality of ring agents along the control ring responsive to the ping message to each of the plurality of ring agents along the control ring.

Statement 113. An embodiment of the inventive concept includes the article according to statement 111, the non-transitory storage medium having stored thereon further instructions that, when executed by the machine, result in storing hop count information from the ping acknowledgment from each of the plurality of ring agents in a hop count table.

Statement 114. An embodiment of the inventive concept includes the article according to statement 97, the non-transitory storage medium having stored thereon further instructions that, when executed by the machine, result in:

transmitting a location command to a first ring agent in a plurality of rings along a control ring;

receiving a location acknowledgment from the first ring agent along the control ring, the location acknowledgment including locations of the plurality of ring agents along at least two data rings; and storing the locations of the plurality of the plurality of ring agents along at least two data rings in a hop count table.

Statement 115. An embodiment of the inventive concept includes an article, comprising a non-transitory storage medium, the non-transitory storage medium having stored thereon instructions that, when executed by a machine, result in:

receiving a move data response at a ring agent along one of at least two data rings including the ring agent;

determining whether the move data response is addressed to the ring agent;

based at least in part on the move data response not being addressed to the ring agent, transmitting the move data response from the ring agent along the one of at least two data rings including the ring agent; and based at least in part on the move data response being addressed to the ring agent, providing data in the move data response to a node associated with the ring agent, the node including one of a kernel and a Buffer Manager.

Statement 116. An embodiment of the inventive concept includes the article according to statement 115, the non-transitory storage medium having stored thereon further instructions that, when executed by the machine, result in sending a move data acknowledgment from the ring agent to a Data Movement Manager (DMM) along a control ring including the ring agent.

Statement 117. An embodiment of the inventive concept includes the article according to statement 115, the non-transitory storage medium having stored thereon further instructions that, when executed by the machine, result in:

receiving a control message at the ring agent along a control ring;

determining whether the control message is addressed to the ring agent;

based at least in part on the control message not being addressed to the ring agent, transmitting the control message from the ring agent along the control ring; and based at least in part on the control message being addressed to the ring agent, processing the control message at the ring agent.

Statement 118. An embodiment of the inventive concept includes the article according to statement 117, wherein:
the control message includes a data available command; and
processing the control message includes:
determining the data available at a node connected to the node interface; and
sending a data available acknowledgment along the control ring, the data available acknowledgment including the data available at the node.

Statement 119. An embodiment of the inventive concept includes the article according to statement 117, wherein:
the control message includes a space available command; and
processing the control message includes:
determining the space available at a node connected to the node interface; and
sending a space available acknowledgment along the control ring, the space available acknowledgment including the space available at the node.

Statement 120. An embodiment of the inventive concept includes the article according to statement 117, wherein:
the control message includes a move data command, the move data command indicating a data at a node connected to the node interface to be sent to a destination; and
processing the control message includes:
accessing data from the node; and
sending a move data response to the destination along a second of the at least two data rings including the ring agent.

Statement 121. An embodiment of the inventive concept includes the article according to statement 120, wherein the move data command identifies the second of the at least two data rings including the ring agent.

Statement 122. An embodiment of the inventive concept includes the article according to statement 117, wherein:
the control message is a location command; and
processing the control message includes:
transmitting a location response along each of the at least two data rings for locations of each a plurality of ring agents;
receiving the location response along each of the at least two data rings, the received location response include the locations of each of the plurality of ring agents along each of the at least two data rings; and
transmitting a location acknowledgment responsive to the location command including the locations of each of the plurality of ring agents along each of the at least two data rings.

Statement 123. An embodiment of the inventive concept includes the article according to statement 122, wherein transmitting a location acknowledgment responsive to the location command including the locations of each of the plurality of ring agents along each of the at least two data rings includes transmitting the location acknowledgment along the control ring.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
flash memory storage to store long-term data;
a volatile memory storage to store short-term data;
a host interface layer to receive requests from a host machine;
an SSD Controller, to manage access to the long-term data in the flash memory storage, including:
a flash translation layer to translate Logical Block Addresses (LBAs) in the requests from the host machine into Physical Block Addresses (PBAs) where the long-term data is stored in the flash memory storage;
a flash memory controller to access the long-term data from the flash memory storage;
a volatile memory controller to access the short-term data from the volatile memory storage; and
an orchestrator processor to send instructions to a Data Movement Interconnect (DMI); and
the DMI, comprising:
at least two kernels to execute operations on data;
at least one Buffer Manager to access short-term data from the volatile memory storage;
a plurality of ring agents, each kernel and each Buffer Manager to handle messaging using the DMI associated with a ring agent of the plurality of ring agents;
a Data Movement Manager (DMM) to manage data movement through the DMI responsive to the instructions from the orchestrator processor;
at least two data rings connecting the ring agents to move the data between the ring agents; and
a control ring connecting the ring agents and the DMM to share commands and acknowledgments between the ring agents and the DMM.

2. The SSD according to claim 1, wherein the orchestrator processor sends Direct Memory Access (DMA) descriptors to the DMM.

3. The SSD according to claim 2, wherein the DMM stores outstanding DMA descriptors in an Outstanding DMA descriptor Table (ODMADT).

4. The SSD according to claim 2, wherein the DMM includes:
an orchestrator interface to receive the DMA descriptors from the orchestrator processor; and
a move data command scheduler to schedule a move data command from a source in the DMI to a destination in the DMI on one of the at least two data rings responsive to the DMA descriptors.

5. A Data Movement Manager (DMM), comprising:
a control ring receiver to receive a first control message over a control ring, the control ring connecting the DMM with ring agents associated with at least two kernels and a Buffer Manager;
a control ring transmitter to send a second control message over the control ring;
an orchestrator interface to receive a Direct Memory Access (DMA) descriptor from an orchestrator processor;
a move data command scheduler to construct and send a move data command to a first ring agent of the ring agents via the control ring transmitter, the move data command responsive to the DMA descriptor; and
a move data command acknowledgment processor to receive and process a move data command acknowledgment from a second ring agent of the ring agents.

6. The DMM according to claim 5, further comprising a data available/space available poll to send at least one data available command to the first ring agent and to send at least one space available command to the second ring agent.

7. The DMM according to claim 5, further comprising storage for an Outstanding DMA descriptor Table (ODMADT) to store the DMA descriptor.

8. A method, comprising:
selecting an entry in an Outstanding Direct Memory Access (DMA) descriptor Table (ODMADT);
identifying a source and a destination from the entry in the ODMADT;
determining a transfer size;
constructing a move data command instructing the source to send a transfer size amount of data to the destination; and
sending the move data command from a move data command scheduler in a Data Movement Manager (DMM) to a ring agent associated with the source via a control ring in a Data Movement Interconnect (DMI) connecting the DMM and the ring agent associated with the source.

9. The method according to claim 8, wherein determining a transfer size includes:
identifying a data available at the source from the entry in the ODMADT;
identifying a space available at the destination from the entry in the ODMADT; and
selecting the transfer size as a lesser of the data available at the source and the space available at the destination.

10. The method according to claim 9, wherein selecting the transfer size as a lesser of the data available at the source and the space available at the destination includes factoring in a Quality of Service (QoS) scheduling policy.

11. The method according to claim 8, further comprising updating the entry in the ODMADT to reflect that the move data command is underway.

12. The method according to claim 11, wherein updating the entry in the ODMADT to reflect that the move data command is underway includes storing the transfer size in the entry in the ODMADT.

13. The method according to claim 11, wherein:
constructing a move data command instructing the source to send a transfer size amount of data to the destination includes assigning a command identifier to the move data command; and
updating the entry in the ODMADT to reflect that the move data command is underway includes storing the command identifier in the entry in the ODMADT.

14. The method according to claim 8, further comprising:
receiving a move data acknowledgment from the destination; and
updating the entry in the ODMADT to reflect that the move data command has completed.

15. The method according to claim 14, wherein receiving a move data acknowledgment from the destination includes receiving the move data acknowledgment from a ring agent associated with the destination at a move data command acknowledgment processor via a control ring in the DMI connecting the DMM and the ring agent associated with the destination.

16. The method according to claim 14, wherein updating the entry in the ODMADT to reflect that the move data command has completed includes reducing a remaining length in the entry in the ODMADT by the transfer size.

17. The method according to claim 14, wherein updating an entry in the ODMADT to reflect that the move data command has completed includes clearing at least one of a transfer size and a command identifier in the entry in the ODMADT.

18. The method according to claim 8, further comprising receiving a ping acknowledgment from each of a plurality of ring agents along a control ring connecting the plurality of ring agents.

19. The method according to claim 18, further comprising storing hop count information from the ping acknowledgment from each of the plurality of ring agents in a hop count table.

20. The method according to claim 8, wherein constructing a move data command instructing the source to send a transfer size amount of data to the destination includes constructing the move data command instructing the source to send the transfer size amount of data to the destination by the DMM.

* * * * *